US011222052B2

(12) United States Patent
Hertz et al.

(10) Patent No.: US 11,222,052 B2
(45) Date of Patent: Jan. 11, 2022

(54) MACHINE LEARNING-BASED RELATIONSHIP ASSOCIATION AND RELATED DISCOVERY AND

(71) Applicant: Refinitiv US Organization LLC, New York, NY (US)

(72) Inventors: Shai Hertz, Tel Aviv (IL); Mans Olof-Ors, Lucerne (CH); Enav Weinreb, Petah Tikva (IL); Oren Hazai, Tel Aviv (IL); Geoff Horrell, London (GB); Yael Lindman, Shoham (IL); Yehonatan Mataraso, New Hyde Park, NY (US); Phani Nivarthi, West New York, NJ (US)

( * ) Notice: Subject to any disclaimer, the term of this patent is extended or adjusted under 35 U.S.C. 154(b) by 120 days.

(21) Appl. No.: 16/422,674

(22) Filed: May 24, 2019

(65) Prior Publication Data

US 2019/0354544 A1 Nov. 21, 2019

Related U.S. Application Data

(63) Continuation-in-part of application No. 15/609,800, filed on May 31, 2017, now Pat. No. 10,303,999, which is a continuation-in-part of application No. 15/351,256, filed on Nov. 14, 2016, now Pat. No. 10,650,049, which is a continuation of application No. 13/107,665, filed on May 13, 2011, now Pat. No. 9,495,635, application No. 16/422,674, which is a
(Continued)

(51) Int. Cl.
| | |
|---|---|
| *G06F 16/20* | (2019.01) |
| *G06F 16/33* | (2019.01) |
| *G06F 16/338* | (2019.01) |
| *G06K 9/62* | (2006.01) |
| *G06N 5/02* | (2006.01) |
| *G06N 20/00* | (2019.01) |
| *G06N 5/00* | (2006.01) |
| *G06F 16/901* | (2019.01) |
| *G06F 16/35* | (2019.01) |
| *G06F 16/951* | (2019.01) |

(52) U.S. Cl.
CPC .......... *G06F 16/334* (2019.01); *G06F 16/338* (2019.01); *G06K 9/6259* (2013.01); *G06N 5/00* (2013.01); *G06N 5/02* (2013.01); *G06N 20/00* (2019.01); *G06F 16/355* (2019.01); *G06F 16/9024* (2019.01); *G06F 16/951* (2019.01)

(58) Field of Classification Search
None
See application file for complete search history.

(56) References Cited

U.S. PATENT DOCUMENTS

2006/0117252 A1* 6/2006 Du .................. G06F 16/36
715/255
2011/0282878 A1* 11/2011 Bird ................ G06F 16/374
707/740

* cited by examiner

*Primary Examiner* — Belix M Ortiz Ditren
(74) *Attorney, Agent, or Firm* — Duncan Galloway Greenwald PLLC; Kevin T. Duncan

(57) ABSTRACT

Systems and techniques for determining relationships and association significance between entities are disclosed. The systems and techniques automatically identify supply chain relationships between companies based on unstructured text corpora. The system combines Machine Learning models to identify sentences mentioning supply chain between two companies (evidence), and an aggregation layer to take into account the evidence found and assign a confidence score to the relationship between companies.

20 Claims, 30 Drawing Sheets

Related U.S. Application Data continuation-in-part of application No. 16/357,314, filed on Mar. 18, 2019, which is a continuation-in-part of application No. 15/077,713, filed on Mar. 22, 2016, now Pat. No. 10,235,425, which is a continuation of application No. 14/834,317, filed on Aug. 24, 2015, now abandoned, and a continuation of application No. 13/213,324, filed on Aug. 19, 2011, now Pat. No. 9,292,545, which is a continuation-in-part of application No. 13/107,665, filed on May 13, 2011, now Pat. No. 9,495,635.

(60) Provisional application No. 61/445,236, filed on Feb. 22, 2011, provisional application No. 61/486,098, filed on May 13, 2011, provisional application No. 61/519,592, filed on May 25, 2011.

| # | Measure | Formula |
|---|---|---|
| 1 | $\phi$-coefficient | $\frac{P(A,B)-P(A)P(B)}{\sqrt{P(A)P(B)(1-P(A))(1-P(B))}}$ |
| 2 | Goodman-Kruskal's ($\lambda$) | $\frac{\sum_j \max_k P(A_j,B_k) + \sum_k \max_j P(A_j,B_k) - \max_j P(A_j) - \max_k P(B_k)}{2 - \max_j P(A_j) - \max_k P(B_k)}$ |
| 3 | Odds ratio ($\alpha$) | $\frac{P(A,B)P(\overline{A},\overline{B})}{P(A,\overline{B})P(\overline{A},B)}$ |
| 4 | Yule's Q | $\frac{P(A,B)P(\overline{AB})-P(A,\overline{B})P(\overline{A},B)}{P(A,B)P(\overline{AB})+P(A,\overline{B})P(\overline{A},B)} = \frac{\alpha-1}{\alpha+1}$ |
| 5 | Yule's Y | $\frac{\sqrt{P(A,B)P(\overline{AB})}-\sqrt{P(A,\overline{B})P(\overline{A},B)}}{\sqrt{P(A,B)P(\overline{AB})}+\sqrt{P(A,\overline{B})P(\overline{A},B)}} = \frac{\sqrt{\alpha}-1}{\sqrt{\alpha}+1}$ |
| 6 | Kappa ($\kappa$) | $\frac{P(A,B)+P(\overline{A},\overline{B})-P(A)P(B)-P(\overline{A})P(\overline{B})}{1-P(A)P(B)-P(\overline{A})P(\overline{B})}$ |
| 7 | Mutual Information (M) | $\frac{\sum_i \sum_j P(A_i,B_j)\log\frac{P(A_i,B_j)}{P(A_i)P(B_j)}}{\min(-\sum_i P(A_i)\log P(A_i), -\sum_j P(B_j)\log P(B_j))}$ |
| 8 | J-Measure (J) | $\max\left(P(A,B)\log(\frac{P(B|A)}{P(B)}) + P(A\overline{B})\log(\frac{P(\overline{B}|A)}{P(\overline{B})}),\right.$ $\left. P(A,B)\log(\frac{P(A|B)}{P(A)}) + P(\overline{A}B)\log(\frac{P(\overline{A}|B)}{P(\overline{A})})\right)$ |
| 9 | Gini index (G) | $\max\left(P(A)[P(B|A)^2 + P(\overline{B}|A)^2] + P(\overline{A})[P(B|\overline{A})^2 + P(\overline{B}|\overline{A})^2]\right.$ $- P(B)^2 - P(\overline{B})^2,$ $P(B)[P(A|B)^2 + P(\overline{A}|B)^2] + P(\overline{B})[P(A|\overline{B})^2 - P(\overline{A}|\overline{B})^2]$ $\left. - P(A)^2 - P(\overline{A})^2\right)$ |
| 10 | Support (s) | $P(A,B)$ |
| 11 | Confidence (c) | $\max(P(B|A), P(A|B))$ |
| 12 | Laplace (L) | $\max\left(\frac{NP(A,B)+1}{NP(A)+2}, \frac{NP(A,B)+1}{NP(B)+2}\right)$ |
| 13 | Conviction (V) | $\max\left(\frac{P(A)P(\overline{B})}{P(A\overline{B})}, \frac{P(B)P(\overline{A})}{P(B\overline{A})}\right)$ |
| 14 | Interest (I) | $\frac{P(A,B)}{P(A)P(B)}$ |
| 15 | cosine (IS) | $\frac{P(A,B)}{\sqrt{P(A)P(B)}}$ |
| 16 | Piatetsky-Shapiro's (PS) | $P(A,B) - P(A)P(B)$ |
| 17 | Certainty factor (F) | $\max\left(\frac{P(B|A)-P(B)}{1-P(B)}, \frac{P(A|B)-P(A)}{1-P(A)}\right)$ |
| 18 | Added Value (AV) | $\max(P(B|A) - P(B), P(A|B) - P(A))$ |
| 19 | Collective strength (S) | $\frac{P(A,B)+P(\overline{AB})}{P(A)P(B)+P(\overline{A})P(\overline{B})} \times \frac{1-P(A)P(B)-P(\overline{A})P(\overline{B})}{1-P(A,B)-P(\overline{AB})}$ |
| 20 | Jaccard ($\zeta$) | $\frac{P(A,B)}{P(A)+P(B)-P(A,B)}$ |
| 21 | Klosgen (K) | $\sqrt{P(A,B)}\max(P(B|A) - P(B), P(A|B) - P(A))$ |

Fig. 4

```
example:Product
    rdf:type owl:Class ;
    rdf:type sh:NodeShape ;
    sh:rule [
        rdf:type sh:TripleRule ;
        sh:condition [
            sh:property [
                sh:path example:size ;
                sh:in (
                    1
                    2
                    3
                ) ;
            ] ;
        ] ;
        sh:object example:SmallProduct ;
        sh:predicate rdf:type ;
        sh:subject sh:this ;
    ] ;
```

MACHINE LEARNING-BASED RELATIONSHIP ASSOCIATION AND RELATED DISCOVERY AND

CROSS-REFERENCE TO RELATED APPLICATIONS

This application is a continuation-in-part of and claims benefit of priority to U.S. patent application Ser. No. 15/609,800, filed May 31, 2017, entitled 'Machine Learning-Based Relationship Association and Related Discovery and Search Engines', which is a continuation-in-part of and claims benefit of priority U.S. patent application Ser. No. 15/351,256, filed Nov. 14, 2016, entitled 'Association Significance', which is a continuation of U.S. patent application Ser. No. 13/107,665, filed May 13, 2011, entitled 'Association Significance', now issued as U.S. Pat. No. 9,495,635 on Nov. 15, 2016, which claims priority to U.S. Provisional Application No. 61/445,236 filed Feb. 22, 2011, entitled 'Information Processing and Visualization Methods and Systems'; the present application is also a continuation-in-part of and claims benefit of priority to U.S. patent application Ser. No. 16/357,314, filed Mar. 18, 2019, entitled 'Entity Fingerprints', which is a continuation-in-part of and claims benefit of priority to U.S. patent application Ser. No. 15/077,713, filed Mar. 22, 2016, entitled 'Entity Fingerprints', issued as U.S. Pat. No. 10,235,425 on Mar. 19, 2019, which claims benefit of priority to U.S. patent application Ser. No. 14/834,317, filed Aug. 24, 2015, entitled 'Entity Fingerprints', to U.S. patent application Ser. No. 13/213,324, filed Aug. 19, 2011, entitled 'Entity Fingerprints', issued as U.S. Pat. No. 9,292,545 on Mar. 22, 2016, which claims the benefit of priority to U.S. Provisional Application No. 61/445,236, filed Feb. 22, 2011 entitled 'Information Processing and Visualization Methods and Systems', to U.S. Provisional Application No. 61/486,098, filed May 13, 2011, entitled 'Entity-Based Information Analysis', and to U.S. Provisional Application No. 61/519,592, filed May 25, 2011, entitled 'Entity-Based Information Analysis', and to U.S. patent application Ser. No. 13/107,665, filed May 13, 2011, issued as U.S. Pat. No. 9,495,635 on Nov. 25, 2016; the contents of each of which are incorporated herein in their entirety.

TECHNICAL FIELD

The invention relates generally to natural language processing, information extraction, information retrieval and text mining and more particularly to entity associations and to systems and techniques for identifying and measuring entity relationships and associations. The invention also relates to discovery and search interfaces to enhance linked data used in generating results for delivery in response to user input.

BACKGROUND

With computer-implemented word processing and mass data storage, the amount of information generated by mankind has risen dramatically and with an ever-quickening pace. As a result, there is a continuing and growing need to collect and store, identify, track, classify and catalogue, and link for retrieval and distribution this growing sea of information.

Much of the world's information or data is in the form of text, the majority of which is unstructured (without metadata or in that the substance of the content is not asymmetrical and unpredictable, i.e., prose, rather than formatted in predictable data tables). Much of this textual data is available in digital form [either originally created in this form or somehow converted to digital—by means of OCR (optical character recognition), for example] and is stored and available via the Internet or other networks. Unstructured text is difficult to effectively handle in large volumes even when using state of the art processing capabilities. Content is outstripping the processing power needed to effectively manage and assimilate information from a variety of sources for refinement and delivery to users. Although advances have made it possible to investigate, retrieve, extract and categorize information contained in vast repositories of documents, files, or other text "containers," systems are needed to more efficiently manage and classify the ever-growing volume of data generated daily and to more effectively deliver such information to consumers.

This proliferation of text-based information in electronic form has resulted in a growing need for tools that facilitate organization of the information and allow users to query systems for desired information. One such tool is information extraction software that, typically, analyzes electronic documents written in a natural language and populates a database with information extracted from such documents. Applied against a given textual document, the process of information extraction (IE) is used to identify entities of predefined types appearing within the text and then to list them (e.g., people, companies, geographical locations, currencies, units of time, etc.). IE may also be applied to extract other words or terms or strings of words or phrases.

Knowledge workers, such as scientists, lawyers, traders or accountants, have to deal with a greater than ever amount of data with an increased level of variety. Their information needs are often focused on entities and their relations, rather than on documents. To satisfy these needs, information providers must pull information from wherever it happens to be stored and bring it together in a summary result. As a concrete example, suppose a user is interested in companies with the highest operating profit in 2015 currently involved in Intellectual Property (IP) lawsuits. In order to answer this query, one needs to extract company entities from free text documents, such as financial reports and court documents, and then integrate the information extracted from different documents about the same company together.

Content and enhanced experience providers, such as Thomson Reuters Corporation, identify, collect, analyze and process key data for use in generating content, such as news articles and reports, financial reports, scientific reports and studies, law related reports, articles, etc., for consumption by professionals and others. The delivery of such content and services may be tailored to meet the particular interests of certain professions or industries, e.g., wealth managers and advisors, fund managers, financial planners, investors, scientists, lawyers, etc. Professional services companies, like Thomson Reuters, continually develop products and services for use by subscribers, clients and other customers and with such developments distinguish their products and services over those offered by their competition.

Companies, such as Thomson Reuters—with many businesses involved in delivery of content and research tools to aid a wide variety of research and professional service providers—generate, collect and store a vast spectrum of documents, including news, from all over the world. These companies provide users with electronic access to a system of databases and research tools. Professional services providers also provide enhanced services through various techniques to augment content of documents and to streamline searching and more efficiently deliver content of interest to users. For example, Thomson Reuters structures documents by tagging them with metadata for use in internal processes and for delivery to users.

"Term" refers to single words or strings of highly-related or linked words or noun phrases. "Term extraction" (also term recognition or term mining) is a type of IE process used to identify or find and extract relevant terms from a given document, and therefore have some relevance, to the content of the document. Such activities are often referred to as "Named Entity Extraction" and "Named Entity Recognition" and "Named Entity Mining" and in connection with additional processes, e.g., Calais "Named Entity Tagging" (or more generally special noun phrase tagger) and the like. There are differences in how these activities are performed. For example, term recognition might only require setting a flag when a certain expression is identified in a text span, while term extraction would be identifying it and its boundaries and writing it out for storage in, for example, a database, noting exactly where in the text it came from. Techniques employed in term extraction may include linguistic or grammar-based techniques, natural language or pattern recognition, tagging or structuring, data visualizing and predictive formulae. For example, all names of companies mentioned in the text of a document can be identified, extracted and listed. Similarly, events (e.g., Exxon-Valdez oil spill or BP Horizon explosion), sub-events related to events (e.g., cleanup effort associated with Exxon Valdez oil spill or BP Horizon explosion), names of people, products, countries, organizations, geographic locations, etc., are additional examples of "event" or "entity" type terms that are identified and may be included in a list or in database records. This IE process may be referred to as "event or entity extraction" or "event or entity recognition." As implemented, known IE systems may operate in terms of "entity" recognition and extraction wherein "events" are considered a type of entity and are treated as an entity along with individuals, companies, industries, governmental entities, etc.

There are a variety of methods available for automatic event or entity extraction, including linguistic or semantic processors to identify, based on known terms or applied syntax, likely noun phrases. Filtering may be applied to discern true events or entities from unlikely events or entities. The output of the IE process is a list of events or entities of each type and may include pointers to all occurrences or locations of each event and/or entity in the text from which the terms were extracted. The IE process may or may not rank the events/entities, process to determine which events/entities are more "central" or "relevant" to the text or document, compare terms against a collection of documents or "corpus" to further determine relevancy of the term to the document.

Systems and methods for identifying risks, entities, relationships, supply chains, and for generating visualizations related to risks, entities, relationships, and supply chains are described in at least: SYSTEMS, METHODS, AND SOFTWARE FOR ENTITY EXTRACTION AND RESOLUTION COUPLED WITH EVENT AND RELATIONSHIP EXTRACTION, U.S. patent application Ser. No. 12/341, 926, filed Dec. 22, 2008, Light et al.; SYSTEMS, METHODS, SOFTWARE AND INTERFACES FOR ENTITY EXTRACTION AND RESOLUTION AND TAGGING, U.S. patent application Ser. No. 12/806,116, filed Aug. 5, 2010, issued as U.S. Pat. No. 9,501,467, on Nov. 11, 2016, Light et al.; FINANCIAL EVENT AND RELATIONSHIP EXTRACTION, U.S. patent application Ser. No. 12/363, 524, filed Jan. 30, 2009, Schilder et al.; SYSTEMS, METHODS, AND SOFTWARE FOR ENTITY RELATIONSHIP RESOLUTION, U.S. patent application Ser. No. 12/341, 913, filed Dec. 22, 2008, issued as U.S. Pat. No. 9,600,509, on Mar. 1, 2017, Conrad et al.; METHODS AND SYSTEMS FOR MANAGING SUPPLY CHAIN PROCESSES AND INTELLIGENCE, U.S. patent application Ser. No. 13/594,864, filed Aug. 26, 2012, Siig et al.; METHODS AND SYSTEMS FOR GENERATING SUPPLY CHAIN REPRESENTATIONS, U.S. patent application Ser. No. 13/795,022, filed Mar. 12, 2013, Leidner et al.; and RISK IDENTIFICATION AND RISK REGISTER GENERATION SYSTEM AND ENGINE, U.S. patent application Ser. No. 15/181,194, filed Jun. 13, 2016, Leidner et al.; each and all of which are incorporated herein by reference in their entirety.

Thomson Reuters' Text Metadata Services group ("TMS") formerly known as ClearForest prior to acquisition in 2007, is one exemplary IE-based solution provider offering text analytics software used to "tag," or categorize, unstructured information and to extract facts about people, organizations, places or other details from news articles, Web pages and other documents. TMS's Calais is a web service that includes the ability to extract entities such as company, person or industry terms along with some basic facts and events. OpenCalais is an available community tool to foster development around the Calais web service. APIs (Application Programming Interfaces) are provided around an open rule development platform to foster development of extraction modules. Other providers include Autonomy Corp., Nstein and Inxight. Examples of Information Extraction software in addition to OpenCalais include: AlchemyAPI; CRF++; LingPipe; TermExtractor; TermFinder; and TextRunner. IE may be a separate process or a component or part of a larger process or application, such as business intelligence software.

Currently, the dominant technology for providing non-technical users with access to Linked Data is keyword-based search. This is problematic because keywords are often inadequate as a means for expressing user intent. In addition, while a structured query language can provide convenient access to the information needed by advanced analytics, unstructured keyword-based search cannot meet this extremely common need. This makes it harder than necessary for non-technical users to generate analytics.

What is needed is a natural language-based system that utilizes the benefits of structured query language capabilities to allow non-technical users to create well-formed questions.

Today, investment decisions in the financial markets require careful analysis of information available from multiple sources. To meet this challenge, financial institutions typical maintain very large datasets that provide a foundation for this analysis. For example, forecasting stock market, currency exchange rate, bank bankruptcies, understanding and managing financial risk, trading futures, credit rating, loan management, bank customer profiling, and money laundering analyses all require large datasets of information for analysis. The datasets of information can be structured datasets as well as unstructured data sets.

Typically, the datasets of information are used to model one or more different entities, each of which may have a relationship with other entities. For example, a company entity may be impacted by, and thereby have a relationship with, any of the following entities: a commodity or natural resource (e.g., aluminum, corn, crude oil, sugar, etc.), a source of the commodity or natural resource, a currency (e.g., euro, sterling, yen, etc.), and one or more competitor, supplier or customer. Any change in one entity can have an impact on another entity. For example, rising crude oil prices can impact a transportation company's revenues, which can affect the company's valuation. In another example, an acquisition of a supplier by a competitor puts an entity's supply chain at risk, as would political upheaval or natural disaster (e.g., tsunami, earthquake) affecting availability or operations of a supplier.

Given the quantity and nature of these datasets, each modeled entity tends to have multiple relationships with a large number of other entities. As such, it is difficult to identify which entities are more significant than others for a given entity.

Accordingly, there is a need for systems and techniques to automatically analyze all available supply chain related data to identify relationships and assign significance scores to entity relationships.

Event detection and relation extraction is an active field of academic research. State of the art systems employ statistical machine learning models to identify and classify relations between entities mentioned in natural language texts. Recently, deep learning-based systems have been shown to achieve similar quality, requiring less feature engineering. Knowledge base building systems make use of known machine learning models to create or augment knowledge graphs, depicting relations between entities.

What is needed is, a system configured to be applied to the identification of supply chain relationship between companies. Supply chain identification is still based on manual work and on extracting relations from structured data (financial reports, piers records etc.).

Supplier-Customer relations are very valuable to investors, among other interested classes of users, but are oftentimes hard to detect. Some information is available in structured data, but many more indications are available only in unstructured data, such as news stories, company SEC filings, blogs and company and other web sites. A lot of highly informative data is publicly available, but is too voluminous and unfeasible for manual processing to systematically identify supply chain relations.

Accordingly, what is needed is an automated system capable of processing the large volumes of available data to detect indications for supply chain relationship between companies and aggregate these indications across data sources to generate a single confidence score for the relation between such companies.

SUMMARY

Over the past few decades the amount of electronic data has grown to massive levels and the desire to search, manipulate, assimilate and otherwise make full use of such data has grown in kind. Such growth will only increase over the foreseeable future with sources of data growing rapidly. Not all data is in the same format or language and some data is structured (including metadata, i.e., data concerning or about the document, subjects of the document, source of data, field descriptors, signature data, etc.) and some data is unstructured, e.g., free text. Given data reaching an unprecedented amount, coming from diverse sources, and covering a variety of domains in heterogeneous formats, information providers are faced with the critical challenge to process, retrieve and present information to their users to satisfy their complex information needs. In one manner of implementation, the present invention is used in a family of services for building and querying an enterprise knowledge graph in order to address this challenge. We first acquire data from various sources via different approaches. Furthermore, we mine useful information from the data by adopting a variety of techniques, including Named Entity Recognition (NER) and Relation Extraction (RE); such mined information is further integrated with existing structured data (e.g., via Entity Linking (EL) techniques) to obtain relatively comprehensive descriptions of the entities. Modeling the data as an RDF graph model enables easy data management and embedding of rich semantics in processed data. Finally, to facilitate the querying of this mined and integrated data, i.e., the knowledge graph, the invention is described with a natural language interface, e.g., Thomson Reuters Discover, that allows users to ask questions of the knowledge graph in their own words; these natural language questions are translated into executable queries for answer retrieval.

The present invention provides a system configured to automatically and systematically access numerous data sources and process large volumes of natural unstructured texts to identify supply chain relations between companies. In addition to Natural Language Processing (NLP) features, as typically used in academic relation extraction works, the present invention includes processes adapted to consider additional information, such as from available knowledge graphs, to enhance accuracy and efficiency. Knowledge graphs are known and offered by several companies with some being public facing and others private or proprietary or available as part of a fee-based service. A knowledge graph comprises semantic-search information from a variety of sources, including public and private sources, and often is used as part of a search engine/platform. A knowledge graph is dynamic in that it is updated, preferably in real time, upon entity/member profile changes and upon identifying and adding new entities/members.

For example, Thomson Reuters includes as part of its service offerings a Knowledge Graph facility that may be used by the present invention in connection with delivery of services, such as via Thomson Reuters Eikon platform. In this manner, the present invention may be used in a system to build supply chain graphs to feed Eikon value chain offering by using proprietary, authority information, e.g., industries and past information about supply chain between a set of companies (either from evidence previously discovered by the system or from manually curated data), to reliably compute a confidence score. The invention may be used to extract supplier-customer relations from news stories, newsroom sources, blogs, company web sites, and company SEC filings, building a knowledge graph and exposing it via Eikon. The invention is used in a system preferably capable of being scaled to handle additional/different document sources and aggregate multiple evidences to one confidence score. A search engine may be used as a vehicle to allow users to enter company names of interest and to yield a set of supply chain related relationship data of interest to the user. Other companies that have knowledge graph facilities include Google, Microsoft Bing Satori, Yahoo!, Baidu, LinkedIn, Yandex Object Answer, and others.

Systems and techniques for determining significance between entities are disclosed. The systems and techniques identify a first entity having a relationship or an association with a second entity, apply a plurality of relationship or association criteria to the relationship/association, weight each of the criteria based on defined weight values, and compute a significance score for the first entity with respect to the second entity based on a sum of a plurality of weighted criteria values. The system identifies text representing or signifying a connection between two or more entities and in particular in the context of a supply chain environment. As used herein the terms "association" and "relationship" include their respective ordinary meanings and as used include the meaning of one within the other. The systems and techniques, including deep learning and machine learning processes, utilize information, including unstructured text data from disparate sources, to create one or more uniquely powerful informational representations including in the form of signals, feed, knowledge graphs, supply chain graphical interfaces and more. The systems and techniques disclosed can be used to identify and quantify the significance of relationships (e.g., associations) among various entities including, but not limited to, organizations, people, products, industries, geographies, commodities, financial indicators, economic indicators, events, topics, subject codes, unique identifiers, social tags, industry terms, general terms, metadata elements, classification codes, and combinations thereof.

The present invention provides a method and system to automatically identify supply chain relationships between companies and/or entities, based on, among other things, unstructured text corpora. The system combines Machine Learning and/or deep learning models to identify sentences mentioning or referencing or representing a supply chain connection between two companies (evidence). The present invention also applies an aggregation layer to take into account the evidence found and assign a confidence score to the relationship between companies. This supply chain relationship information and aggregation data may be used to build and present one or more supply chain graphical representations and/or knowledge graphs.

The invention may use specific Machine Learning features and make use of existing supply chain knowledge and other information in generating and presenting knowledge graphs, e.g., in connection with an enterprise content platform such as Thomson Reuters Eikon. The invention identifies customer-supplier relations, which feeds the Eikon value chain module and allows Eikon users to investigate relations which might affect companies of interest and generate a measure of performance on a risk-adjusted basis "Alpha." The invention may also be used in connection with other technical risk ratios or metrics, including beta, standard deviation, R-squared, and the Sharpe ratio. In this manner, the invention may be used, particularly in the supply chain/distribution risk environment, to provide or enhance statistical measurements used in modern portfolio theory to help investors determine a risk-return profile.

The present invention provides, in one exemplary manner of operation, a Supply Chain Analytics & Risk "SCAR" (aka "Value Chains") engine or application adapted to exploit vast amounts of structured and unstructured data across news, research, filings, transcripts, industry classifications, and economics. The Machine Learning and aggregating features of the present invention may be used to fine-tune existing text analytics technologies (e.g., Thomson Reuters Eikon and DataScope data and analytics platforms) to develop an improved Supply Chain Analytics and Risk offering within such platforms. The present invention utilizes supply chain data to deliver enhanced supply chain relationship feeds and tools to professionals for use in advising clients and making decisions. For example, the invention may be used to deliver information and tools to financial professionals looking for improved insights in their search for investment opportunities and returns, while better understanding risk in their portfolios. Supply chain data can create value for several different types of users and use cases. In one example, the invention enables research analysts on both buy and sell sides to leverage supply chain data to gain insights into revenue risks based on relationships and geographic revenue distribution. Also, the invention provides portfolio managers with a new insightful view of risks and returns of their portfolio by providing "supply chain" driven views of their holdings. In addition, the invention enables quant analysts and Hedge Funds to leverage supply chain data to build predictive analytics on performance of companies based on overall supply chain performance. Traders can use information and tools delivered in connection with the invention to, for example, track market movement of prices by looking at intra-supply arbitrage opportunities (e.g., effect of revenue trends from suppliers through distributors) and second-order impact of breaking news.

In a first embodiment, the present invention provides a system for providing remote users over a communication network supply-chain relationship data via a centralized Knowledge Graph user interface, the system comprising: a Knowledge Graph data store comprising a plurality of Knowledge Graphs, each Knowledge Graph related to an associated entity, and including a first Knowledge Graph associated with a first company and comprising supplier-customer data; an input adapted to receive electronic documents from a plurality of data sources via a communications network, the received electronic documents including unstructured text; a pre-processing interface adapted to perform one or more of named entity recognition, relation extraction, and entity linking on the received electronic documents and generate a set of tagged data, and further adapted to parse the electronic documents into sentences and identify a set of sentences with each identified sentence having at least two identified companies as an entity-pair; a pattern matching module adapted to perform a pattern-matching set of rules to extract sentences from the set of sentences as supply chain evidence candidate sentences; a classifier adapted to utilize natural language processing on the supply chain evidence candidate sentences and calculate a probability of a supply-chain relationship between an entity-pair associated with the supply chain evidence candidate sentences; and an aggregator adapted to aggregate at least some of the supply chain evidence candidates based on the calculated probability to arrive at an aggregate evidence score for a given entity-pair, wherein a Knowledge Graph associated with at least one company from the entity-pair is generated or updated based at least in part on the aggregate evidence score.

The system of the first embodiment may also be characterized in one or more of the following ways. The system may further comprise a user interface adapted to receive an input signal from a remote user-operated device, the input signal representing a user query, wherein an output is generated for delivery to the remote user-operated device and related to a Knowledge Graph associated with a company in response to the user query. The system may further comprise a query execution module adapted to translate the user query into an executable query set and execute the executable query set to generate a result set for presenting to the user via the remote user-operated device. The system may further comprise a graph-based data model for describing entities and relationships as a set of triples comprising a subject, predicate and object and stored in a triple store. The graph-based data model may be a Resource Description Framework (RDF) model. The triples may be queried using SPARQL query language. The system may further comprise a fourth element added to the set of triples to result in a quad. The system may further comprise a machine learning-based algorithm adapted to detect relationships between entities in an unstructured text document. The classifier may predict a probability of a relationship based on an extracted set of features from a sentence. The extracted set of features may include context-based features comprising one or more of n-grams and patterns. The system may further comprise wherein updating the Knowledge Graph is based on the aggregate evidence score satisfying a threshold value. The pre-processing interface may further be adapted to compute significance between entities by: identifying a first entity and a second entity from a plurality of entities, the first entity having a first association with the second entity, and the second entity having a second association with the first entity; weighting a plurality of criteria values assigned to the first association, the plurality of criteria values based on a plurality of association criteria selected from the group consisting essentially of interestingness, recent interestingness, validation, shared neighbor, temporal significance, context consistency, recent activity, current clusters, and surprise element; and computing a significance score for the first entity with respect to the second entity based on a sum of the plurality of weighted criteria values for the first association, the significance score indicating a level of significance of the second entity to the first entity.

In a second embodiment, the present invention provides A method for providing remote users over a communication network supply-chain relationship data via a centralized Knowledge Graph user interface, the method comprising: storing at a Knowledge Graph data store a plurality of Knowledge Graphs, each Knowledge Graph related to an associated entity, and including a first Knowledge Graph associated with a first company and comprising supplier-customer data; receiving, by an input, electronic documents from a plurality of data sources via a communications network, the received electronic documents including unstructured text; performing, by a pre-processing interface, one or more of named entity recognition, relation extraction, and entity linking on the received electronic documents and generate a set of tagged data, and further adapted to parse the electronic documents into sentences and identify a set of sentences with each identified sentence having at least two identified companies as an entity-pair; performing, by a pattern matching module, a pattern-matching set of rules to extract sentences from the set of sentences as supply chain evidence candidate sentences; utilizing, by a classifier, natural language processing on the supply chain evidence candidate sentences and calculate a probability of a supply-chain relationship between an entity-pair associated with the supply chain evidence candidate sentences; and aggregating, by an aggregator, at least some of the supply chain evidence candidates based on the calculated probability to arrive at an aggregate evidence score for a given entity-pair, wherein a Knowledge Graph associated with at least one company from the entity-pair is generated or updated based at least in part on the aggregate evidence score.

The method of the second embodiment may further comprise receiving, by a user interface, an input signal from a remote user-operated device, the input signal representing a user query, wherein an output is generated for delivery to the remote user-operated device and related to a Knowledge Graph associated with a company in response to the user query; and translating, by a query execution module, the user query into an executable query set and execute the executable query set to generate a result set for presenting to the user via the remote user-operated device. The method may further comprise describing, by a graph-based data model, entities and relationships as a set of triples comprising a subject, predicate and object and stored in a triple store. The graph-based data model may be a Resource Description Framework (RDF) model. The triples may be queried using SPARQL query language. The method may further comprise a fourth element added to the set of triples to result in a quad. The method may further comprise detecting, by a machine learning-based algorithm, relationships between entities in an unstructured text document. The predicting, by the classifier, may further comprise a probability of a relationship is based on an extracted set of features from a sentence. The extracted set of features may include context-based features comprising one or more of n-grams and patterns. The updating the Knowledge Graph may be based on the aggregate evidence score satisfying a threshold value. The method may further comprise: identifying, by the pre-processing interface, a first entity and a second entity from a plurality of entities, the first entity having a first association with the second entity, and the second entity having a second association with the first entity; weighting, by the pre-processing interface, a plurality of criteria values assigned to the first association, the plurality of criteria values based on a plurality of association criteria selected from the group consisting essentially of interestingness, recent interestingness, validation, shared neighbor, temporal significance, context consistency, recent activity, current clusters, and surprise element; and computing, by the pre-processing interface, a significance score for the first entity with respect to the second entity based on a sum of the plurality of weighted criteria values for the first association, the significance score indicating a level of significance of the second entity to the first entity.

In a third embodiment, the present invention provides a system for automatically identifying supply chain relationships between companies based on unstructured text and for generating Knowledge Graphs. The system comprises: a Knowledge Graph data store comprising a plurality of Knowledge Graphs, each Knowledge Graph related to an associated company, and including a first Knowledge Graph associated with a first company and comprising supplier-customer data; a machine-learning module adapted to identify sentences containing text data representing at least two companies, to determine a probability of a supply chain relationship between a first company and a second company, and to generate a value representing the probability; an aggregation module adapted to aggregate a set of values determined by the machine-learning module representing a supply chain relationship between the first company and the second company and further adapted to generate and aggregate evidence score representing a degree of confidence in the existence of the supply chain relationship.

In another embodiment, the present invention provides a system for providing remote users connected to a central server over a communications network semantically-defined relationship information for a set of entities, the system comprising: a directed graph data store comprising a plurality of directed graphs, each directed graph respectively related to an entity associated with a primary identifier, and including a first directed graph related to a first entity associated with a first primary identifier and comprising a set of relationship data and a first entity node representing the first entity; an input adapted to receive via the communications network a plurality of electronic documents comprising unstructured text; a pre-processing interface adapted to: extract, from the unstructured text of the electronic documents, a subject entity, a predicate relationship, and an object; and generate a triple comprising the subject entity, the predicate relationship, and the object; an identification module adapted to generate a second directed graph based in part on the triple and comprising a subject entity node representing the subject entity, a vertex representing the predicate relationship, and an object node representing the object, the identification module further adapted to associate the first primary identifier with the subject entity; and a semantic module adapted to merge the first directed graph with the second directed graph to generate a third directed graph representing a data shape, the merging based on comparing the triple to the set of relationship data in the first directed graph and combining the subject entity node with the first entity node based on the first primary identifier, the semantic module further adapted to store the third directed graph in the directed graph data store.

The system of the above embodiment may further comprise wherein the pre-processing is optimized based on one of content type, metadata information, or use case. Each directed graph in the plurality of directed graphs may be associated with a content set, the content set comprising a set of example data fields and a set of example relationships. The plurality of directed graphs may comprise Knowledge Graphs. The system may further comprise a display module adapted to provide a user interface comprising the first directed graph, the second directed graph, and the third directed graph. The first primary identifier may be one of a Uniform Resource Identifier or a PermID. The semantic module may be a semantic web toolkit comprising a uniform resource identifier ("URI") system and language, a resource description framework ("RDF") system, an open world assumption language ("OWL"), and a shapes constraint language ("SHACL"). The OWL may be adapted to identify an additional relationship between one or more of the subject entity, the predicate relationship, the object, the first entity, and the set of relationship data based on one or both of a relationship restriction and a relationship inverse. The SHACL may be adapted to constrain the merging of the first directed graph and the second directed graph based on a set of defined constraints. The semantic module may be a semantic web toolkit comprising a resource description framework schema ("RDFS") and a SPARQL protocol and RDF query language ("SPARQL").

In another embodiment, the present invention provides a method for providing remote users connected to a central server over a communications network semantically-defined relationship information for a set of entities, the system comprising: storing a plurality of directed graphs in a directed graph data store, each directed graph related to an entity identified by a primary identifier, and including a first directed graph related to a first entity associated with a first primary identifier and comprising a set of relationship data and a first entity node representing the first entity; receiving via the communications network electronic documents comprising unstructured text; extracting, by a pre-processing interface, a subject entity, a predicate relationship, and an object from the unstructured text of the received electronic documents; generating, by the pre-processing interface, a triple comprising the subject entity, the predicate relationship, and the object; generating, by an identification module, a second directed graph based in part on the triple and comprising a subject entity node representing the subject entity, a vertex representing the predicate relationship, and an object node representing the object; associating, by the identification module, the first primary identifier with the subject entity; merging, by a semantic module, the first directed graph with the second directed graph to generate a third directed graph, the merging based on comparing the triple to the set of relationship data in the first directed graph and combining the subject entity node with the first entity node based on the first primary identifier, wherein the third directed graph generated by the merging of the first directed graph and the second directed graph represents a data shape; and storing the third directed graph in the directed graph data store.

In the method of the above embodiment, the pre-processing interface may be optimized based on one of content type, metadata information, or use case. Each directed graph in the plurality of directed graphs may be associated with a content set, the content set comprising a set of example data fields and a set of example relationships. The plurality of directed graphs may comprise Knowledge Graphs. The method may further comprise providing, by a display module, a user interface comprising the first directed graph, the second directed graph, and the third directed graph. The first primary identifier may be one of a Uniform Resource Identifier or a PermID. The semantic module may be a semantic web toolkit comprising a uniform resource identifier ("URI") system and language, a resource description framework ("RDF") system, an open world assumption language ("OWL"), and a shapes constraint language ("SHACL"). The method may further comprise identifying, by the OWL, an additional relationship between one or more of the subject entity, the predicate relationship, the object, the first entity, and the set of relationship data based on one or both of a relationship restriction and a relationship inverse. The method may further comprise constraining, by the SHACL, the merging of the first directed graph and the second directed graph based on a set of defined constraints. The semantic module may be a semantic web toolkit comprising a resource description framework schema ("RDFS") and a SPARQL protocol and RDF query language ("SPARQL").

Additional systems, methods, as well as articles that include a machine-readable medium storing machine-readable instructions for implementing the various techniques, are disclosed. Details of various implementations are discussed in greater detail below.

BRIEF DESCRIPTION OF THE DRAWINGS

FIG. 4 illustrates exemplary interestingness measures.

FIGS. 21-29 provide a block diagram and illustrations of elements of a semantic web toolkit including URI, RDF, RDFS, OWL, SHACL, and SPARQL elements according to an embodiment of the present invention.

Like reference symbols in the various drawings indicate like elements.

DETAILED DESCRIPTION

Figure 1:
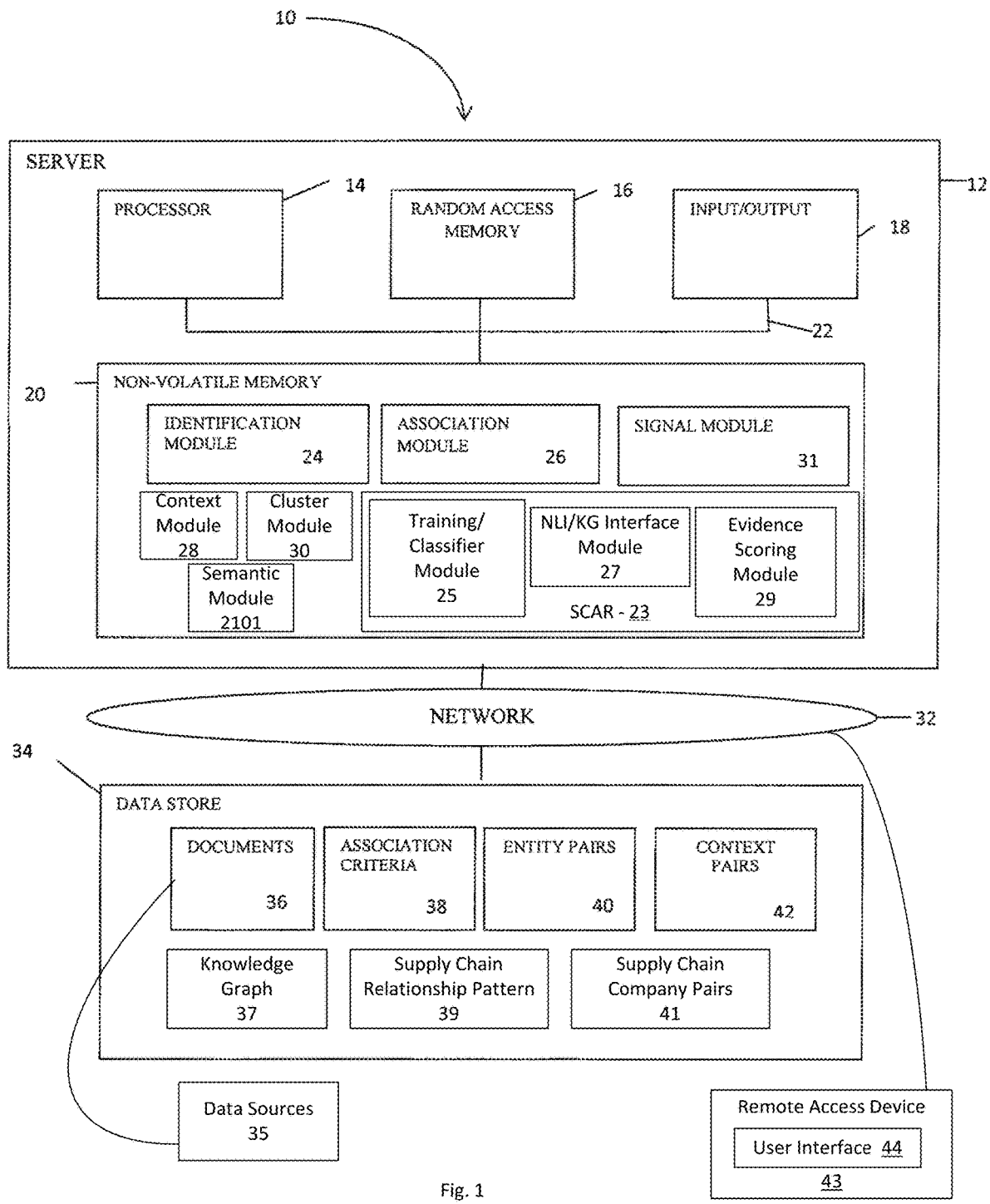
FIG. 1 is a schematic of an exemplary computer-based system for computing connection significance between entities.

Turning now to FIG. 1, an example of a suitable computing system 10 within which embodiments of the present invention may be implemented is disclosed. The computing system 10 is only one example and is not intended to suggest any limitation as to the scope of use or functionality of the invention. Neither should the computing system 10 be interpreted as having any dependency or requirement relating to any one or combination of illustrated components.

For example, the present invention is operational with numerous other general purpose or special purpose computing consumer electronics, network PCs, minicomputers, mainframe computers, laptop computers, as well as distributed computing environments that include any of the above systems or devices, and the like.

The invention may be described in the general context of computer-executable instructions, such as program modules, being executed by a computer. Generally, program modules include routines, programs, objects, components, data structures, loop code segments and constructs, etc. that perform particular tasks or implement particular abstract data types. The invention can be practiced in distributed computing environments where tasks are performed by remote processing devices that are linked through a communications network. In a distributed computing environment, program modules are located in both local and remote computer storage media including memory storage devices. Tasks performed by the programs and modules are described below and with the aid of figures. Those skilled in the art can implement the description and figures as processor executable instructions, which can be written on any form of a computer readable media.

In one embodiment, with reference to FIG. 1, the system 10 includes a server device 12 configured to include a processor 14, such as a central processing unit ('CPU'), random access memory (RAM') 16, one or more input-output devices 18, such as a display device (not shown) and keyboard (not shown), and non-volatile memory 20, all of which are interconnected via a common bus 22 and controlled by the processor 14.

As shown in the FIG. 1 example, in one embodiment, the non-volatile memory 20 is configured to include an identification module 24 for identifying entities from one or more sources. The entities identified may include, but are not limited to, organizations, people, products, industries, geographies, commodities, financial indicators, economic indicators, events, topic codes, subject codes, unique identifiers, social tags, industry terms, general terms, metadata elements, and classification codes. An association module 26 is also provided for computing a significance score for an association between entities, the significance score being an indication of the level of significance a second entity to a first entity.

In one embodiment, a context module 28 is provided for determining a context (e.g., a circumstance, background) in which an identified entity is typically referenced in or referred to, a cluster module 30 for clustering (e.g., categorizing) identified entities, and a signal module 31 for generating and transmitting a signal associated with the computed significance score. Additional details of these modules 24, 26, 28, 30 and 32 are discussed in connection with FIGS. 2, 3 and 4.

Figure 7:
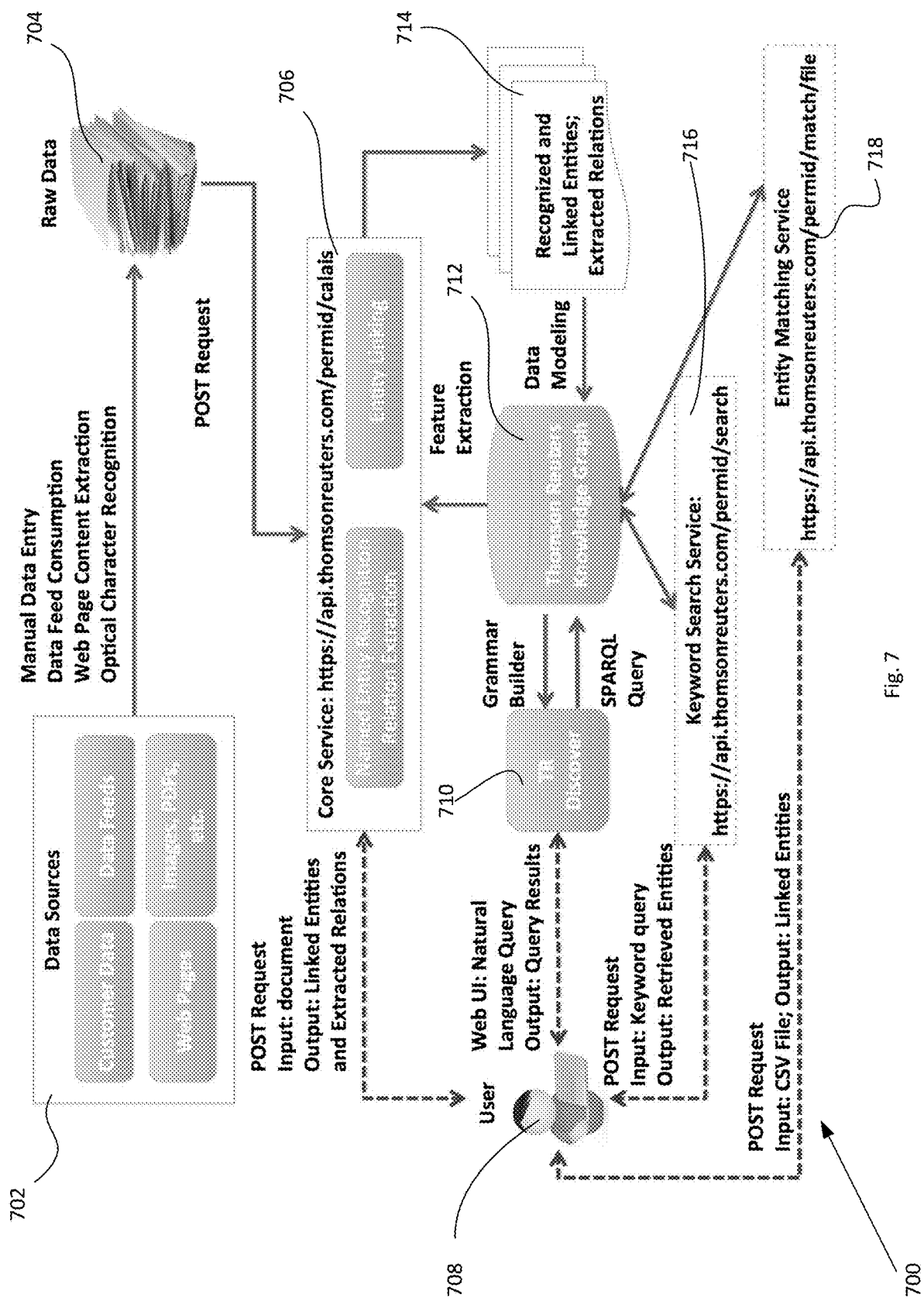

In a further embodiment, Server 12 may include in non-volatile memory 20 a Supply Chain Analytics & Risk "SCAR" (aka "Value Chains") engine 23, as discussed in detail hereinbelow, in connection with determining supply chain relationships among companies and providing other enriching data for use by users. SCAR 23 includes, in this example, a training/classifier module 25, Natural Language Interface/Knowledge Graph Interface Module 27 and Evidence Scoring Module 29 for generating and updating Knowledge Graphs associated with companies. The training/classifier module 25 may be a machine-learning classifier configured to predict the probability of possible customer/supplier relationships between an identified company-pair. The classifier may use set(s) of patterns as filters and extract feature sets at a sentence-level, e.g., context-based features such as token-level n-grams and patterns. Other features based on transformations and normalizations and/or information from existing Knowledge Graph data may be applied at the sentence-level. Evidence Scoring Module 29 may be used to score the detected and identified supply-chain relationship candidate sentence/company pair and may include an aggregator, discussed in detail below, to arrive at an aggregate evidence score. The SCAR 25 may then update the Knowledge Graph(s) associated with one or both of the companies of the subject company-pair. In one exemplary manner of operation, the SCAR 23 may be accessed by one or more remote access device 43. A user interface 44 operated by a user at access device 43 may be used for querying or otherwise interrogating the Knowledge Graph via Natural Language Interface/Knowledge Graph Interface Module 27 for responsive information, e.g., use of SPARQL query techniques. Responsive data outputs may be generated at the Server 12 and returned to the remote access device 43 and presented and displayed to the associated user. FIG. 7 illustrates several exemplary input/output scenarios.

As shown in FIG. 1, in one embodiment, a network 32 is provided that can include various devices such as routers, server, and switching elements connected in an Intranet, Extranet or Internet configuration. In one embodiment, the network 32 uses wired communications to transfer information between an access device (not shown), the server device 12, and a data store 34. In another embodiment, the network 32 employs wireless communication protocols to transfer information between the access device, the server device 12, and the data store 34. In yet other embodiments, the network 32 employs a combination of wired and wireless technologies to transfer information between the access device, the server device 12, and the data store 34.

The data store 34 is a repository that maintains and stores information utilized by the before-mentioned modules 24, 26, 28, 30 and 31. In one embodiment, the data store 34 is a relational database. In another embodiment, the data store 34 is a directory server, such as a Lightweight Directory Access Protocol ('LDAP'). In yet another embodiment, the data store 34 is an area of non-volatile memory 20 of the server 12.

In one embodiment, as shown in the FIG. 1 example, in one embodiment, the data store 34 includes a set of documents 36 that are used to identify one or more entities. As used herein, the words 'set' and 'sets' refer to anything from a null set to a multiple element set. The set of documents 36 may include, but are not limited to, one or more papers, memos, treatises, news stories, articles, catalogs, organizational and legal documents, research, historical documents, policies and procedures, business documents, and combinations thereof. In another embodiment, the data store 34 includes a structured data store, such as a relational or hierarchical database, that is used to identify one or more entities. In yet another embodiment, sets of documents and structured data stores are used to identify one or more entities.

A set of association criteria 38 is provided that comprises contingency tables used by the association module 26 to compute a significance score for an identified relationship between entities. In one embodiment, the contingency tables are associated with a set of interestingness measures that are used by the association module 26 to compute the significance score. An example of interestingness measures, along with each respective formulation, is shown in connection with FIG. 4.

The data store 34 also includes a set of entity pairs 40. Each pair included in the set of entity pairs 40 represents a known relationship existing between at least two identified entities. In one embodiment, the relationship is identified by an expert upon reviewing one of the set of documents 36. In another embodiment, the relationship is identified from the one or more set of documents 36 using a computer algorithm included in the context module 28. For example, upon reviewing a news story, an expert and/or the context module 28 may identify the presence of two entities occurring in the same news story, As shown in FIG. 1, in one embodiment, a set of context pairs 42 are also provided. Each of the set of context pairs 42 represents a context that exists between at least two entities. For example, whenever a particular topic or item is discussed in a news story, the two entities also are mentioned in the same news story. Similar to the set of entity pairs 40 discussed previously, the set of context pairs may also be identified by an expert, or a computer algorithm included in the context module 28. Additional details concerning information included in the data store 34 are discussed in greater detail below.

In the further embodiment of Server 12 having SCAR 23, data store 34 also includes Knowledge Graph store 37, Supply Chain Relationship Pattern store 39 and Supply Chain Company Pair store 41. Documents store 36 receives document data from a variety of sources and types of sources including unstructured data that may be enhanced and enriched by SCAR 23. For example, data sources 35 may include documents from one or more of Customer data, Data feeds, web pages, images, PDF files, etc., and may involve optical character recognitions, data feed consumption, web page extraction, and even manual data entry or curation. SCAR 23 may then pre-process the raw data from data sources including, e.g., application of OneCalais or other Named Entity Recognition (NER), Relation Extraction (ER), or Entity Linking (EL), processes. These processes are described in detail below.

Although the data store 34 shown in FIG. 1 is connected to the network 32, it will be appreciated by one skilled in the art that the data store 34 and/or any of the information shown therein, can be distributed across various servers and be accessible to the server 12 over the network 32, be coupled directly to the server 12, or be configured in an area of non-volatile memory 20 of the server 12.

Further, it should be noted that the system 10 shown in FIG. 1 is only one embodiment of the disclosure. Other system embodiments of the disclosure may include additional structures that are not shown, such as secondary storage and additional computational devices. In addition, various other embodiments of the disclosure include fewer structures than those shown in FIG. 1. For example, in one embodiment, the disclosure is implemented on a single computing device in a non-networked standalone configuration. Data input and requests are communicated to the computing device via an input device, such as a keyboard and/or mouse. Data output, such as the computed significance score, of the system is communicated from the computing device to a display device, such as a computer monitor.

Figure 2:
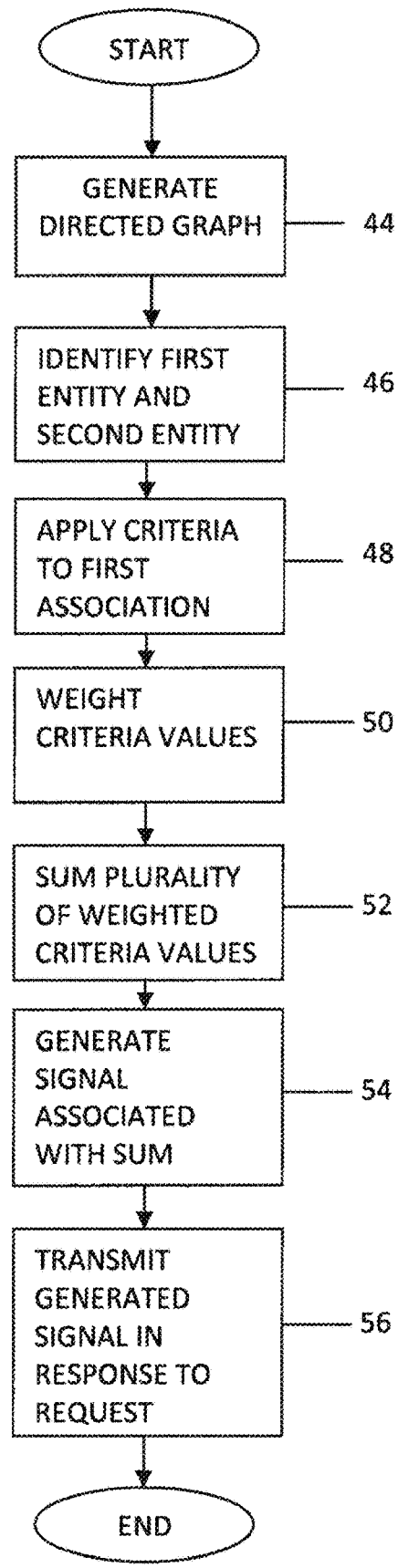
FIG. 2 illustrates an exemplary method for determining connection significance between entities according to one embodiment of the invention.

Turning now to FIG. 2, an example method for determining connection significance between entities is disclosed. As shown in the FIG. 2 example, at step 44, the identification module 24 first generates a directed graph to represent entities identified in each of the set of documents 36. In one embodiment, the identification module 24 determines a frequency and co-occurrence of each entity in each of the set of documents 36, and then generates a contingency table to record and determine associations. The set of documents may be structured documents, including but not limited to eXtensible Markup Language (XML) files, as well as unstructured documents including, but not limited to articles and news stories. As described previously, the present invention is not limited to only using a set of documents to identify entities. For example, the present invention may use structured data stores including, but not limited to, relational and hierarchical databases, either alone or in combination with the set of documents to identify entities.

Further, it will be appreciated that the present invention is not limited to a directed graph implementation, and that other computer-implemented data structures capable of modeling entity relationships may be used with the present invention, such as a mixed graph and multi graph.

Figure 3:
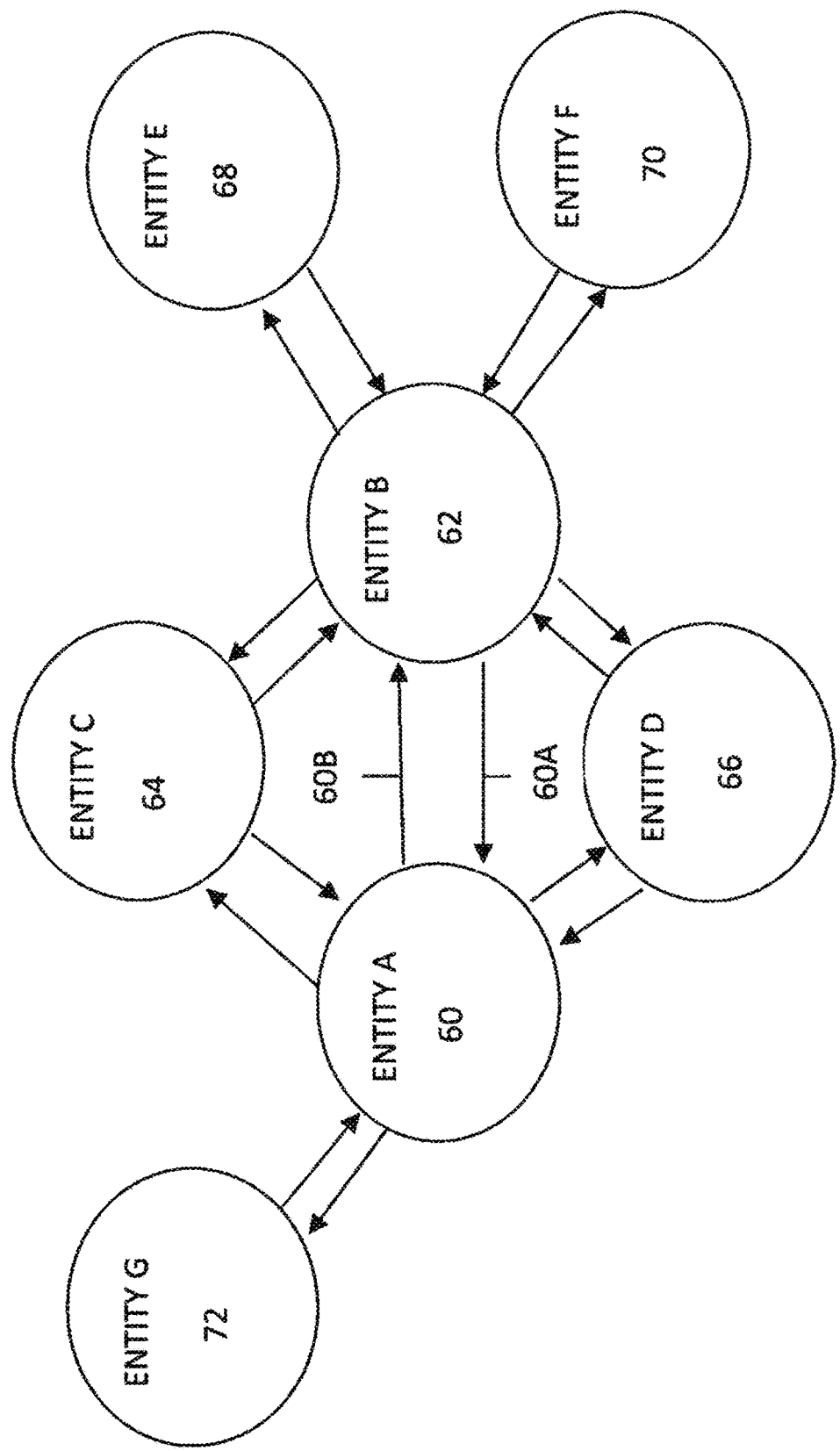
FIG. 3 is a schematic of an exemplary directed graph.

A schematic of an exemplary directed graph generated by the identification module 24 is shown in connection with FIG. 3. Each node 60, 62, 64, 66, 68, 70 and 72 of the graph represents an entity identified from one or more of the set of documents, and vertices (e.g., edges) of each node represent an association (e.g., relationship) between entities. For example, as shown in the FIG. 3 example, Entity A 60 has a first association 60A with Entity B 62 indicating a level of significance of Entity B 62 to Entity A 60, and a second association 60B with Entity B 62 indicating a level of significance of Entity A 60 to Entity B 62.

Referring back to FIG. 2, at step 46, the identification module 24 next identifies a first entity and at least one second entity from the directed graph. In one embodiment, the first entity is included in a user request and the second entity is determined by the identification module 24 using a depth-first search of the generated graph. In another embodiment, the identification module 24 uses the depth-first search on each node (e.g., first entity) of the graph to determine at least one other node (e.g., second entity).

Next, at step 48, once the first entity and second entity are identified, the association module 26 applies a plurality of association criteria 38 to one of the associations between the first entity and the second entity. The plurality of association criteria 38 include, but are not limited to, the following set of criteria: interestingness, recent interestingness, validation, shared neighbor, temporal significance, context consistency, recent activity, current clusters, and surprise element. Once the association criteria are applied, the association module 28 assigns criteria values to each of the association criteria.

For example, in one embodiment, the association module 26 may apply the interestingness criteria to the first association. Interestingness criteria are known to one skilled in the art and as a general concept, may emphasize conciseness, coverage, reliability, peculiarity, diversity, novelty, surprisingness, utility, and actionability of patterns (e.g., relationships) detected among entities in data sets. In one embodiment, the interestingness criteria is applied by the association module 26 to all associations identified from the set of documents 36 and may include, but is not limited to, one of the following interestingness measures: correlation coefficient, Goodman-Kruskal's lambda ($\lambda$), Odds ratio ($\alpha$), Yule's Q, Yule's Y, Kappa ($\kappa$), Mutual Information (M), J-Measure (J), Gini-index (G), Support (s), Confidence (c), Laplace (L), Conviction (V), Interest (I), cosine (IS), Piatetsky-shaporo's (PS), Certainty factor (F), Added Value (AV), Collective Strength (S), Jaccard Index, and Klosgen (K). Once the interestingness criteria is applied to the first association, the association module 26 assigns a value to the interestingness criteria based on the interestingness measure.

A list of example interestingness measures with accompanied formulas used by the association module 26 is shown is shown in connection with FIG. 4. As shown in the FIG. 4 example, one of the interestingness measures includes a correlation coefficient ($\Phi$-coefficient) that measures the degree of linear interdependency between a pair of entities, represented by A and B in FIG. 4, respectively. The correlation coefficient is defined by the covariance between two entities divided by their standard deviations. The correlation coefficient equals zero (0) when entity A and entity B are independent and may range from minus one (−1) to positive one (+1).

In one embodiment, the association module 26 applies the recent interestingness criteria to the first association. The recent interestingness criteria may be applied by the association module 26 to associations identified from a portion of the set of documents 36 and/or a portion of a structured data store. The portion may be associated with a configurable pre-determined time interval. For example, the association module 26 may apply the recent interestingness criteria to only associations between entities determined from documents not older than six (6) months ago. Similar to the before-mentioned interestingness criteria, the recent interestingness criteria may include, but is not limited to, one of the following interestingness measures: correlation coefficient, Goodman-Kruskal's lambda ($\lambda$), Odds ratio ($\alpha$), Yule's Q, Yule's Y, Kappa ($\kappa$), Mutual Information (M), J-Measure (J), Gini-index (G), Support (s), Confidence (c), Laplace (L), Conviction (V), Interest (I), cosine (IS), Piatetsky-shaporo's (PS), Certainty factor (F), Added Value (AV), Collective Strength (S), Jaccard Index, and Klosgen (K). Once the recent interestingness criteria is applied to the first association, the association module 26 assigns a value to the recent interestingness criteria based on the interestingness measure.

The association module 26 may apply the validation criteria to the first association. In one embodiment, the association module 26 determines whether the first entity and the second entity co-exist as an entity pair in the set of entity pairs 40. As described previously, each of the entity pairs defined in the set of entity pairs 40 may be previously identified as having a relationship with one another. Based on the determination, the association module 26 assigns a value to the validation criteria indicating whether or not the first entity and the second entity exist as pair entities in the set of entity pairs 40.

The association module 26 may apply the shared neighbor criteria to the first association. In one embodiment, the association module 26 determines a subset of entities having edges extending a pre-determined distance from the first entity and the second entity. The subset of entities represents an intersection of nodes neighboring the first and second entity. The association module 26 then computes an association value based at least in part on a number of entities included in the subset of entities, and assigns a value to the shared neighbor criteria based on the computed association value.

For example, referring to FIG. 3 and assuming a pre-determined distance (e.g., a hop) of one (I) between entities in the graph, the shared entities (e.g., neighboring entities) between Entity A 60 and Entity B 62 are Entity C 64 and Entity D, resulting in a computed association value of two (2) which is assigned to the shared neighbor criteria. As shown in the FIG. 3 example, Entity E 68 and Entity F 70 are more than the pre-determined distance from Entity A 60, and Entity G 72 is more than the predetermined distance from Entity B 62.

Referring back to FIG. 2, at step 48, the association module 26 may apply the temporal significance criteria to the first association. In one embodiment, the association module 26 applies interestingness criteria to the first association as determined by a first portion of the set of documents and/or a first portion of a structured data store. The first portion is associated with a first time interval. The association module 26 then applies interestingness criteria to the first association as determined by a second portion of the set of documents and/or a second portion of the structured data store. The second portion associated with a second time interval different from the first time interval. The interestingness criteria may include, but is not limited to, one of the following interestingness measures: correlation coefficient, Goodman-Kruskal's lambda (i), Odds ratio (a), Yule's Q, Yule's Y, Kappa (K), Mutual Information (M), i-Measure (J), Gini-index (G), Support (s), Confidence (c), Laplace (L), Conviction (V), Interest (I), cosine (IS), Piatetsky-shaporo's (PS), Certainty factor (F), Added Value (AV), Collective Strength (S), Jaccard index, and Klosgen (K).

Once the temporal significance criteria is applied, the association module 26 determines a difference value between a first interestingness measure associated with the first time interval and a second interestingness measure associated with the second time interval. The association module 26 then assigns a value to the temporal significance criteria based on the determined difference value.

The association module 26 may apply the context consistency criteria to the first association. In one embodiment, the association module 26 determines a frequency of the first entity and the second entity occurring in a context of each document of the set of documents 36. The context may include, but is not limited to, organizations, people, products, industries, geographies, commodities, financial indicators, economic indicators, events, topics, subject codes, unique identifiers, social tags, industry terms, general terms, metadata elements, classification codes, and combinations thereof. The association module 26 then assigns a value to the context consistency criteria based on the determined frequency.

The association module 26 also may apply the recent activity criteria to the first association. For example, in one embodiment, the association module 26 computes an average of occurrences of the first entity and the second entity occurring in one of the set of documents 36and/or the structured data store. The association module 26 then compares the computed average of occurrences to an overall occurrence average associated with other entities in a same geography or business. One the comparison is completed, the association module 26 assigns a value to the recent activity criteria based on the comparison. In various embodiments, the computed average of occurrences and/or the overall occurrence average are seasonally adjusted.

The association module 26 may also apply the current clusters criteria to the first association. In one embodiment, identified entities are clustered together using the clustering module 30. The clustering module 30 may implement any clustering algorithm known in the art. Once entities are clustered, the association module 26 determines a number of clusters that include the first entity and the second entity. The association module 26 then compares the determined number of clusters to an average number of clusters that include entity pairs from the set of context pairs 42 and which do not include the first entity and the second entity as one of the entity pairs. In one embodiment, the defined context is an industry or geography that is applicable to both the first entity and the second entity. The association module 26 then assigns a value to the current cluster criteria based on the comparison.

The association module 26 may also apply the surprise element criteria to the first association. In one embodiment, the association module 26 compares a context in which the first entity and the second entity occur in a prior time interval associated with a portion of the set of documents and/or a portion of the structured data store, to a context in which the first entity and the second entity occur in a subsequent time interval associated with a different portion of the set of documents and/or the structured data store. The association module 26 then assigns a value to the surprise element criteria based on the comparison.

Referring to FIG. 2, once the plurality of criteria are applied to the first association, at step 50, the association module 26 weights each of the plurality of criteria values assigned to the first association. In one embodiment, the association module 26 multiplies a user-configurable value associated with each of the plurality of criteria with each of the plurality of criteria values, and then sums the plurality of multiplied criteria values to compute a significance score. As discussed previously, the significance score indicates a level of significance of the second entity to the first entity. In another embodiment, the association module 26 multiplies a pre-defined system value associated with each of the plurality of criteria, and then sums the plurality of multiplied criteria values to compute the significance score.

Once the significance score is computed, at step 54, the signal module 32 generates a signal including the computed significance score. Lastly, at step 56, the signal module 32 transmits the generated signal. In one embodiment, the signal module 32 transmits the generated signal in response to a received request.

Figure 5:
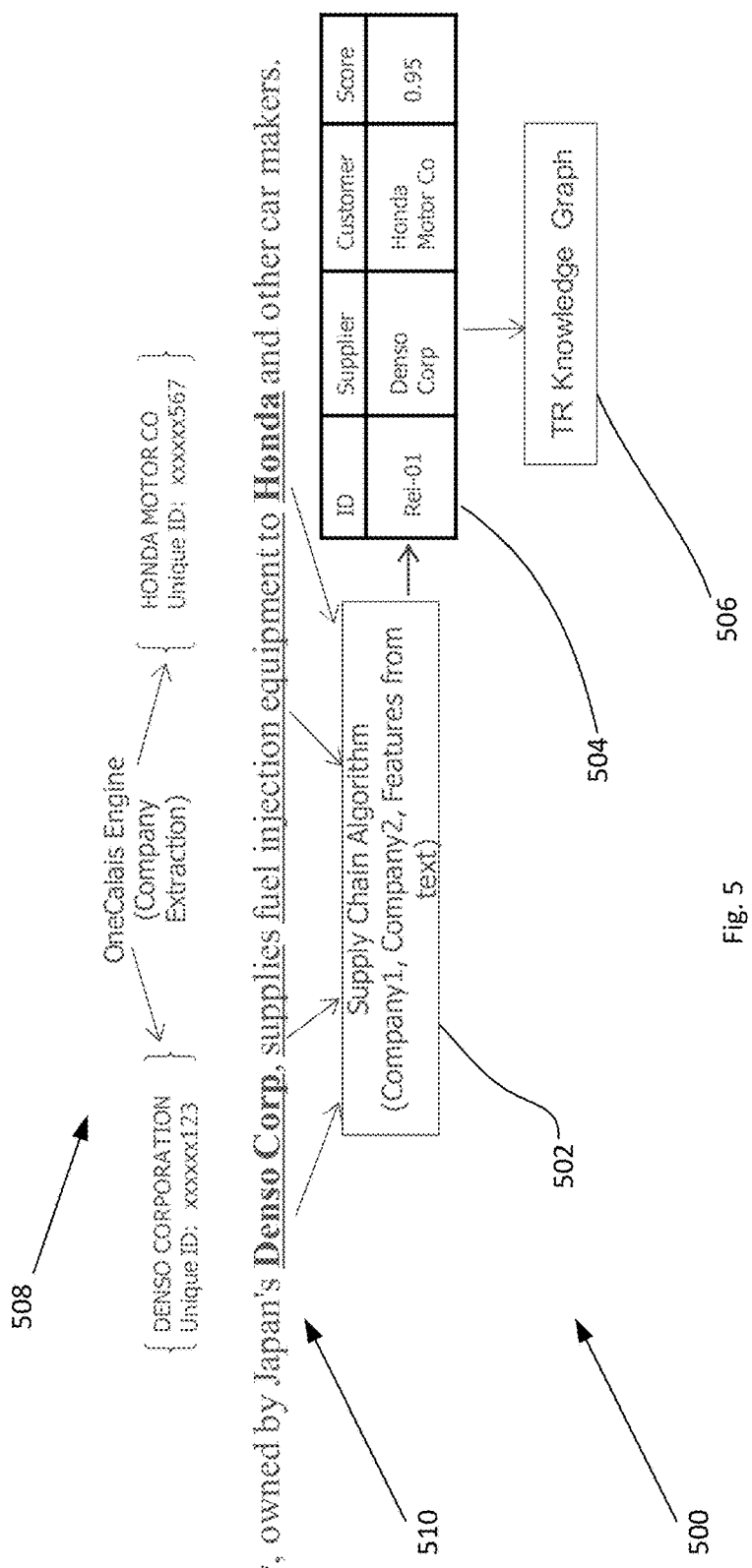
FIG. 5 is an exemplary process flow according to the present invention.

A further invention aspect provides a SCAR comprising at the core an automated (machine learning based) relation extraction system that automatically identifies pairs of companies that are related in a supplier-customer relationship and also identifies the supplier and the customer in the pair. The system then feeds this information to the Thomson Reuters knowledge graph. Currently, the system extracts these pairs from two sources of text data, namely:
1) News
2) SEC Filings FIG. 5 illustrates an exemplary process flow 500 of the present invention characterized by 1) value/supply chains: supplier-customer relationship 502; 2) machine learning-based system 504; 3) classification 506—identify a pair of companies or sets of companies in a sentence and identify direction, e.g., A supplying B or B supplying A. More specifically, the process may include as Step 1: 1) Named Entity Recognition, e.g., applying TR OneCalais Engine 508 to extract company names—Denso Corp and Honda 510, 2) break textual information from a document or source into discrete sentences, 3) mark only those sentences that have at least two companies; 4) anaphora resolution like 'we', 'the company', etc. For example, Apple announced its 3rd quarter results yesterday—excluded; Toyota Corp is an important Client of GoodYear Inc—included.

The SCAR process may further include as Step 2—Patterns identification (High recall low precision), which may include: 1) use patterns to extract sentences that are potentials for identifying value chains; 2) 'supply', 'has sold', 'customers(\s+)include', 'client', 'provided', etc.; 3) removes lot of noise; and 4) retain only those sentences that have two companies and at least one pattern matched. Examples of treatment of three identified sentences: 1) Prior to Apple, he served as Vice President, Client Experience at Yahoo—included; 2) Toyota Corp is an important Client of GoodYear Inc—included; 3) Microsoft share in the smartphone market is significantly less than Google—excluded.

The SCAR process may further include as Step 3—Run a Classifier to identify value chains and may include: 1) train a classifier that classifies each sentence; 2) prefer higher precision over recall; and 3) classifier: Logistic Regression. Examples of this operation follow: 1) Prior to Apple, he served as Vice President, Client Experience at Yahoo: 0.005; and 2) Toyota Corp is an important Client of GoodYear Inc: 0.981. The machine learning (ML)-based classifier may involve use of positive and negative labeled documents for training purposes. Training may involve nearest neighbor type analysis based on computed similarity of terms or words determined as features to determine positiveness or negativeness. Inclusion or exclusion may be based on threshold values. A training set of documents and/or feature sets may be used as a basis for filtering or identifying supply-chain candidate documents and/or sentences. Training may result in models or patterns to apply to an existing or supplemented set(s) of documents.

The SCAR process may further include as Step 4—Aggregate all evidences on a Company Pair. Examples of evidences are: 1) Toyota Corp is an important Client of GoodYear Inc: 0.981; 2) GoodYear sold 50 M cargo to Toyota in 2015: 0.902; and 3) Toyota mentioned that it agreed to buy tyres from GoodYear Inc: 0.947. The aggregate of the evidence is represented as: GoodYear (Supplier)–Toyota (Customer)→0.99 (aggregated score).

As used herein Evidence at the Sentence Level refers to the quality of the classification model that classifies a pair of companies at a sentence level. At a Company Pair Level, for each company pair, all the sentences/evidences above a threshold are chosen and a model calculates an aggregated score for the pair.

Given a text, the system performs Named Entity Recognition on it using Thomson Reuters OneCalais to identify and extract all company mentions. It then identifies and/or breaks the text to sentences. For each sentence that contains a pair of companies, a "company-pair," (also called evidence text), the system at its core uses a machine learning classifier that predicts the probability of a possible relationship for the given pair of companies in the context of this sentence. The system then aggregates all the evidences for each pair of relationship and creates a final probability score of a relationship between the two companies, which in turn is fed to Thomson Reuters knowledge graph to be used for various applications. The system is able to build a graph of all companies with their customers and suppliers extracted from these text data sources.

Figure 6:
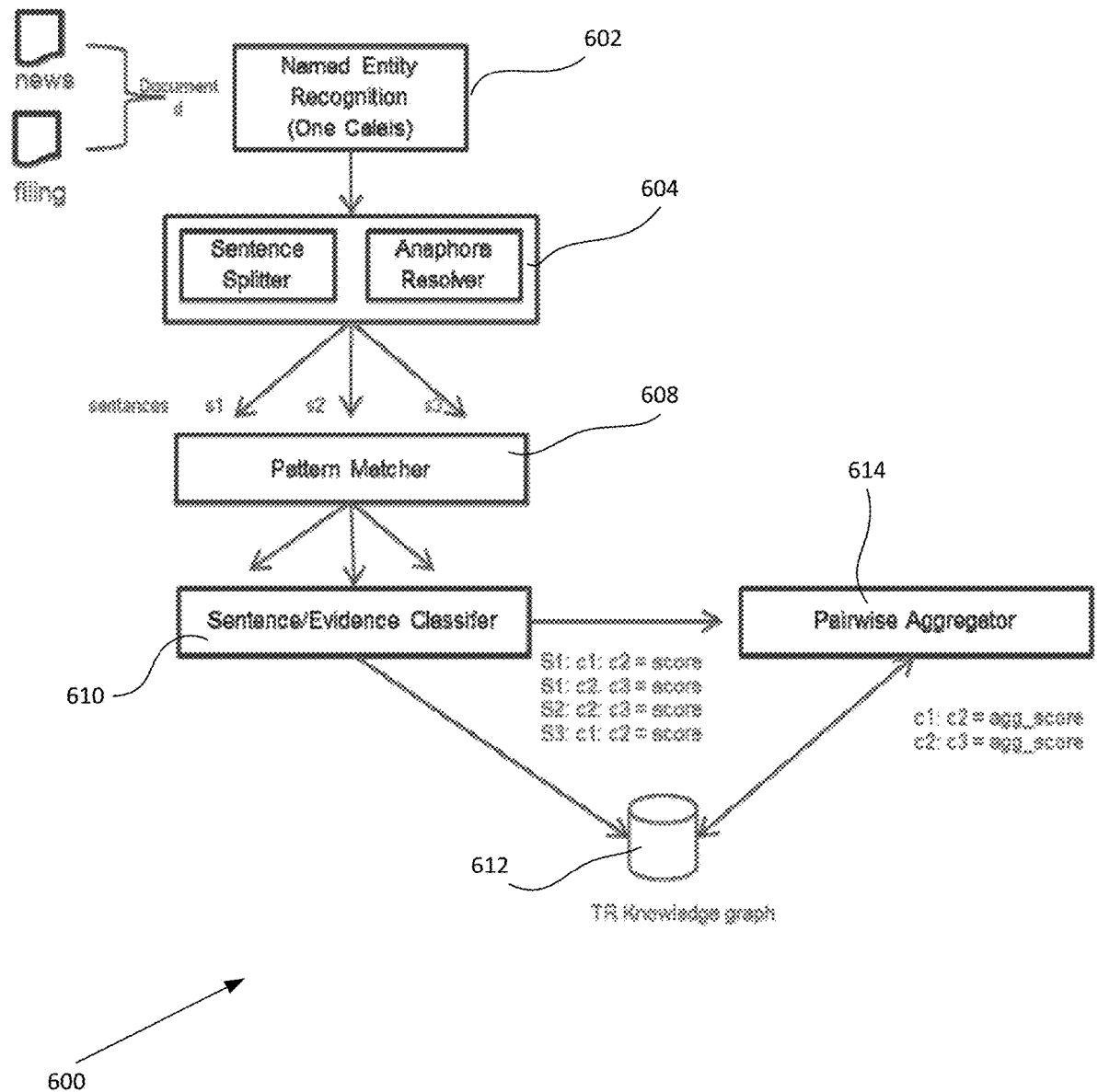
FIG. 6 is a is a schematic diagram representing in more detail an exemplary architecture according to the present invention FIG. 7 provides an overall architecture of an exemplary embodiment of the SCAR system according to the present invention.

FIG. 6 is a schematic diagram representing in more detail an exemplary architecture 600 for use in implementing the invention.

Named Entity Recognition/Extraction (Companies)—

The first step by named entity recognition 602 of the system is to identify/extract companies appearing in the text. This requires running Entity extraction to tag all the companies mentioned in the source text (news or filings document). The system, in this exemplary embodiment, uses Thomson Reuters (TR) OneCalais to tag all the companies mentioned. At the end of this step, all the companies are identified and, in this example, also resolved to a TR PermId (in this context, a unique company identifier). Using the PermId, we can later use additional metadata about the company, from TR's organization authority and knowledge bases (e.g. industry, public/private).

Anaphora Resolution for Companies—

The sentence splitter and anaphora resolver 604 is the next component in the process and system. In many sentences in the source text a supplier customer relationship information can exist without the text containing the name of the company but an anaphora like 'We', 'The Company', 'Our', and so on. For e.g. in the following snippets: "In May 2012, we entered into an agreement with Company-A to supply leather products;" and "John D, The Chairman of Company-A said that, 'Our deal to supply leather products to Company-B boosted our growth\'." The system identifies such cases ('we') and performs an additional layer of company extraction to mark these kinds of anaphoras and resolve them to a company. Anaphoras contribute to a huge number of instances of evidence sentences having supplier-customer relationships. Anaphoras are included only if they can be bound to a company, e.g., in cases of filing documents, such unmapped anaphoric instances are resolved to the 'Filing Company'.

Positive and Negative Patterns List Creation and Matching—

At this stage by pattern matcher 608, the source document text is broken down into a set of sentences and the system now processes each sentence to identify relations. As a part of the first step at this stage, any sentence that has only one company marked (resolved anaphora included), gets filtered out and is not processed. For example: Company-A announced its 3rd quarter results yesterday—Excluded (less than two companies in sentence); Company-A is an important Client of Company-B—Included (at least two companies in sentence).

To reduce the noise that is being tagged by the classifier, we generated a list of 'interesting' patterns (using manual and semi-automatic methods) that have some potential for identifying supplier-customer relations. For example patterns like "sold", "supplied", "customers included", "client", "implemented", "use", etc. were created that helps filter out vast number of noisy sentences but at the same time Includes any sentence that have the potential to be interesting and thus creating an high recall-low precision bucket of sentences. The basic idea is to only include sentences that have: a) At least two companies mentioned in the sentence, and b) Some pattern or text that can be of interest. If there is no such pattern of text, then these sentences are noisy and can be filtered out, for example: prior to Company-A, he served as Manager, Client Experience at Company-B—Included (pattern—"client"); Company-A is an important Client of Company-B—Included (pattern—"client"); and Company-A share in the electronic market is significantly less than Company-B—Excluded (no pattern).

The patterns may be created by analyzing examples of supplier-customer pairs, and analyzing all sentences that contained known related company pairs. These patterns may be generated and extended to suit many different industries. For example, automobile industry relied heavily on the pattern "supply" while technology sector uses different patterns like "used", "implemented" to suggest relations. Accordingly, there may be industry-specific patterns used in calculating evidence scores for company pairs known to be involved in a certain industry. A set of negative patterns was also curated, whose presence filtered out the sentences. Some such patterns included "stock purchase agreement", "acquired", "merged", etc. The presence of these patterns generally led to sentences that did not have supplier-customer relations.

Sentence Pre-Processing—

Each sentence is pre-processed and transformed at the sentence splitter 604 and at sentence/evidence classifier 610. As a part of pre-processing, the system also checks for multiple companies in a given sentence acting like a list of companies and creates instances with each pair. As a part of pre-processing, the companies in a list are purged and masked to one. More transformations are also applied on the sentence like shortening a sentence, which removes unnecessary parts of a sentence while keeping the parts with the most information.

Sentence/Evidence Level Classifier—

Also at sentence/evidence classifier 610, given a sentence (that contains at least two companies and a potential pattern), a machine learning classifier is trained which classifies whether the two companies in that sentence context have a supplier-customer relation (including identifying which company is supplying and which company is customer). For example: "Company-A is an important Client of Company-B."—A supplies B; "Company-A was supplied 50 barrels of oil by Company-B."—B supplies A; "Company-A supplied to Company-B stock options worth $10 M."—neither.

Model:

The classifier used was a Logistic Regression classifier. A model is trained per source. So, news documents are run by the news model classifier and filing documents are classified by a filings model classifier. This is because the structure and type of sentences vary a lot from source to source. The sentences in news documents are simpler and have a different vocabulary as compared to SEC filings documents, which can have much longer complex sentences and a different use of vocabulary.

Features:

Features include context-based positional words, specific pattern-based features, sentence level features including the presence of indicator terms, the original extraction patterns that led to the inclusion of the sentence, distance between the two companies in the sentence, presence of other companies in the sentence and so on. Broadly each feature could be divided into a) Direction based feature b) Non-Direction based featured.

Direction Based Features—

In order to classify a sentence and also identify the direction, each sentence is duplicated and one is marked as AtoB and the other is marked as B2A. The features extracted for that sentence are then marked with the respective AtoB or BtoA directions. The model is now able to learn a set of disjoint features for "A supplies B" and "B supplies A" cases. For example if fi is a positional word feature occurring say 1 word before company-B in the sentence, then there would be two features fiAtoB or fiBtoA. Let us take example of a sentence: "Company-A was supplied 50 barrels of oil by Company-B." For this example, we have a feature which is the word "by" appearing one word before Company-B, and let us represent it as fby_B-1. With this approach of feature engineering the fby_B-1 will have a bigger influence on B supplies A sentences and will not be available for A supplies B sentences.

Non-Direction Based Features:

Some such features include token length feature, distance between the two companies feature, and so on. These features contribute more towards whether there is a relation between the two companies or not.

Word Based Features:

The feature set include unigrams, bigrams and trigrams before and after Company-A tokens in the sentence, before and after Company-B token in the sentence and words around the pattern that was matched in the sentence. All these feature are direction based features.

Sentence Based Features:

These feature includes features to check if either of the company is in a list of companies, if there are any company to the left or right of the company, if any of the company is an anaphora resolved company, and so on. These are also direction based features.

Pattern Indication Features:

These feature check for specific patterns in the sentence based on the position of the company tokens in the sentence. For example the presence of a pattern "provided to Company-B" and then followed by a list of blacklisted words like "letter", "stock", etc. indicate a negative feature for the sentence.

Results:

Both the filing and news model have shown a precision of around 56% and a recall of around 45% at the sentence level on the validation test data.

Company Pair Level Aggregation—

The system at pairwise aggregator 614 stores the sentence/evidence level classification result to a knowledge graph 612 where all the evidences/sentences for each pair are aggregated to get an aggregated score for a given pair. The following examples: "Company-A is an important Client of Company-B.": 0.981 (classifier score); "Company-A sold 50 M cargo to Company-B in 2015.": 0.902; "Company-B mentioned that it agreed to buy tyres from Company-A": 0.947; yield an aggregated score for the company pair A-B as follows: Company-A (as supplier)–Company-B (as customer) of 0.99 (aggregated score).

The aggregator is a function of the individual evidence scores given by the classifier. This estimation is based on the evidence collected from the entire corpus, taking into account the source (news/filings) and confidence score of each detection as well as other signals, which either increase or decrease the probability of the relation.

Results:

At the aggregation level, the exemplary system performs with a precision of above 70% for both filings and news documents.

In one manner of implementation the present invention provides a SCAR and involves building and querying an Enterprise Knowledge Graph.

With available data concerning a variety of subjects 1) presenting an unprecedented amount that continues to grow at increasing rates, 2) coming from diverse sources, and 3) covering a variety of domains in heterogeneous formats, information providers are faced with the critical challenge to process, retrieve and present such broad array of information to their users to satisfy complex information needs. The present invention may be implemented, in one exemplary manner, in connection with a family of services for building and querying an enterprise knowledge graph. For example, first data is acquired from various sources via different approaches. Furthermore, useful information is mined from the data by adopting a variety of techniques, including Named Entity Recognition (NER) and Relation Extraction (RE); such mined information is further integrated with existing structured data (e.g., via Entity Linking (EL) techniques) to obtain relatively comprehensive descriptions of the entities. Modeling the data as a Resource Description Framework (RDF) graph model enables easy data management and embedding of rich semantics in collected and pre-processed data.

In one exemplary, but not limiting, implementation, the supply-chain relationship processes herein described may be used in a system to facilitate the querying of mined and integrated data, i.e., the knowledge graph. For example, a natural language interface (e.g., Thomson Reuters Discover interface or other suitable search engine-based interface) allows users to ask questions of a knowledge graph in the user's own words. Such natural language questions are translated into executable queries for answer retrieval. To validate performance, the involved services were evaluated, i.e., named entity recognition, relation extraction, entity linking and natural language interface, on real-world datasets.

Knowledge workers, such as scientists, lawyers, traders or accountants, deal with a greater than ever (and growing) amount of data with an increasing level of variety. Many solutions of the past have been document-centric, or focused at the document level, and this has resulted in often less than effective presentation of results for users. Users information needs are often focused on entities and their relations, rather than on documents. To satisfy these needs, information providers must pull information from wherever it happens to be stored and bring it together in a summary result. As a concrete example, suppose a user is interested in companies with the highest operating profit in 2015 currently involved in Intellectual Property (IP) lawsuits. To answer this query, one needs to extract company entities from free text documents, such as financial reports and court documents, and then integrate the information extracted from different documents about the same company together.

Three key challenges for providing information to knowledge workers so that they can receive the answers they need are: 1) How to process and mine useful information from large amount of unstructured and structured data; 2) How to integrate such mined information for the same entity across disconnected data sources and store them in a manner for easy and efficient access; 3) How to quickly find the entities that satisfy the information needs of today's knowledge workers.

A knowledge graph as used herein refers to a general concept of representing entities and their relationships and there have been various efforts underway to create knowledge graphs that connect entities with each other. For instance, the Google Knowledge Graph consists of around 570 million entities as of 2014. Here, for the purpose of describing how to implement the inventive concepts, and not by limitation, we describe in connection with Thomson Reuters' approach to addressing the three challenges introduced above. Within Thomson Reuters, data may be produced manually, e.g., by journalists, financial analysts and attorneys, or automatically, e.g., from financial markets and cell phones. Furthermore, the data we have covers a variety of domains, such as media, geography, finance, legal, academia and entertainment. In terms of the format, data may be structured (e.g., database records) or unstructured (e.g., news articles, court dockets and financial reports).

Given this large amount of data available, from diverse sources and about various domains, one key challenge is how to structure this data in order to best support users' information needs. First, we ingest and consume the data in a scalable manner. This data ingestion process is preferably robust enough to be capable of processing all types of data (e.g., relation databases, tabular files, free text documents and PDF files) that may be acquired from various data sources. Although much data may be in structured formats (e.g., database records and statements represented using Resource Description Framework) (RDF)), significant amounts of desirable data is unstructured free text.

Unstructured data may include patent filings, financial reports, academic publications, etc. To best satisfy users' information needs, structure may be added to free text documents. Additionally, rather than having data in separate "silos", data may be integrated to facilitate downstream applications, such as search and data analytics.

Data modeling and storage is another important part of an improved knowledge graph pipeline, with a data modeling mechanism flexible enough to allow scalable data storage, easy data update and schema flexibility. The Entity-Relationship (ER) modeling approach, for example, is a mature technique; however, we find that it is difficult to rapidly accommodate new facts in this model. Inverted indices allow efficient retrieval of the data; however, one key drawback is it only supports keyword queries that may not be sufficient to satisfy complex information needs. RDF is a flexible model for representing data in the format of tuples with three elements and no fixed schema requirement. An RDF model also allows for a more expressive semantics of the modeled data that can be used for knowledge inference.

In one exemplary implementation of the ingested, transformed, integrated and stored data, a system delivers efficiently retrieval of answers to users in an intuitive manner. Currently, the mainstream approaches to searching for information are keyword queries and specialized query languages (e.g., SQL and SPARQL (https://www.w3.org/TR.sparq11-overview/)). The former are not able to represent the exact query intent of the user, in particular for questions involving relations or other restrictions such as temporal constraints (e.g., IBM lawsuits since 2014); while the latter require users to become experts in specialized, complicated, and hard-to-write query languages. Thus, both mainstream techniques create severe barriers between data and users, and do not serve well the goal of helping users to effectively find the information they are seeking in today's hypercompetitive, complex, and Big Data world.

The SCAR of the present invention represents improvements achieved in building and querying an enterprise knowledge graph, including the following major contributions. We first present our data acquisition process from various sources. The acquired data is stored in a raw data store, which may include relational databases, Comma Separated Value (CSV) files, and so on. We apply our Named Entity Recognition (NER), relation extraction and entity linking techniques to mine valuable information from the acquired data. Such mined and integrated data then constitute our knowledge graph. Further, and in one manner of operation, a natural language interface (e.g., TR Discover) is also used that enables users to intuitively search for information from the knowledge graph using their own words. We evaluate our NER, relation extraction and entity linking techniques on a real-world news corpus and validate the effectiveness and improved performance in our techniques. We also evaluate TR Discover on a graph of 2.2 billion triples by using 10 K randomly generated questions of different levels of complexity.

As presented and described below, first presented is an overview of the SCAR service framework. Next, presented is data acquisition, transformation and interlinking (i.e., NER-named entity recognition, RE-relation extraction and EL-entity linking) processes. Next is described an exemplary manner of modeling and storing of processed data. Further, and in one manner of operation, an exemplary natural language interface for querying the KG-knowledge graph. Next is described an evaluation of the components of the system and related work.

FIG. 7 demonstrates the overall architecture of an exemplary embodiment of the SCAR system 700. In this diagram, the solid lines represent our batch data processing, whose result will be used to update our knowledge graph; the dotted lines represent the interactions between users and various services. For services that are publicly available, a published user guide and code examples in different programming languages is available (e.g., https://permid.org/).

First of all, during our data acquisition and ingestion processes described in detail below, we consume data from various sources 702, including live data feeds, web pages and other non-textual data (e.g., PDF files). For example, for PDF files, we apply commercial Optical Character Recognition (OCR) software to obtain the text from them. We also analyze web pages and extract their textual information.

Next, given a document in the raw data 704, a single POST request is issued to our core service for entity recognition and relation extraction. Furthermore, our service performs disambiguation within the recognized entities at the named entity recognition, extraction and entity linking module or core service 706. For example, if two recognized entities "Tim Cook" and "Timothy Cook" have been determined by our system to both refer to the CEO of Apple Inc., they will be grouped together as one recognized entity in the output 714. Finally, our system will try to link each of the recognized entities to our existing knowledge graph 712. If a mapping between a recognized entity and one in the knowledge graph 712 is found, in the output 714 of the core service 706, the recognized entity will be assigned the existing entity ID in our knowledge graph 712.

The entity linking service can also be called separately. It takes a CSV file as input where each line is a single entity that will be linked to our knowledge graph 712. In the exemplary deployment, each CSV file can contain up to 5,000 entities.

While performing the above-discussed services, with our RDF model, we store our knowledge graph 712, i.e., the recognized entities and their relations, in an inverted index for efficient retrieval with keyword queries (i.e., the Keyword Search Service 716 in FIG. 7) and also in a triple store in order to support complex query needs.

Finally, to support the natural language interface 710, e.g., TR Discover, internal processes retrieve entities and relations from the knowledge graph 712 and build the necessary resources for the relevant sub-modules such as the entity matching service 718 (e.g., a lexicon for question understanding). Users can then enter and submit a natural language query through a Web-based interface.

Data Acquisition, Transformation and Interlinking—

The following describes one exemplary manner of implementing the SCAR system. SCAR accesses a plurality of data sources and obtains/collects electronic data representing documents including textual content as source data, this is referred to as the acquisition and curation process. Such collected and curated data is then used to build the knowledge graph. Data Source and Acquisition—In this exemplary implementation, the data used covers a variety of industries, including Financial & Risk (F&R), Tax & Accounting, Legal, and News. Each of these four major data categories can be further divided into various sub-categories. For instance, our F&R data ranges from Company Fundamentals to Deals and Mergers & Acquisitions. Professional customers rely on rich datasets to find trusted and reliable answers upon which to make decisions and advisements. Below, Table 1 provides a high-level summary of the exemplary data space.

TABLE 1

An Overview of Thomson Reuters Data Space

| Industry | Description |
| --- | --- |
| Financial & Risk (F&R) | F&R data primarily consists of structured data such as intra and end-of-day time series, Credit Ratings, Fundamentals, alongside less structured sources, e.g., Broker Research and News. |
| Tax & Accounting | Hare, the two biggest datasets are highly structured tax returns and tax regulations |
| Legal | Our legal content has a US bias and is mostly unstructured or semi-structured. It ranges from regulations to dockets, verdicts to case decisions from Supreme Court, alongside numerous analytical works. |
| Reuters News | Reuters delivers more than 2 million news articles and 0.5 million pictures every year. The news articles are unstructured but augmented with certain types of metadata. |

To acquire the necessary data in the above-mentioned domains, we adopted a mixture of different approaches, including manual data entry, web scraping, feed consumption, bulk upload and OCR. The acquired data is further curated at different levels according to the product requirements and the desired quality level. Data curation may be done manually or automatically. Although our acquired data contains a certain amount of structured data (e.g., database records, RDF triples, CSV files, etc.), the majority of our data is unstructured (e.g., Reuters news articles). Such unstructured data contains rich information that could be used to supplement existing structured data. Because our data comes from diverse sources and covers various domains, including Finance, Legal, Intellectual Property, Tax & Accounting, etc., it is very likely that the same entity (e.g., organization, location, judge, attorney and law firm) could occur in multiple sources with complementary information. For example, "Company A" may exist in our legal data and is related to all its legal cases; while at the same time, this company may also appear in our financial data with all its Merger & Acquisition activities. Being able to interlink the different occurrences of the same entity across a variety of data sources is key to providing users a comprehensive view of entities of interest. An additional operational goal is to update and maintain the graph to keep up with the fast changing nature of source content.

To mine information from unstructured data and to interlink entities across diverse data sources, we have devoted a significant amount of effort to developing tools and capabilities for automatic information extraction and data interlinking. For structured data, we link each entity in the data to the relevant nodes in our graph and update the information of the nodes being linked to. For unstructured data, we first perform information extraction to extract the entities and their relationships with other entities; such extracted structured data is then integrated into our knowledge graph.

Named Entity Recognition—

Given a free text document, we first perform named entity recognition (NER) on the document to extract various types of entities, including companies, people, locations, events, etc. We accomplish this NER process by adopting a set of in-house natural language processing techniques that include both rule-based and machine learning algorithms. The rule-based solution uses well-crafted patterns and lexicons to identify both familiar and unfamiliar entity names.

Our machine learning-based NER consists of two parts, both of which are based on binary classification and evolved from the Closed Set Extraction (CSE) system. CSE originally solved a simpler version of the NER problem: extracting only known entities, without discovering unfamiliar ones. This simplification allows it to take a different algorithmic approach, instead of looking at the sequence of words. First, it searches the text for known entity aliases, which become entity candidates. Then it uses a binary classification task to decide whether each candidate actually refers to an entity or not, based on its context and on the candidate alias. The second component tries to look for unfamiliar entity names, by creating candidates from patterns, instead from lexicons.

Both components use logistic regression for the classification problem, using LIBLINEAR implementation (a known library for large linear classification). We employ commonly adopted features for our machine learning-based NER algorithm: e.g., parts of speech, surrounding words, various lexicons and gazetteers (company names, people names, geographies & locations, company suffixes, etc.). We also designed special features to deal with specific sources of interest; such special features are aimed at detecting source specific patterns.

Relationship Extraction—

The core of this approach is a machine learning classifier that predicts the probability of a possible relationship for a given pair of identified entities, e.g., known or recognized companies (which may be tagged in the NER process), in a given sentence. This classifier uses a set of patterns to exclude noisy sentences, and then extracts a set of features from each sentence. We employ context-based features, such as token-level n-grams and patterns. Other features are based on various transformations and normalizations that are applied to each sentence (such as replacing identified entities by their type, omitting irrelevant sentence parts, etc.). In addition, the classifier also relies on information available from our existing knowledge graph. For instance, when trying to identify the relationship between two identified companies, the industry information (i.e., healthcare, finance, automobile, etc.) of each company is retrieved from the knowledge graph and used as a feature. We also use past data to automatically detect labeling errors in our training set, which improves our classifier over time.

The algorithm is precision-oriented to avoid introducing too many false positives into the knowledge graph. In one manner of operation, relation extraction is only applied to the recognized entity pairs in each document, i.e., we do not try to relate two entities from two different free text documents. The relation extraction process runs as a daily routine on live document feeds. For each pair of entities, the SCAR system may extract multiple relationships; only those relationships with a confidence score above a pre-defined threshold are then added to the knowledge graph. Named entity recognition and relation extraction APIs, also known as Intelligent Tagging, are publicly available (http://www.opencalais.com/opencalais-api/).

Entity Linking—

While the capability to mine information from unstructured data is important, an equally important function of the SCAR system is to be able to integrate such mined information with existing structured data to provide users with comprehensive information about the entities. The SCAR system may employ several tools to link entities to nodes in the knowledge graph. One approach is based on matching the attribute values of the nodes in the graph and that of a new entity. These tools adopt a generic but customizable algorithm that is adjustable for different specific use cases. In general, given an entity, we first adopt a blocking technique to find candidate nodes that the given entity could possibly be linked to. Blocking can be treated as a filtering process and is used to identify nodes that are promising candidates for linking in a lightweight manner. The actual and expensive entity matching algorithms are then only applied between the given entity and the resulting candidate nodes.

Next, the SCAR system computes a similarity score between each of the candidate nodes and the given entity using an Support Vector Machine (SVM) classifier that is trained using a surrogate learning technique. Surrogate learning allows the automatic generation of training data from the datasets being matched. In surrogate learning, we find a feature that is class-conditionally independent of the other features and whose high values correlate with true positives and low values correlate with true negatives. Then, this surrogate feature is used to automatically label training examples to avoid manually labeling a large number of training data.

An example of a surrogate feature is the use of the reciprocal of the block size: 1/block_size. In this case, for a block containing just one candidate that is most likely a match (true positive), the value for this surrogate feature will be 1.0; while for a big block containing a matching entity and many non-matching entities (true negatives), the value of the surrogate feature will be small. Therefore, on average, a high value of this surrogate feature (close to 1.0) will correlate to true positives and a low value ($<<1.0$) will correlate to true negatives.

The features needed for the SVM model are extracted from all pairs of comparable attributes between the given entity and a candidate node. For example, the attributes "first name" and "given name" are comparable. Based upon such calculated similarity scores, the given entity is linked to the candidate node that it has the highest similarity score with, this may be conditioned on if their similarity score is also above a pre-defined threshold. The blocking phase is tuned towards high recall, i.e., we want to make sure that the blocking step will be able to cover the node in the graph that a given entity should be linked to, if such a node exists. Then, the actual entity linking step ensures that we only generate a link when there is sufficient evidence to achieve an acceptable level of precision, i.e., the similarity between the given entity and a candidate node is above a threshold. The entity linking module or component may vary in the way it implements each of the two steps. For example, it may be configured to use different attributes and their combinations for blocking; it also provides different similarity algorithms that can be used to compute feature values. Exemplary entity linking APIs are publicly available (e.g., permid.org/match).

Figure 8:
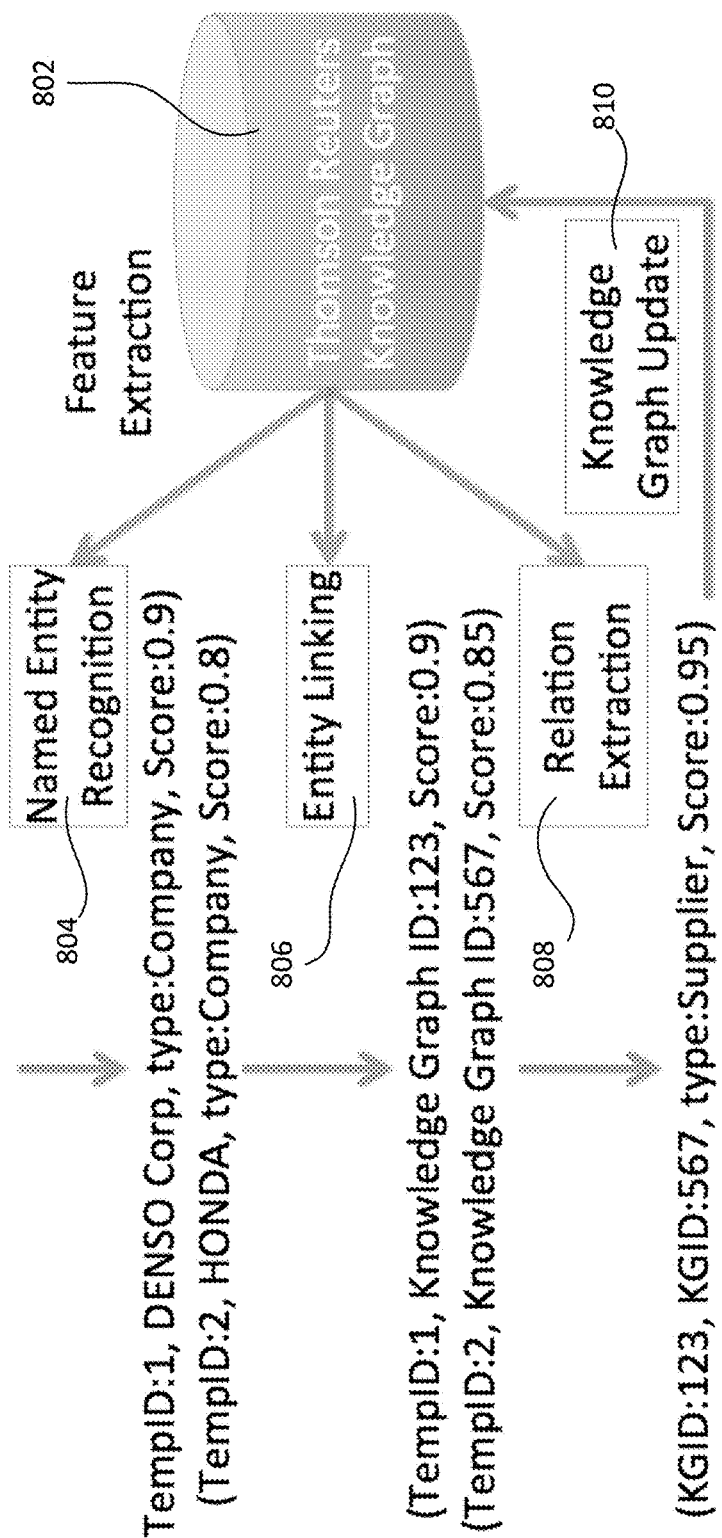
FIG. 8 is a flow diagram demonstrating an example of NER, entity linking, and relation extraction processes according to the present invention.

FIG. 8 is a flow diagram 800 demonstrating an example of NER 804, entity linking 806, and relation extraction 808 processes. First, with the NER 804 technique identifies two companies, "Denso Corp" and "Honda"; each of identified company is assigned a temporary identifier ID. Next in entity linking 806, both recognized companies are linked to nodes in the knowledge graph and each is associated with the corresponding Knowledge Graph ID (KGID). Furthermore, a relationship, in this case the relationship "supplier", (i.e., "Denso Corp" and "Honda" have a supply chain relationship between them) is extracted at relation extraction 808. At knowledge graph update 810, the newly extracted relationship is added to the knowledge graph 802, since the score of this relationship (0.95) is above the pre-defined threshold.

Data Modeling and Physical Storage—

There are a variety of mechanisms for representing the data, including the Entity-Relation (ER) model (i.e., for relational databases), plain text files (e.g., in tabular formats, such as CSV), or inverted indices (to facilitate efficient retrieval by using keyword queries), etc. Plain text files may be easiest to store the data. However, placing data into files would not allow the users to conveniently obtain the information they are looking for from a massive number of files. Although relational database is a mature technique and users can retrieve information by using expressive SQL queries, a schema (i.e., the ER model) has to be defined ahead-of-time in order to represent, store and query the data. This modeling process can be relatively complicated and time-consuming, particularly for companies that have diverse types of datasets from various data sources. Also, as new data comes in, it may be necessary to keep revising the model and even remodeling the data, which could be expensive in terms of both time and human effort. Data can also be used to build inverted indices for efficient retrieval. However, the biggest drawback of inverted indices is that users can only search for information with simple keyword queries; while in real-world scenarios, many user search needs would be better captured by adopting more expressive query languages.

Modeling Data as RDF—

One emerging data representation technique is the Resource Description Framework (RDF). RDF is a graph based data model for describing entities and their relationships on the Web. Although RDF is commonly described as a directed and labeled graph, many researchers prefer to think of it as a set of triples, each consisting of a subject, predicate and object in the form of <subject, predicate, object>.

Triples are stored in a triple store and queried with the SPARQL query language. Compared to inverted indices and plain text files, triple stores and the SPARQL query language enable users to search for information with expressive queries in order to satisfy complex user needs. Although a model is required for representing data in triples (similar to relational databases), RDF enables the expression of rich semantics and supports knowledge inference.

Another big advantage of adopting an RDF model is that it enables easier data deletion and update. Traditional data storage systems are "schema on write", i.e., the structure of the data (the data model) is decided at design time and any data that does not fit this structure is lost when ingesting the data. In contrast, "schema on read" systems attempt to capture everything and then apply computation horsepower to enforce a schema when the data is retrieved. An example would be the Elastic/Logstash/Kibana stack (www.elastic.co/products) that does not enforce any schema when indexing the data but then tries to interpret one from the built indices. The tradeoff is future-proofing and nimbleness at the expense of (rapidly diminishing) computing and storage. RDF sits at a unique intersection of the two types of systems. First of all, it is "schema on write" in the sense that there is a valid format for data to be expressed as triples. On the other hand, the boundless nature of triples means that statements can be easily added/deleted/updated by the system and such operations are hidden to users. Therefore, adopting an RDF model for data representation fits our needs well.

Figure 9:
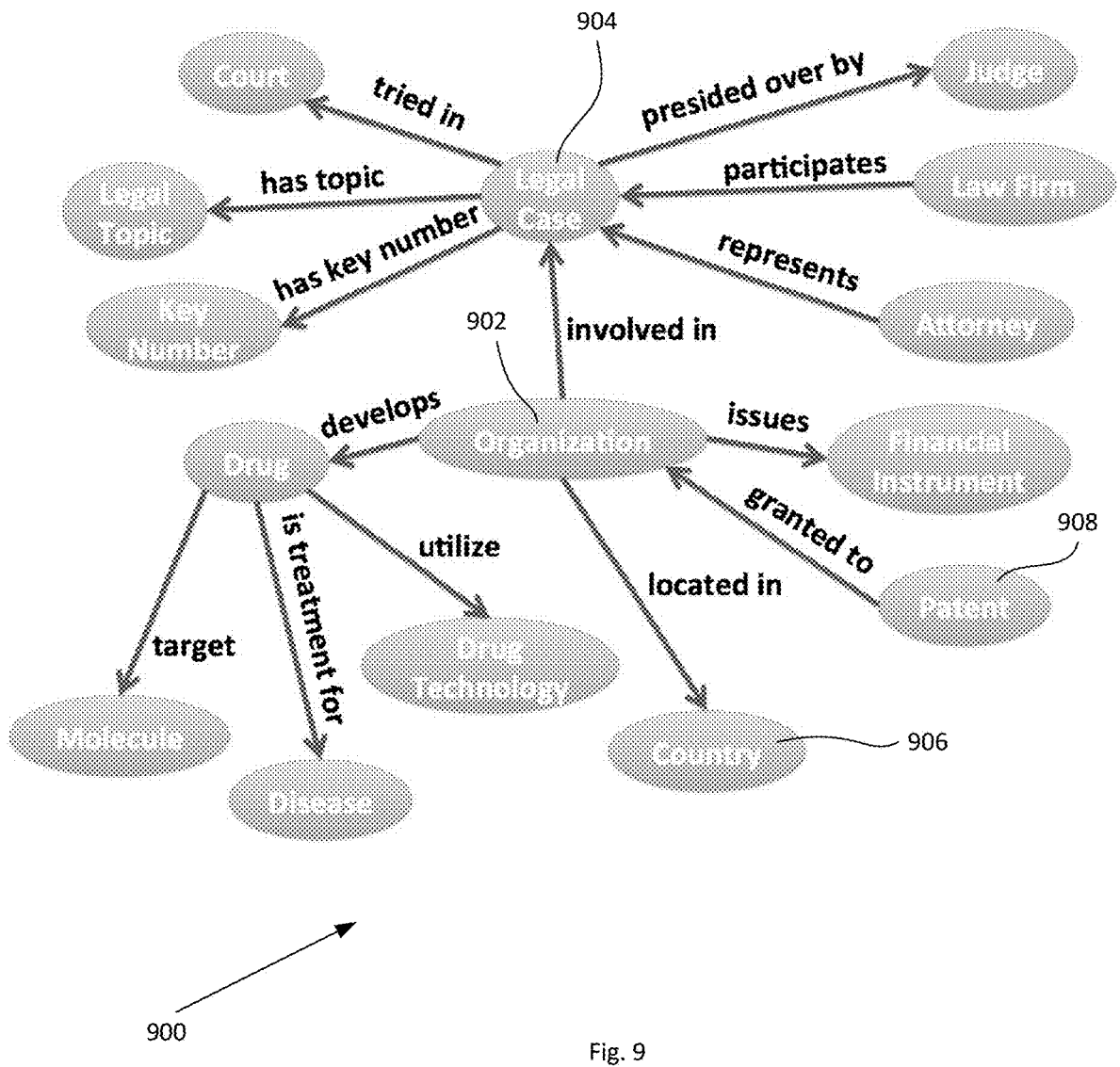
FIG. 9 is an exemplary ontology snippet of an exemplary Knowledge Graph in connection with an operation of the present invention.

FIG. 9 represents an exemplary ontology snippet of an exemplary Knowledge Graph 900 in connection with an operation of the present invention. While building the knowledge graph 900, we have designed an RDF model for our data. Our model contains classes (e.g., organizations and people) and predicates (the relationships between classes, e.g., "works for" and "is a board member of"). For brevity, we only show a snippet of our entire model in FIG. 9. Here, the major classes include Organization 902, Legal Case 904, Patent 908 and Country 906. Various relationships also exist between these classes: "involved in" connects a legal case and an organization, "presided over by" exists between a judge and a legal case, patents can be "granted to" organizations, an organization can "develop" a drug which "is treatment for" one or more diseases. This model is exemplary and may accommodate new domains or add other domains over time.

Data Storage—

In this exemplary implementation, we store the triples in two ways. We index the triples on their subject, predicate and object respectively with the Elastic search engine. We also build a full-text search index on objects that are literal values, where such literal values are tokenized and treated as terms in the index. This enables fast retrieval of the data with simple keyword queries. Additionally, we store all the triples in a triple store in order to support search with complex SPARQL queries. The exemplary TR knowledge graph manages about five billion triples; however, this only represents a small percentage of related data and the number of triples is expected to grow rapidly over time.

In addition to the three basic elements in a triple (i.e., subject, predicate and object), a fourth element can also be added, turning a triple to a quad (www.w3.org/TR/n-quads/). This fourth element is generally used to provide provenance information of the triple, such as its source and trustworthiness. Such provenance information can be used to evaluate the quality of a triple. For example, if a triple comes from a reputable source, then it may generally have a higher quality level. In our current system, we use the fourth element to track the source and usage information of the triples. The following examples show the usage of this fourth element: <Microsoft, has_address, Address1, Wikipedia>, indicating that this triple comes from Wikipedia; and <Jim Hendler, works_for, RPI, 2007 to present>, showing the time period that Jim Hendler works for RPI.

Querying the Knowledge Graph with Natural Language—

Above we have presented a Big Data framework and infrastructure for building an enterprise knowledge graph. However, given the built graph, one important question is how to enable end users to retrieve the data from this graph in an intuitive and convenient manner. Technical professionals, such as database experts and data scientists, may simply employ SPARQL queries to access this information. But non-technical information professionals, such as journalists, financial analysts and patent lawyers, who cannot be expected to learn such specialized query languages, still need a fast and effective means for accessing the data that is relevant to the task at hand.

Keyword-based queries have been frequently adopted to allow non-technical users to access large-scale RDF data, and can be applied in a uniform fashion to information sources that may have wildly divergent logical and physical structure. But they do not always allow precise specification of the user's intent, so the returned result sets may be unmanageably large and of limited relevance. However, it would be difficult for non-technical users to learn specialized query languages (e.g., SPARQL) and to keep up with the pace of the development of new query languages.

To enable non-technical users to intuitively find the exact information they are seeking, TR Discover, a natural language interface, bridges the gap between keyword-based search and structured query. In the TR Discover natural language interface, the user creates natural language questions, which are mapped into a logic-based intermediate language. A grammar defines the options available to the user and implements the mapping from English into logic. An auto-suggest mechanism guides the user towards questions that are both logically well-formed and likely to elicit useful answers from a knowledge base. A second translation step then maps from the logic-based representation into a standard query language (e.g., SPARQL), allowing the translated query to rely on robust existing technology. Since all professionals can use natural language, we retain the accessibility advantages of keyword search, and since the mapping from the logical formalism to the query language is information-preserving, we retain the precision of query-based information access. The detailed use of TR Discover follows.

Question Understanding—

We use a Feature-based Context-Free Grammar (FCFG) for parsing natural language questions. Our FCFG consists of phrase structure rules (i.e., grammar rules) on non-terminal nodes and lexical entries (i.e., lexicon) for leaf nodes. The large majority of the phrase structure rules are domain independent allowing the grammar to be portable to new domains. The following shows a few examples of our grammar rules: G1-G3. Specifically, Rule G3 indicates that a verb phrase (VP) contains a verb (V), noun (N), and a noun phrase (NP).

G1: NP→N
G2: NP→NP VP
G3: VP→V NP

Furthermore, as for the lexicon, each entry in the FCFG lexicon contains a variety of domain-specific features that are used to constrain the number of parses computed by the parser preferably to a single, unambiguous parse. L1-L3 are examples of lexical entries.

L1: N[TYPE=drug, NUM=pl, SEM=<λx.drug(x)>]→'drugs'
L2: V[TYPE=[drug,org,dev], SEM=<λX x.X (λy.dev_org_drug(y,x))>, TNS=past, NUM=?n]→'developed by'
L3: V[TYPE=[org,country,hq], NUM=?n]→'headquartered in'

Here, L1 is the lexical entry for the word, drugs, indicating that it is of TYPE drug, is plural ("NUM=pl"), and has the semantic representation λx.drug(x). Verbs (V) have an additional feature tense (TNS), as shown in L2. The TYPE of verbs specify both the potential subject-TYPE and object-TYPE. With such type constraints, we can then license the question drugs developed by Merck while rejecting nonsensical questions like drugs headquartered in the U.S. on the basis of the mismatch in semantic type. A general form for specifying the subject and object types for verbs is as following: TYPE=[subject_constraint, object_constraint, predicate_name].

Disambiguation relies on the unification of features on non-terminal syntactic nodes. We mark prepositional phrases (PPs) with features that determine their attachment preference. For example, we specify that the prepositional phrase for pain must attach to an NP rather than a VP; thus, in the question Which companies develop drugs for pain?, "for pain" cannot attach to "develop" but must attach to "drugs". Additional features constrain the TYPE of the nominal head of the PP and the semantic relationship that the PP must have with the phrase to which it attaches. This approach filters out many of the syntactically possible but undesirable PP-attachments in long queries with multiple modifiers, such as companies headquartered in Germany developing drugs for pain or cancer. When a natural language question has multiple parses, we always choose the first parse. Future work may include developing ranking mechanisms in order to rank the parses of a question.

The outcome of our question understanding process is a logical representation of the given natural language question. Such logical representation is then further translated into an executable query (SPARQL) for retrieving the query results. Adopting such intermediate logical representation enables us to have the flexibility to further translate the logical representation into different types of executable queries in order to support different types of data stores (e.g., relational database, triple store, inverted index, etc.).

Enabling Question Completion with Auto-Suggest—

Traditional question answering systems often require users to enter a complete question. However, it may be difficult for novice users to do so, e.g., due to the lack of familiarity and an incomplete understanding of the underlying data. One feature of the exemplary natural language interface TR Discover is that it provides suggestions in order to help users to complete their questions. The intuition here is that the auto-suggest module guides users in exploring the underlying data and completing a question that can be potentially answered with the data. Unlike Google's query auto-completion that is based on query logs, the present auto-suggestions are computed based upon the relationships and entities in the built knowledge graph and by utilizing the linguistic constraints encoded in the grammar feature.

The present auto-suggest module is based on the idea of left-corner parsing. Given a query segment-qs (e.g., drugs, developed by, etc.), we find all grammar rules whose left corner-fe on the right side matches the left side of the lexical entry of qs. We then find all leaf nodes in the grammar that can be reached by using the adjacent element of fe. For all reachable leaf nodes (i.e., lexical entries in our grammar), if a lexical entry also satisfies all the linguistic constraints, we then treat it as a valid suggestion.

The following describes two exemplary ways of using the auto-suggest facility. On one hand, users may be interested in broad, exploratory questions; however, due to lack of familiarity with the data, guidance from our auto-suggest module will be needed to help this user build a valid question in order to explore the underlying data. In this situation, users can work in steps: they could type in an initial question segment and wait for the system to provide suggestions. Then, users can select one of the suggestions to move forward. By repeating this process, users can build well-formed natural language questions (i.e., questions that are likely to be understood by our system) in a series of small steps guided by our auto-suggest.

Figure 10:
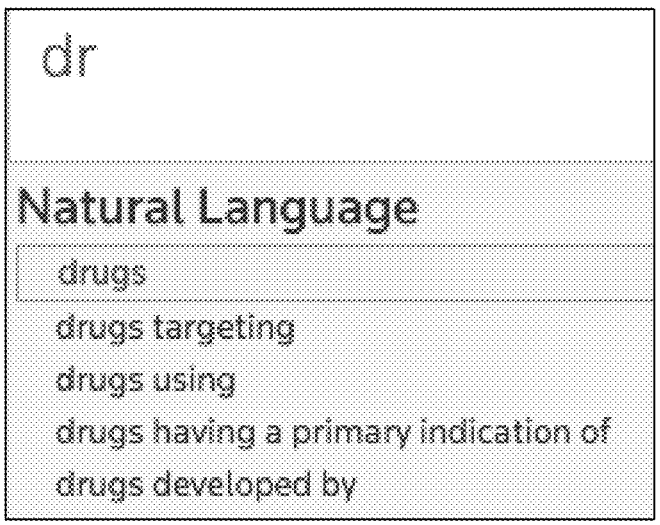
FIGS. 10(a)-10(c) provide graphical user interface elements illustrating a question building process according to the present invention.
FIG. 10(d) is an exemplary user interface providing a question built by the question building process and the answers retrieved by executing the question as a query according to the present invention.
Figure 10:
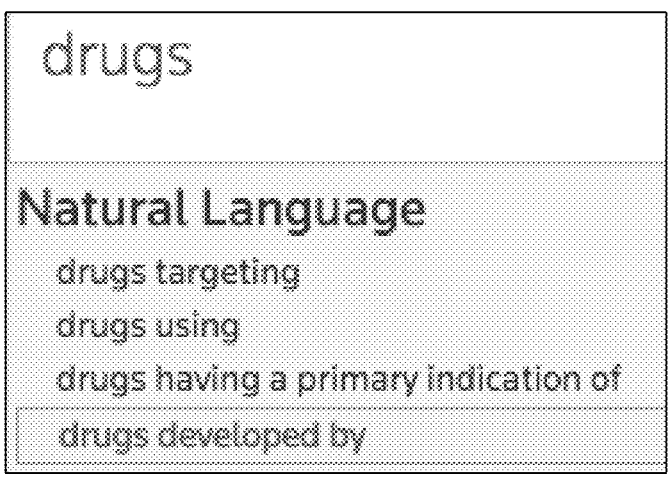
Figure 10:
Figure 10D:
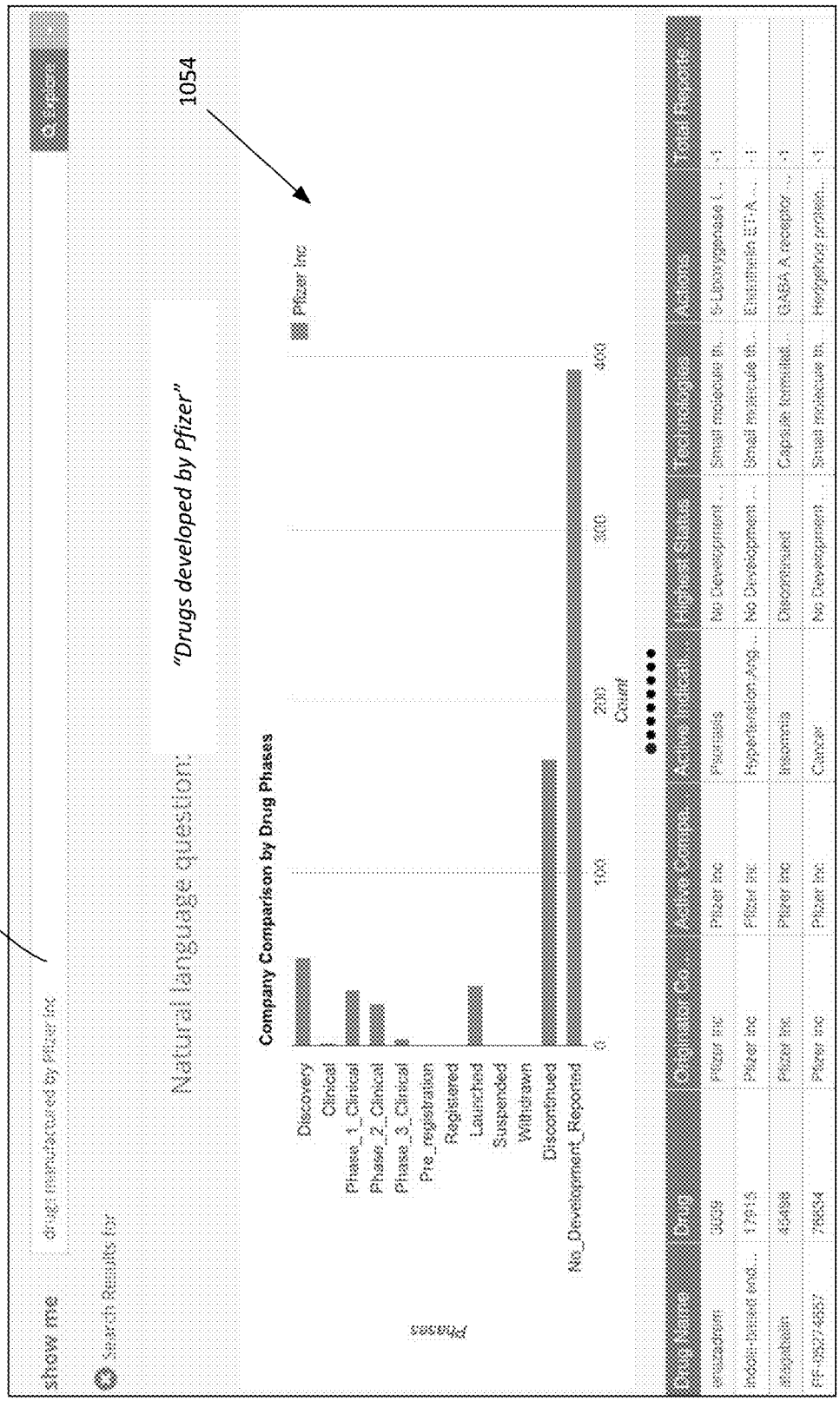

FIGS. 10(a)-10(c) demonstrate this question building process. Assuming that User A starts by typing in "dr" as shown in FIG. 10(a), drugs will then appear as one or several possible completions. User A can either continue typing drugs or select it from the drop-down list. Upon selection, suggested continuations to the current question segment, such as "using" and "developed by," are then provided to User A as shown in FIG. 10(b). Suppose our user is interested in exploring drug manufacturers and thus selects "developed by." In this case, both the generic type, companies, along with specific company instances like "Pfizer Inc" and "Merck & Co Inc" are offered as suggestions as shown in FIG. 10(c). User A can then select "Pfizer Inc" to build the valid question, "drugs developed by Pfizer Inc" 1052 thereby retrieving answers 1054 from our knowledge graph as shown in the user interface 1050 of FIG. 10(d).

Alternatively, users can type in a longer string, without pausing, and our system will chunk the question and try to provide suggestions for users to further complete their question. For instance, given the following partial question cases filed by Microsoft tried in . . . , our system first tokenizes this question; then starting from the first token, it finds the shortest phrase (a series of continuous tokens) that matches a suggestion and treats this phrase as a question segment. In this example, cases (i.e., legal cases) will be the first segment. As the question generation proceeds, our system finds suggestions based on the discovered question segments, and produces the following sequence of segments: cases, filed by, Microsoft, and tried in. At the end, the system knows that the phrase segment or text string "tried in" is likely to be followed by a phrase describing a jurisdiction, and is able to offer corresponding suggestions to the user. In general, an experienced user might simply type in cases filed by Microsoft tried in; while first-time users who are less familiar with the data can begin with the stepwise approach, progressing to a more fluent user experience as they gain a deeper understanding of the underlying data.

We rank the suggestions based upon statistics extracted from our knowledge graph. Each node in our knowledge graph corresponds to a lexical entry (i.e., a potential suggestion) in our grammar (i.e., FCFG), including entities (e.g., specific drugs, drug targets, diseases, companies, and patents), predicates (e.g., developed by and filed by), and generic types (e.g., Drug, Company, Technology, etc.). Using our knowledge graph, the ranking score of a suggestion is defined as the number of relationships it is involved in. For example, if a company filed 10 patents and is also involved in 20 lawsuits, then its ranking score will be 30. Although this ranking is computed only based upon the data, alternative approaches may be implemented or the system's behavior may be tuned to a particular individual user, e.g., by mining query logs for similar queries previously made by that user.

Question Translation and Execution—

Figure 11:
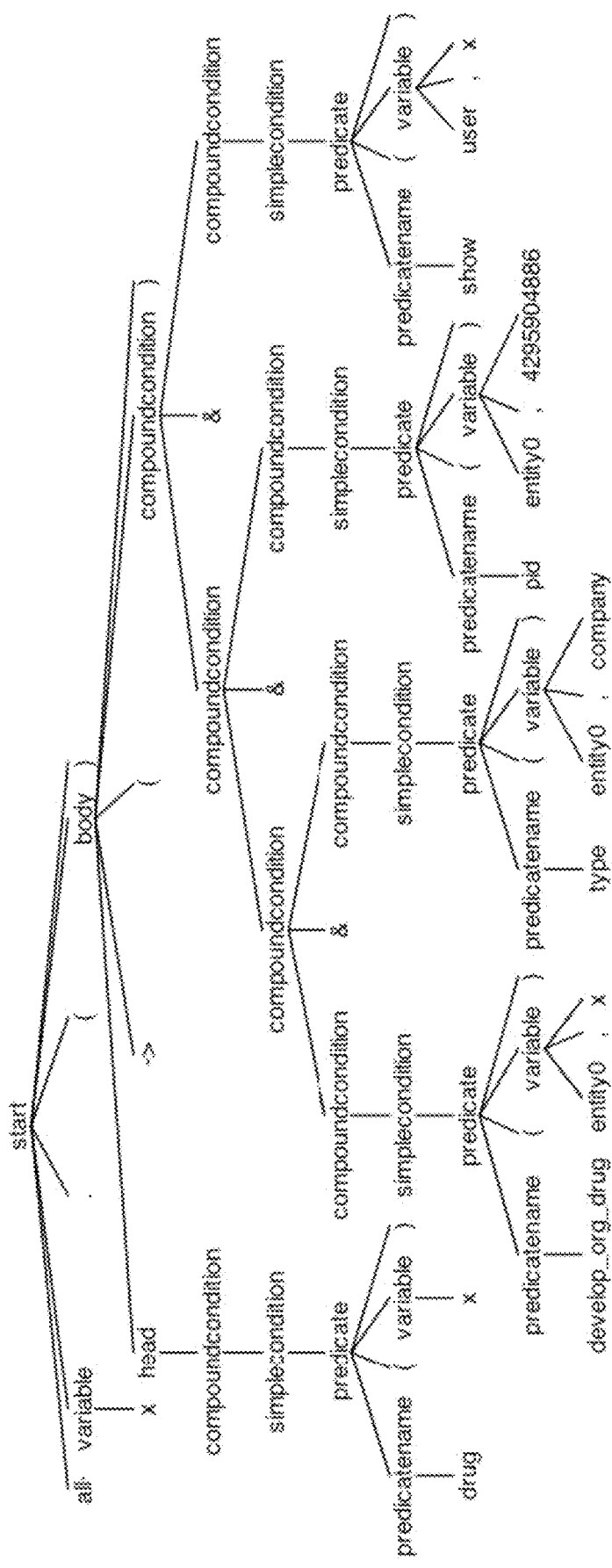
FIG. 11 is a Parse Tree for the First Order Logic (FOL) of the question "Drugs developed by Merck" according to the present invention.

FIG. 11 depicts a Parse Tree 1100 for the First Order Logic (FOL) of the Question "Drugs developed by Merck." In contrast to other natural language interfaces, our question understanding module first maps a natural language question to its logical representation; and, in this exemplary embodiment, we adopt First Order Logic (FOL). The FOL representation of a natural language question is further translated to an executable query. This intermediate logical representation provides us the flexibility to develop different query translators for various types of data stores.

There are two steps in translating an FOL representation to an executable query. In the first step, we parse the FOL representation into a parse tree by using an FOL parser. This FOL parser is implemented with ANTLR (a known parser development tool). The FOL parser takes a grammar and an FOL representation as input, and generates a parse tree for the FOL representation. FIG. 11 shows the parse tree of the FOL for the question "Drugs developed by Merck". We then perform an in-order traversal (with ANTLR's APIs) of the FOL parse tree and translate it to an executable query. While traversing the tree, we put all the atomic query constraints (e.g., "type(entity0, company)", indicating that "entity0" represents a company entity, and "pid(entity0, 4295904886)", showing the internal ID of the entity represented by "entity0") and the logical connectors (i.e., "and" and "or") into a stack. When we finish traversing the entire tree, we pop the conditions out of the stack to build the correct query constraints; predicates (e.g., "devel-op_org_drug" and "pid") in the FOL are also mapped to their corresponding predicates in our RDF model to formulate the final SPARQL query. We run the translated SPARQL queries against an instance of the free version of GraphDB, a state-of-the-art triple store for storing triple data and for executing SPARQL queries.

As a concrete example, the following summarizes the translation from a natural language question to a SPARQL query via a FOL representation:

Natural Language Question:

---
Drugs developed by Merck
FOL: all x.(drug(x) → (develop_org_drug(entity0,x) & type(entity0,Company) & pid(entity0,4295904886)))
---

SPARQL Query:

---
PREFIX rdf: <http://www.w3.org/1999/02/22-rdf-syntax-ns#> PREFIX example: http://www.example.com#
select ?x
where {
?x rdf: type example:Drug .
example:4295904886 example:develops ?x .
}
---

Evaluation of Data Transformation and Interlinking—

Here, we evaluate named entity recognition, relation ex-traction, and entity linking services, i.e., Intelligent Tagging.

Dataset.

Named entity recognition is evaluated separately for Company, Person, City and Country; entity linking is evaluated on Company and Person entities. Table 2 shows the statistics of our evaluation datasets for NER and entity linking. All documents were randomly sampled from a large news corpus. For NER, each selected document was annotated by manually. It should be noted that these entity mention counts are at the document level, and not the instance level. For example, if a company appeared in three different documents and five times in each, we count it as three company mentions (instance level count would have been 15, unique companies count would have been one). For entity linking, the randomly selected entities are manually resolved to entities in our knowledge graph.

TABLE 2

Statistics of NER and Entity Linking Evaluation Datasets

| Task | Entity Type | |Document| | |Mention| |
|---|---|---|---|
| Entity Recognition | Company | 1,496 | 4,450 |
| | Person | 600 | 787 |
| | City | 100 | 101 |
| | Country | 2,000 | 1,835 |
| Entity Linking | Company | 1,000 | 673 |
| | Person | 100 | 156 |

We also evaluate our machine learning-based relation extraction algorithm. We present the results on two different types of relations: "Supply Chain" and "Merger & Acquisition". To evaluate the supply chain relation, we first identified 20,000 possible supply chain relationships (from 19,334 documents). We then sent these 20,000 possible relations to Amazon Mechanical Turk (www.mturk.com) for manual annotation. Each task was sent to two different workers; in case of disagreement between the first two workers, a possible relation is then sent to a third worker in order to get a majority decision. The agreement rate between workers was 84%. Through this crowdsourcing process, we obtained 7,602 "supply-chain" relations as reported by the workers. We then checked the quality of a random sample of these relations and found the reported relations of high quality, so we used all the 7,602 relations as ground truth for our evaluation.

To evaluate the Merger & Acquisition (M&A) relation, we first identified 2,590 possible M&A relations (from 2,500 documents). These possible relations were then manually tagged and annotated. The quality of the tagged set was further assessed by another worker by examining randomly sampled annotations, and was found to be 92% accurate. The overall annotation process resulted in 603 true Merger & Acquisition relations, which were used as ground-truth for our evaluation.

TABLE 3

Named Entity Recognition, Relation Extraction and Entity Linking Results

| Task | Entity/Relation Type | Precision | Recall | F1 |
|---|---|---|---|---|
| Entity Recognition | Company | 0.94 | 0.75 | 0.83 |
| | Person | 0.91 | 0.87 | 0.89 |
| | City | 0.93 | 0.80 | 0.86 |
| | Country | 0.95 | 0.89 | 0.92 |
| Relation Extraction | Supply Chain | 0.76 | 0.46 | 0.57 |
| | Merger & Acquisition | 0.71 | 0.51 | 0.59 |
| Entity Linking | Company | 0.99 | 0.89 | 0.90 |
| | Person | 0.91 | 0.73 | 0.81 |

Metrics—

We use the standard evaluation metrics: Precision, Recall and F1-score, as defined in Equation 1:

$$P = \frac{|\text{correctly detected entities}|}{|\text{totally detected entities}|} \quad \text{(Eq. 1)}$$

$$R = \frac{|\text{correctly detected entities}|}{|\text{groundtruth entities}|}, F1\text{-score} = 2 * \frac{P*R}{P+R}$$

The three metrics for relation extraction and entity linking are defined in a similar manner by replacing "entities" with "relations" or "entity pairs" in the above three equations.

Results—

Figure 16:
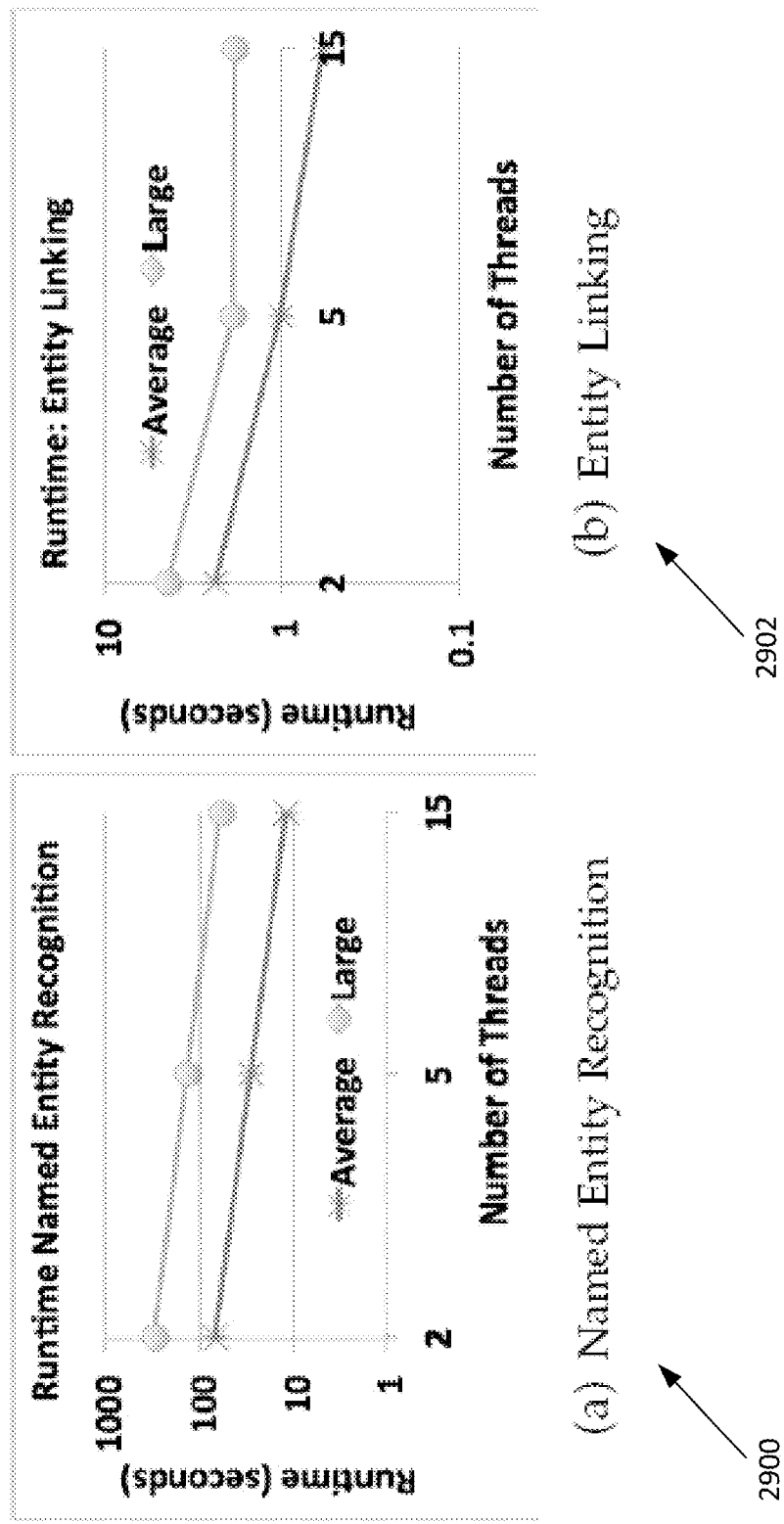
FIG. 16 provides two graphs illustrating the runtime of named entity recognition and entity linking processes according to the present invention.

Table 3 and FIG. 16 demonstrate the results of our NER component on four different types of entities, the results of our relation extraction algorithm on two different relations, and our entity linking results on two different types of entities. In addition, we report the runtime of our NER shown in graph 2900 and entity linking components shown in graph 2902 on two types of documents: Average and Large. "Average" refers to a set of 5,000 documents whose size is smaller than 15 KB with an average size of 2.99 KB. "Large" refers to a collection of 1,500 documents whose size is bigger than 15 KB but smaller than 500 KB (the maximum document size in our data) with an average size of 63.64 KB.

Evaluation of Natural Language Querying

Dataset—

We evaluate the runtime of the different components of the natural language interface, TR Discover, on a subset of our knowledge graph. Our evaluation dataset contains about 329 million entities and 2.2 billion triples. This dataset primarily covers the following domains: Intellectual Property, Life Science, Finance and Legal. The major entity types include Drug, Company, Technology, Patent, Country, Legal Case, Attorney, Law Firm, Judge, etc. Various types of relationships exist between the entities, including Develop (Company develops Drug), Headquartered in (Company headquartered in Country), Involved In (Company involved in Legal Case), Presiding Over (Legal Case presided over by Judge), etc.

Infrastructure.

We used two machines for evaluating performance: Server-GraphDB: We host a free version of GraphDB, a triple store, on an Oracle Linux machine with two 2.8 GHz CPUs (40 cores) and 256 GB of RAM; and Server-TRDiscover: We perform question understanding, auto-suggest, and FOL translation on a RedHat machine with a 16-core 2.90 GHz CPU and 264 GB of RAM. We use a dedicated server for hosting the GraphDB store, so that the execution of the SPARQL queries is not interfered by other processes. A natural language question is first sent from an ordinary laptop to Server-TRDiscover for parsing and translation. If both processes finish successfully, the translated SPARQL query is then sent to Server-GraphDB for execution. The results are then sent back to the laptop.

Random Question Generation—

To evaluate the runtime of TR Discover, we randomly generated 10,000 natural language questions using our auto-suggest component. We give the auto-suggest module a starting point, e.g., drugs or cases, and then perform a depth-first search to uncover all possible questions. At each depth, for each question segment, we select b most highly ranked suggestions. Choosing the most highly ranked suggestions helps increase the chance of generating questions that will result in non-empty result sets to better measure the execution time of SPARQL queries. We then continue this search process with each of the b suggestions. By setting different depth limits, we generate questions with different levels of complexity (i.e., different number of verbs). Using this process, we generated 2,000 natural language questions for each number of verbs from 1 to 5, thus 10,000 questions in total.

Among these 10,000 questions, we present the evaluation results on the valid questions. A question is considered valid if it successfully parses and its corresponding SPARQL query returns a non-empty result set. Our parser relies on a grammar (i.e., a set of rules) for question understanding; as the number of rules increases, it is possible that the parser may not be able to apply the right set of rules to understand a question, especially a complex one (e.g., with five verbs). Also, as we increase the number of verbs in a question (i.e., adding more query constraints in the final SPARQL query), it is more likely for a query to return an empty result set. In both cases, the runtime is faster than when successfully finishing the entire process with a non-empty result set. Thus, we only report the results on valid questions.

Runtime Results—

Figure 14:
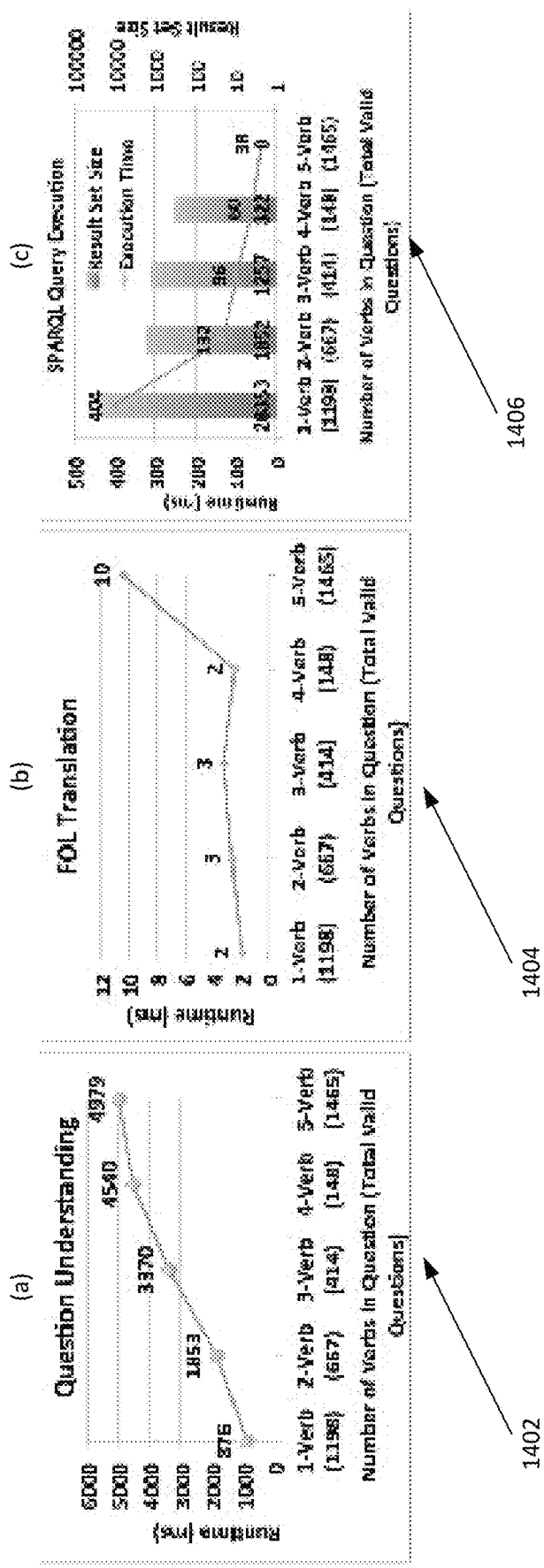
FIG. 14 provides three graphs (a), (b), and (c) that show the runtime of natural language parsing according to the present invention.

FIG. 14 includes three graphs (a) 1402, (b) 1404, and (c) 1406 that show the runtime of natural language parsing, FOL translation and SPARQL execution respectively. According to FIG. 14 graph (a) 1402, unless a question becomes truly complicated (with 4 or 5 verbs), the parsing time is generally around or below three seconds. One example question with 5 verbs could be Patents granted to companies headquartered in Australia developing drugs targeting Lectin mannose binding protein modulator using Absorption enhancer transdermal. We believe that questions with more than five verbs are rare, thus we did not evaluate questions beyond this level of complexity. In our current implementation, we adopt NLTK (http://www.nltk.org/) for question parsing; however, we supply NLTK with our own FCFG grammar and lexicon.

From FIG. 14 graph (b) 1404, we can see that only a few milliseconds are needed for translating the FOL of a natural language question to a SPARQL query. In general, the translator only needs to traverse the FOL parse tree (FIG. 11) and appropriately combines the different query constraints.

Finally, we demonstrate the execution time and the result set size of the translated SPARQL queries in FIG. 14 graph (c) 1406. For questions of all complexity levels, the average execution time is below 500 milliseconds, showing the potential of applying a triple store to real-world scenarios with a similar size of data. As we increase the number of verbs in a question, the runtime actually goes down, since GraphDB is able to utilize the relevant indices on the triples to quickly find potential matches. In addition, all of our 5-verb testing questions generate an empty result set, thus here a question is valid as long as it successfully parses.

Time Complexity Analysis—

For our Natural Language Processing (NLP) modules, the complexity of entity extraction is $O(n+k*\log k)$, where n is the length of the input document and k is the number of entity candidates in it ($k<<n$ with some edge cases with a large number of candidates). The worst-case complexity of our relation extraction component is $O(n+l2)$, where n is the length of the input document, and l is the number of extracted entities, as we consider all pairs of entities in the candidate sentences. The complexity of linking a single entity is $O(b*r2)$, where b is the block size (i.e., the number of linking candidates) and r is the number of attributes for a given entity.

For natural language interface, the time complexity of parsing a natural language question to its First Order Logic representation (FOL) is $O(n3)$, where n is the number of words in a question. We then parse the FOL to an FOL parse tree with time complexity $O(n4)$. Next, the FOL parse tree is translated to a SPARQL query with in-order traversal with $O(n)$ complexity. Finally, the SPARQL query is executed against the triple store. The complexity here is largely dependent on the nature of the query itself (e.g., the number of joins) and the implementation of the SPARQL query engine.

Never-Ending Language Learning (NELL) and Open Information Extraction (OpenIE) are two efforts in extracting knowledge facts from a broad range of domains for building knowledge graphs. In the Semantic Web community, DBpedia and Wikidata are two of the notable efforts in this area. The latest version of DBpedia has 4.58 million entities, including 1.5 million persons, 735 K places and 241 K organizations, among others. Wikidata covers a broad range of domains and currently has more than 17 million "data items" that include specific entities and concepts. Various efforts have also been devoted to creating knowledge graphs in multiple languages.

Named Entity Recognition—

Early attempts for entity recognition relied on linguistic rules and grammar-based techniques. Recent research focuses on the use of statistical models. A common approach is to use Sequence Labeling techniques, such as hidden Markov Models, conditional random fields and maximum entropy. These methods rely on language specific features, which aim to capture linguistic subtleties and to incorporate external knowledge bases. With the advancement of deep learning techniques, there have been several successful attempts to design neural network architectures to solve the NER problem without the need to design and implement specific features. These approaches are suitable for use in the SCAR system.

Relation Extraction—

Similar to NER, this problem was initially approached with rule-based methods. Later attempts include the combination of statistical machine learning and various NLP techniques for relation extraction, such as syntactic parsing, and chunking. Recently, several neural network-based algorithms have been proposed for relation extraction. In addition, research has shown that the joint modeling of entity recognition and relation extraction can achieve better results that the traditional pipeline approach.

Entity Linking—

Linking extracted entities to a reference set of named entities is another important task to building a knowledge graph. The foundation of statistical entity linking lies in the work of the U.S. Census Bureau on record linkage. These techniques were generalized for performing entity linking tasks in various domains. In recent years, special attention was given to linking entities to Wikipedia by employing word disambiguation techniques and relying on Wikipedia's specific attributes. Such approaches are then generalized for linking entities to other knowledge bases as well.

Natural Language Interface (NLI)—

Keyword search has been frequently adopted for retrieving information from knowledge bases. Although researchers have investigated how to best interpret the semantics of keyword queries, oftentimes, users may still have to figure out the most effective queries themselves to retrieve relevant information. In contrast, TR Discover accepts natural language questions, enabling users to express their search requests in a more intuitive fashion. By understanding and translating a natural language question to a structured query, our system then retrieves the exact answer to the question.

NLIs have been applied to various domains. Much of the prior work parses a natural language question with various NLP techniques, utilizes the identified entities, concepts and relationships to build a SPARQL or a SQL query, and retrieves answers from the corresponding data stores, e.g., a triple store, or a relational database. In addition to adopting fully automatic question understanding, CrowdQ also utilizes crowd sourcing techniques for understanding natural language questions. Instead of only using structured data, HAWK utilizes both structured and unstructured data for question answering.

Compared to the state-of-the-art, we maintain flexibility by first parsing a question into First Order Logic, which is further translated into SPARQL. Using FOL allows us to be agnostic to which query language will be used later. We do not incorporate any query language statements directly into the grammar, keeping our grammar leaner and more flexible for adapting to other query languages. Another distinct feature of our system is that it helps users to build a complete question by providing suggestions according to a partial question and a grammar. Although ORAKEL also maps a natural language question to a logical representation, no auto-suggest is provided to the users.

Some challenges involved in NLP include the proportion of time spent on developing a training set, including time used in labeling items in a training set. Existing systems and methods may spend 30% or more of all NLP system development time on training set labelling. In one embodiment of the present invention, the time spent on labelling a training set can be reduced significantly by reducing the size of the training by one of three methods. The first method is to automatically identify all negative examples in a training set by considering all items that are not identified as positive examples within the training set as negative examples. In a second method, all negative examples that have a high likelihood of being positive are excluded from automatic labelling as negative examples, and all remaining examples are automatically labelled as negative. In a third method, the labelling of negative examples is guided by user iterative feedback and triage terms. Positive examples are identified by a user and interesting negative examples are identified based on the identified positive examples from within the training data set.

The NLP processing may also be further optimized to improve the speed and efficiency of NLP processing and generation by optimizing based on content type, metadata information, or by use case optimization. In content type optimization, such as by news or research content types, the NLP system may be optimized to the language, structure, diversity of sources, and length of documents in the corpus for that content type. Metadata optimization may include optimizing for particular companies and topics based on metadata associated with document(s) in the document corpus. Use case optimization may include the segmented classification of documents in the corpus, identification of public companies in a research report, or the use of an information "ticker" in a research report on the document corpus.

Knowledge Graph in Practice—

The Google Knowledge Graph has about 570 million entities as of 2014 and has been adopted to power Google's online search. Yahoo and Bing (http://blogs.bing.com/search/2013/03/21/understand-your-world-with-bing/) are also building their own knowledge graphs to facilitate search. Facebook's Open Graph Protocol (http://ogp.me/) allows users to embed rich metadata into webpages, which essentially turns the entire web into a big graph of objects rather than documents. In terms of data, the New York Times has published data in RDF format (data.nytimes.com) (5,000 people, 1,500 organizations and 2,000 locations). The British Broadcasting Corporation has also published in RDF, covering a much more diverse collection of entities (www.bbc.co.uk/things/), e.g., persons, places, events, etc. Thomson Reuters now also provides free access to part of its knowledge graph (permid.org) (3.5 million companies, 1.2 million equity quotes and others). A knowledge graph may comprise the information shown in Table 4, below.

TABLE 4

Thomson Reuters Knowledge Graph Feed Content

| Content Set | Content | Example Fields | Example Relationships |
|---|---|---|---|
| Knowledge Graph - Core Entities | | | |
| Organizations Thomson Reuters Organization Authority is central to the connection of tradable instruments, business transactions, news and events. Entity data is gathered from more than use numeral 1,000 primary sources, including Exchange, Registrar, Regulator, Annual Report and Prospectus. | Includes 4.6M organizations, current and historical, that Thomson Reuters has identified as involved in the capital markets, including deeper content around, for example, public and bond issuers, M&A participants and investors, including fund managers and private equity. Over 1.2 million hierarchy relationships. | Over 100 fields are available, including: Names Local Language & Official Names. Former Names & Alias Address & Contact Headquarters Address, Registered Address, Website, Phone Identifiers PermID, LEI, CIK, Registration Number, Tax Identifier | Hierarchy Immediate & Ultimate Affiliates, Successor Country Domicile, Incorporation, Jurisdiction Regulators Registration Authority Tax Authority Primary Regulator |
| Instruments & Quotes Comprehensive equity data covers all exchanges and allows customers to connect company data to security masters. With instruments and quotes, customers can identify which tradable securities are impacted by any company-level information. | Includes all current and historical Equity Instruments and Quotes, 240K equity instruments and 1.17 million equity quotes across 160 exchanges. | Instrument PermID, Instrument Name, Asset Class, Active/Inactive Status Quote PermID, RIC, Ticker, MIC, Exchange, Currency & Currency Unit | Issuers Instrument to Issuer Quote to Instrument Metadata Currency, Asset Class, Share Class, Exchange |
| Officers & Directors Thomson Reuters Officers and Directors is one of the most comprehensive databases of public company executives and directors in the world, | Over 2 million officer and director positions, including historical positions from 1998. Every person is uniquely identified independently from his or her position. Coverage includes all Public and Private Equity backed companies. | Available fields include: Personal Details Name, Age, Biography, Education Work History Corporate Affiliations, As-reported and Standardized Titles, Committees Served | Role Officer, Director Personal Committee, Education, Qualification |
| Metadata Thomson Reuters provides a comprehensive set of metadata that describe the financial markets including the content, taxonomies and relationships available from Thomson Reuters publish. We make available all the metadata needed to understand the content within the Knowledge Graph, plus additional metadata that indicates what other content is available from Thomson Reuters. | Over 5 million metadata entities, including major classification systems and detailed data item coverage for every Thomson Reuters published content set. Includes ISO and other industry standards where applicable. | Available metadata includes: Classification Systems Industry Classifications - TRBC, NAICS Asset Classes: Equity, Commodities, Fixed Income, FX News Topics Core Metadata Geographies, Countries, Cities Commodities, Currencies, Languages Holidays, Units, Time Zones Data Set Specific Metadata Relationships, Definitions, Data Elements | Geographies Administrative Units, Subdivision Industry Business Sector, Industry Currencies Currency CurrencyUnit Taxonomies Asset Class Hierarchy |

TABLE 4-continued

Thomson Reuters Knowledge Graph Feed Content

| Content Set | Content | Example Fields | Example Relationships |
|---|---|---|---|
| Value Chain Relationships | | | |
| Supply Chain Thomson Reuters growing collection of publicly disclosed supplier and customer relationships. Provides evidence text (aka snippets) that went into determining the relationship. | 190,000 relationships for 28,000 companies extracted from 11 million publicly available sources dating back to 2011. Coverage for 5,000 public companies. | Agreements Organizations, Confidence Score Source Information Text, Date, Source Type | Supply Chain Supplier Customer |
| Comparable Companies Find competitors, peers and related companies to identify comprehensive and often non-obvious targets. | Comparable Companies is a list of 2 million relationships for 200,000 companies generated using a proprietary algorithm that analyzes co-occurrence and frequency of appearances within news, together with industry and geography information. | Organizations Relative Similarity Score | Comparable Company |
| Joint Ventures & Strategic Alliances Thomson Reuters Joint Ventures & Strategic Alliances includes agreements that result in the formation of new entities (JVs) and business partnerships (alliances). | Dating back to 1985, Thomson Reuters JVs & Alliances covers over 60,000 Joint Ventures and 80,000 Strategic Alliances. | Up to 100 fields are available, including: Deal Information Dates, Investment, Size, Duration Agreement Type Technology, Marketing, Product, Cross-Border Alliance | Joint Venture Strategic Alliance Resulting Company |
| Industry Classification Thomson Reuters Business Classification (TRBC) is a comprehensive, detailed and up-to-date market-oriented sector and industry classification. | Over 727,000 companies in 130 countries with five levels of industry classification. History is available back to 1999. | In addition to the industry assignment, the dates of prior assignments and prior classification schemes are available. | Economic Sector Business Sector Industry Group Industry Activity |

Towards Generic Data Transformation and Integration—

State-of-the-art NER and relation extraction techniques have been mainly focused on common entity types, such as locations, people and organizations; however, our data covers a much more diverse set of types of entities, including drugs, medical devices, regulations, legal topics, etc., thus requiring a more generic capability. Being able to integrate such mined information from unstructured data with existing structured data and to ultimately generate insights for users based upon such integrated data is a key advantage.

Although these techniques are used to build and query the graph in the first place, these services can also benefit from information in the knowledge graph. First of all, our knowledge graph is used to create gazetteers and entity fingerprints, which help to improve the performance of our NER engine. For example, company information, such as industry, geographical location and products, from the knowledge graph is used to create a company fingerprint. For entity linking, when a new entity is recognized from a free text document, the information from the knowledge graph is used to identify candidate nodes that this new entity might be linked to. Finally, our natural language interface relies on a grammar for question parsing, which is built based upon information from the knowledge graph, such as the entity types (e.g., company and person) and their relationships (e.g., "works_for").

Data Modeling—

Providers, such as Thomson Reuters, are concerned with a wide range of content covering diverse domains, e.g., that range from finance to intellectual property & science and to legal and tax. It would be difficult and time-consuming task for engineers to precisely model such a complex space of domains and convert the ingested and integrated data into RDF triples. Rather than have engineers understand and perform modeling, we collaborate closely with editorial colleagues to model the data, apply the model to new contents, and embed the semantics into our data alongside its generation.

Distributed and Efficient RDF Data Processing—

The relative scarcity of distributed tools for storing and querying RDF triples is another challenge. This reflects the inherent complexities of dealing with graph-based data at scale. Storing all triples in a single node would allow efficient graph operations while this approach may not scale well when we have an extremely large number of triples. Although existing approaches for distributed RDF data processing and querying often require a large and expensive infrastructure, one solution is to use a highly scalable data warehouse (e.g., Apache Cassandra (http://cassandra.apache.org/) and Elasticsearch) for storing the RDF triples; in the meanwhile, slices of this graph can then be retrieved from the entire graph, put in specialized stores, and optimized to meet particular user needs.

Converging Triples from Multiple Sources—

Another challenge is the lack of inherent capability within RDF for update and delete operations, particularly when multiple sources converge predicates under a single subject. In this scenario, one cannot simply delete all predicates and apply the new ones: triples from another source will be lost. While a simplistic solution might be to delete by predicate, this approach does not account for the same predicate coming from multiple sources. For example, if two sources state a "director-of" predicate for a given subject, an update from one source cannot delete the triple from the other source. One solution is to use quads with the fourth element as a named graph allowing us to track the source of the triple and act upon subsets of the predicates under a subject.

Natural Language Interface—

The first challenge is the tension between the desire to keep the grammar lean and the need for broad coverage. Our current grammar is highly lexicalized, i.e., all entities (lawyers, drugs, persons, etc.) are maintained as entries to the grammar. As the size of grammar expands, the complexity of troubleshooting issues that arise increases as well. For example, a grammar with 1.2 million entries takes about 12 minutes to load on our server, meaning that troubleshooting even minor issues on the full grammar can take several hours. As a solution, we are currently exploring options to delexicalize portions of the grammar, namely collapsing entities of the same type, thus dramatically reducing the size of the grammar.

The second issue is increasing the coverage of the grammar without the benefit of in-domain query logs both in terms of paraphrases (synonymous words and phrases that map back to the same entity type and semantics) and syntactic coverage for various constructions that can be used to pose the same question. Crowdsourced question paraphrases may be used to expand the coverage of both the lexical and syntactic variants. For example, although we cover questions like which companies are developing cancer drugs, users also supplied paraphrases like which companies are working on cancer medications thus allowing us to add entries such as working on as a synonym for develop and medication as a synonym for drug.

Figure 12:
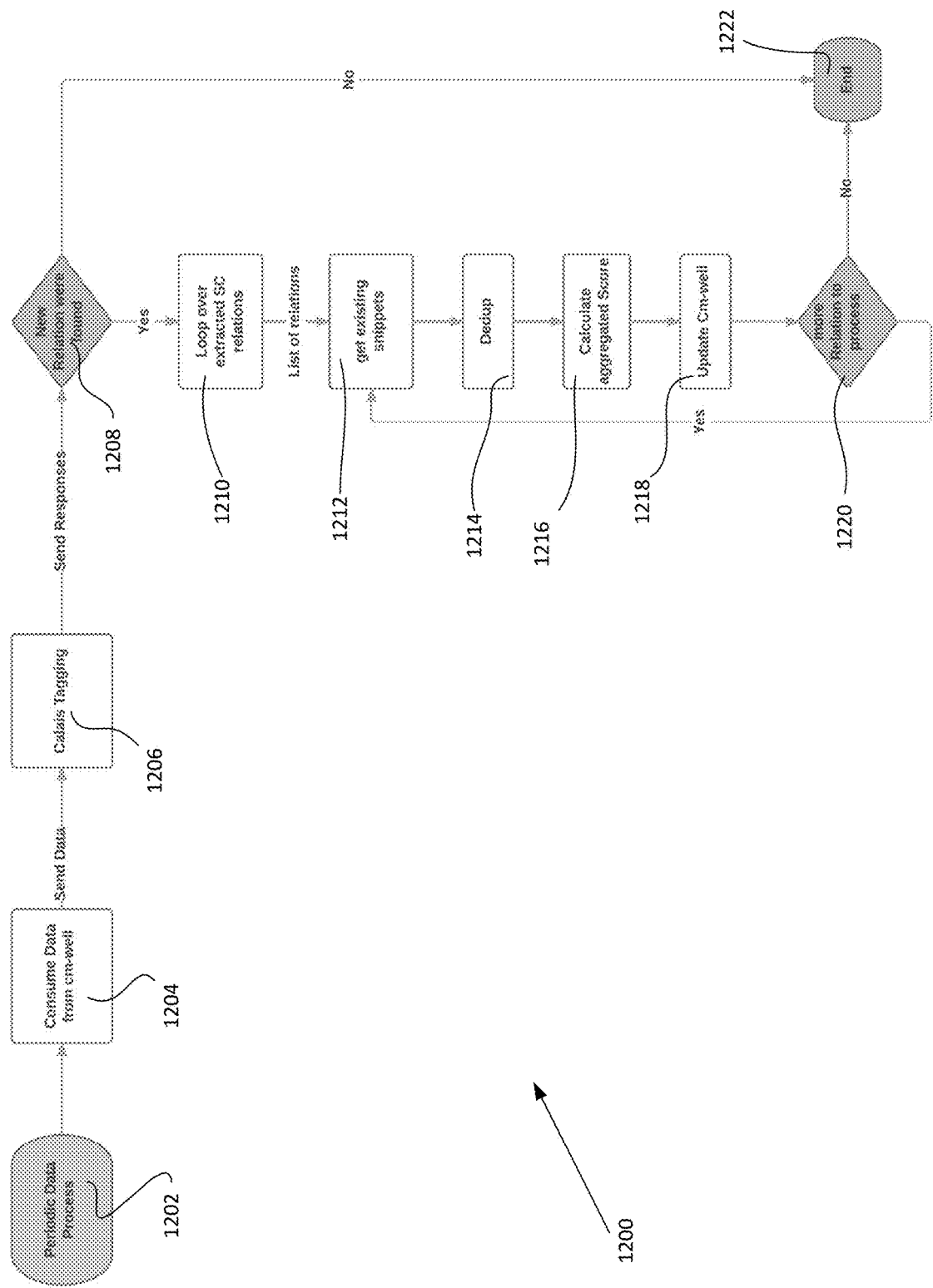
FIG. 12 is a flowchart illustrating a supply chain communication process according to the present invention.

FIG. 12 is a flowchart illustrating a supply chain process 1200 for use in obtaining, preprocessing and aggregating evidences of supply chain relationships as discussed in detail above. The process 1200 may be used for extracting and updating existing supply chain relationships and incorporating the new data with existing Knowledge Graphs, e.g., both a supplier Knowledge Graph related to a supplier-Company A and a customer Knowledge Graph related to a customer-Company B. The periodic data process 1202 starts and first consumes/acquires data from the cm-well at step 1204. This may represent generally the initial process of creating a text corpus ab initio or in updating and maintaining an existing corpus associated with a Knowledge Graph delivery service or platform. This data from 1204 is sent out and in step 1206 the data is pre-processed, e.g., named entity recognition by OneCalais tagging. The OneCalais tagging 1206 sends responses and a determination 1208 identifies whether or not new relations, e.g., supplier-customer relationship, were found in the periodic data process 1202. If new relations are not found the process proceeds to end step 1222. If new relations were found the process proceeds to loop over extracted supply chain relations in step 1210. An identified and determined list of relations is then processed at 1212 to get existing snippets. A deduplication "dedup" process is performed at step 1214. An aggregate score is calculated, e.g., in the manner as described hereinabove, at 1216 on the output of the dedup process 1214. The cm-well (corpus) is updated in step 1218. A determination 1220 identifies if additional relations need to be processed and if so returns to step 1212, if not the process ends at step 1222.

Figure 13:
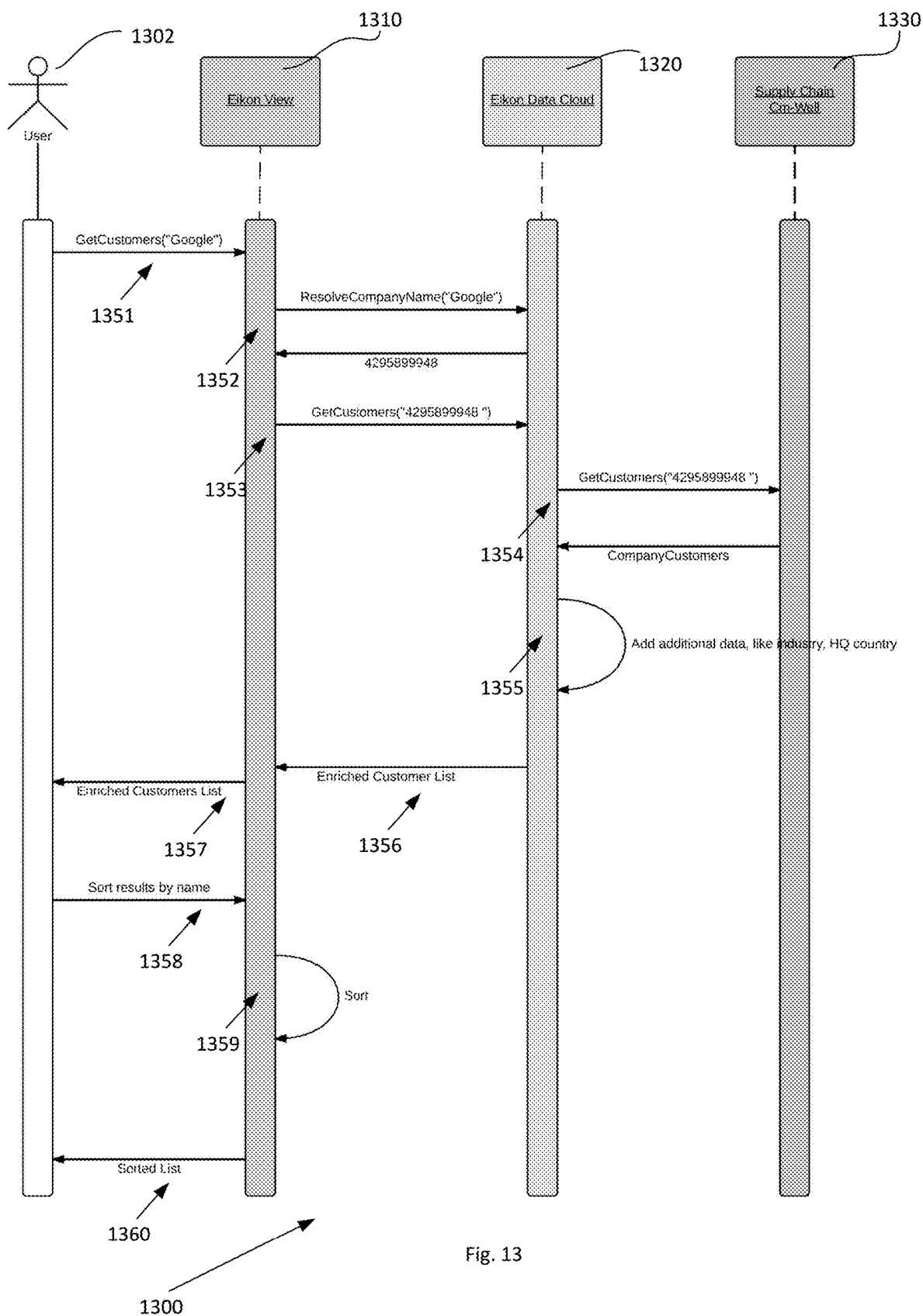
FIG. 13 is a flowchart illustrating a relationship finder process according to the present invention.

FIG. 13 is a sequence diagram illustrating an exemplary Eikon view access sequence 1300 according to one implementation of the present invention operating in connection with TR Eikon platform. A user 1302 submits a query for customers of "Google" at step 1351 to TR Eikon View 1310. Eikon View 1310 resolves the company name "Google" and sends the resolved company name "Google" at step 1352 to the Eikon Data Cloud 1320 which returns an ID of "4295899948." Eikon View 1310 requests customers for entity ID "4295899948" at step 1353. The request is passed by Eikon Data Cloud 1310 to Supply Chain Cm-Well 1330 which returns the company customers to Eikon Data Cloud 1320 at step 1354. Eikon Data Cloud 1320 identifies and adds additional data such as industry, headquarters, and country to the data returned by Supply Chain Cm-Well 1330 to enrich the data at step 1355 and returns the data as an enriched customer list with the list of customer and enriched data to Eikon View 1310 at step 1356. The Eikon View 1310 provides the enriched customer list to the user 1302 at step 1357. The user 1302 may request to sort this information by name at step 1358 and Eikon View 1310 may sort the information at step 1359 and provide the sorted information to the user 1302 as a sorted list at step 1360.

Figure 15:
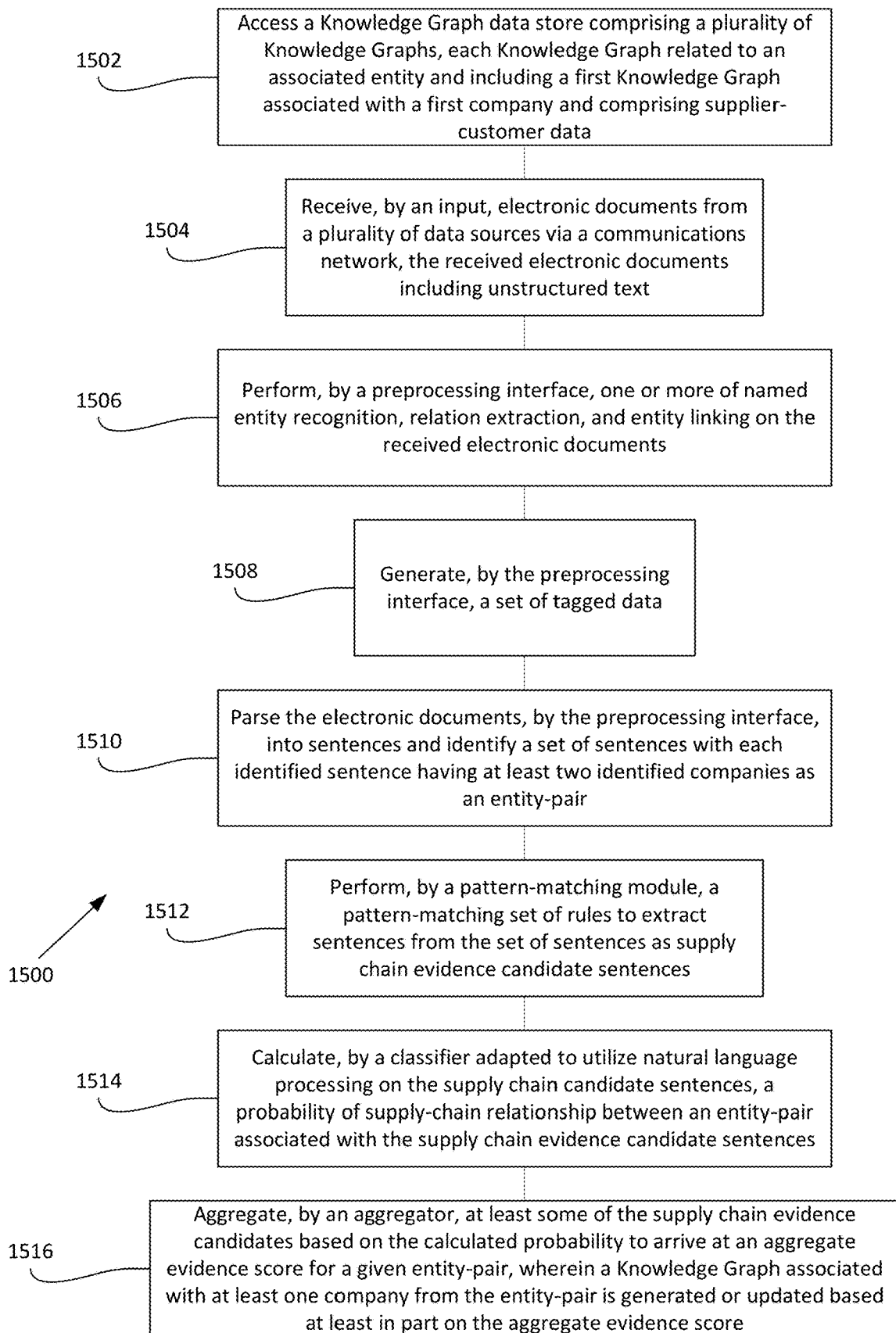
FIG. 15 is a flowchart illustrating a method for identifying supply chain relationships according to the present invention.

FIG. 15 is a flowchart of a method 1500 for identifying supply chain relationships. The first step 1502 provides for accessing a Knowledge Graph data store comprising a plurality of Knowledge Graphs, each Knowledge Graph related to an associated entity and including a first Knowledge Graph associated with a first company and comprising supplier-customer data. In the second step 1504 electronic documents are received by an input from a plurality of data sources via a communications network, the received documents comprise unstructured text. The third step 1506 performs, by a preprocessing interface, one or more of named entity recognition, relation extraction, and entity linking on the received electronic documents. In the fourth step 1508 the preprocessing interface generates a set of tagged data. The fifth step 1510 provides for the parsing of the electronic documents by the preprocessing interface into sentences and identification of a set of sentences with each identified sentence having at least two identified companies as an entity-pair. In step 1512 a pattern-matching module performs a pattern-matching set of rules to extract sentences from the set of sentences as supply chain evidence candidate sentences. Next in step 1514, a classifier adapted to utilize natural language processing on the supply chain candidate sentences calculates a probability of a supply-chain relationship between an entity-pair associated with the supply chain evidence candidate sentences. Finally, in step 1516 an aggregator aggregates at least some of the supply chain evidence candidates based on the calculated probability to arrive at an aggregate evidence score for a given entity-pair, wherein a Knowledge Graph associated with at least one company from the entity-pair is updated based on the aggregate evidence score.

Intelligent Tagging

Intelligent Tagging adds structure to volumes of data so that intelligence can be more easily drawn from it by processing millions of text documents daily for financial professionals. Intelligent Tagging provides the fastest, easiest, and most accurate way to tag the people, places, facts, and events in content to increase its value, accessibility, and interoperability. Each entity extracted receives a relevance score that accurately indicates how important that entity is to the document. All of this makes content more accessible and valuable via the automatic generation of rich metadata. Intelligent Tagging uses Natural Language Processing, text analytics, and data-mining technologies to derive meaning from unstructured information—including research reports, news articles, blog posts, and more. Additionally, it appends a Thomson Reuters PermID® (Permanent Identifier) to text for easier access to the most relevant information.

An advantage of assigning unique identifiers, or PermIDs, which go beyond keywords, is the identification of connections that would otherwise be missed.

PermId Model of Identity

As data is exchanged and shared in an increasingly widespread fashion, the need grows for a means by which all parties involved can communicate identity. Identity is information intended to uniquely pick out an individual, salient thing in the real world. This information is captured as a set of defining characteristics; properties of the object most commonly used to differentiate it, but which do not require highly committed forms of agreement in advance of their use. In human and machine communication, signifying the object of description or reference involves sharing an identifier that acts as a proxy for those defining characteristics. Objects are "dubbed" with names, knowing that when the name is used, the characteristics by which the object is known can be pictured. Machines give objects unique identifiers in order that the data recorded about the object may be retrieved, compared or updated.

Machine use of identifiers in communication has historically required all participating devices to agree on the selection, nature, and form of the characteristics used to uniquely distinguish the members of a given object type. For example, machines exchanging data on people need to have agreed upon the common characteristics of people that identify individuals as unique in the population concerned. (In this way of working, identity might be said to be 'tightly coupled' between the participants.)

Figure 17:
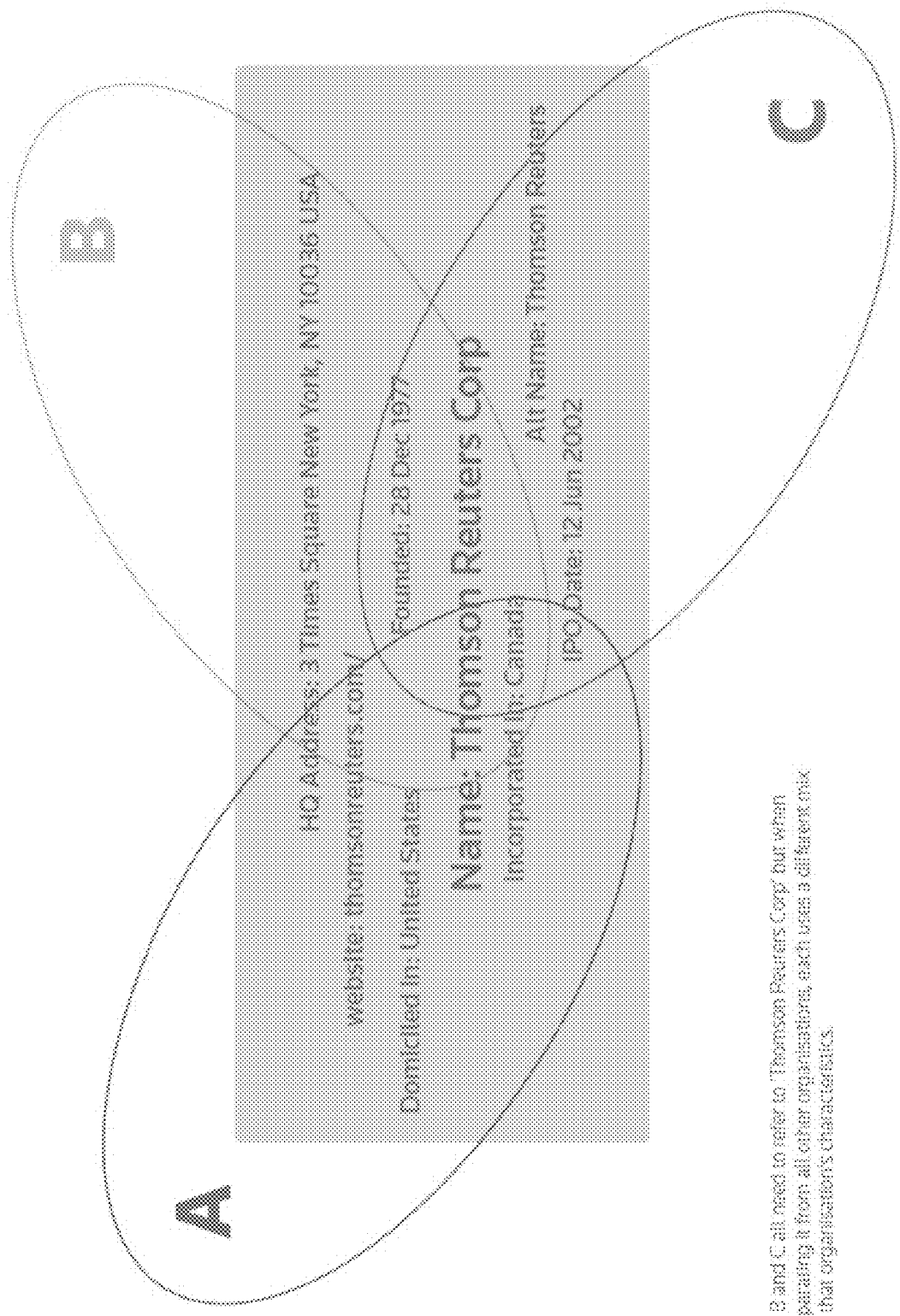
FIGS. 17 and 18 provide graphic illustrations of references and information related to a specific entity according to the present invention.

The scale of the Web makes such agreement difficult to achieve and even more difficult to maintain, as new participants become independently involved, the population of individuals described increases, and the outlier set—members of the population who cannot be separated by the chosen characteristics—grows. The solution to this problem is to adopt "loose coupling" of identity as shown in FIG. 17. People do this all the time in conversation. When discussing a specific person, company, or any other object by name, there is no expectation of a previously agreed-upon set of characteristics that corresponds to the name.

Instead people draw on their own experience. Provided that each person converts the identifier (name) used in communication to a set of characteristics that is unique to each of us and overlaps enough between us, there is a high probability that the same person is being discussed. This "loosely coupled" scheme of identity can be improved if the participants refer to a common lookup and synchronization point. By pooling together a wider selection of characteristics by which individuals might uniquely identify the members of a set, and by giving each member of the set an opaque identifier, participants can exchange the identifier and each use their preferred subset of characteristics to convert the identifier back into what it means to them. The maintenance by a shared authority of a managed set of characteristics for each object significantly raises the accuracy and precision of the method.

Figure 18:
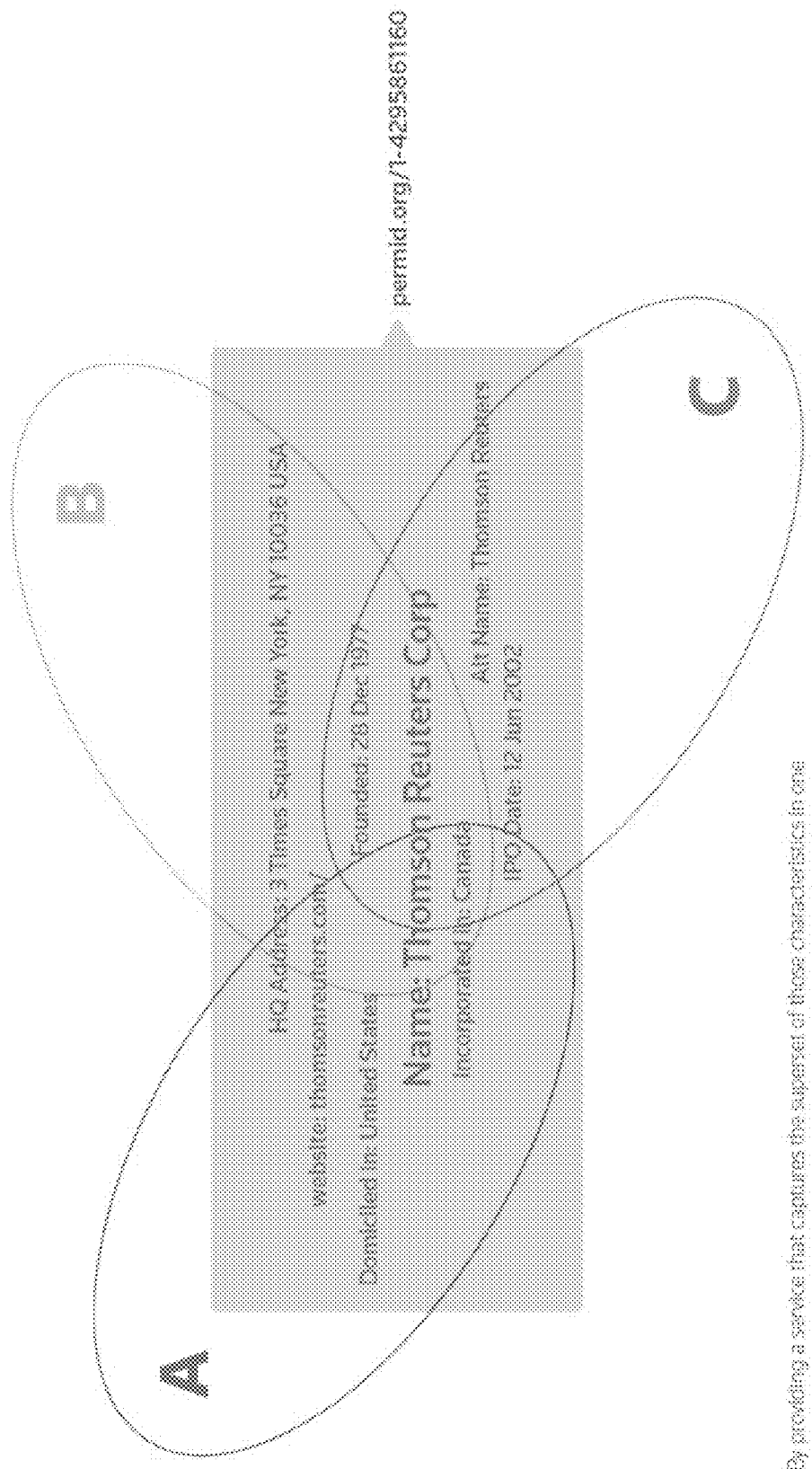

Furthermore, comparing the identifier for equality is the same as comparing the understanding of identity; if both participants have the same identity for an object it can be known that both are referring to the same object as shown in FIG. 18. The operation of such a model might be as shown as follows. 1. An authority collects information about objects that are interesting to the community and how they are known and differentiated across the community. It does this using specialized understanding of the community and of the objects in question. 2. This information is used by the authority to build a registry of known objects. 3. Each object's registry entry is assigned an immutable Open PermID. 4. Users may perform two-way resolution of the information and the Open PermID according to whatever subset of the registry entry they are familiar with. 5. Consequently the Open PermID acts as a "lingua franca" for identity: it can be ascertained from and converted to whatever subset of the registry data any of the users are familiar with. It can be used as an anchor for communicated information or as a consistent identity for workflow integration. 6. By contributing to the range of data inputs used by the authority, individual participants may improve the precision and range of information held in the registry.

For example: 1. The authority sources data from major and minor providers concerning commercial organizations. 2. The authority disambiguates and matches/organizes that data into a registry of unique organizations, each comprising multiple characteristics taken from across the sources. 3. Each organization so represented in the registry is assigned an Open PermID. 4. User A searches the registry for an organization that has the characteristics: a. Name: Thomson Reuters Corp.; b. Address: 3 Times Square, New York, N.Y., 10036, United States. The Registry returns three 'hits'. All the characteristics for each entry are returned. From the additional data, User A selects the second hit as the right one. From this, he gets the permid.org/1-4295861160. 5. User A communicates some specific information concerning permid.org/1-4295861160 to User B. 6. User B dereferences permid.org/1-4295861160 using the registry and sees all of the characteristics for that entry. 7. From that, User B can see that she knows the object as the organization: a. Alternate Name: Thomson Reuters; b. Incorporated in: Canada.

Figure 19:
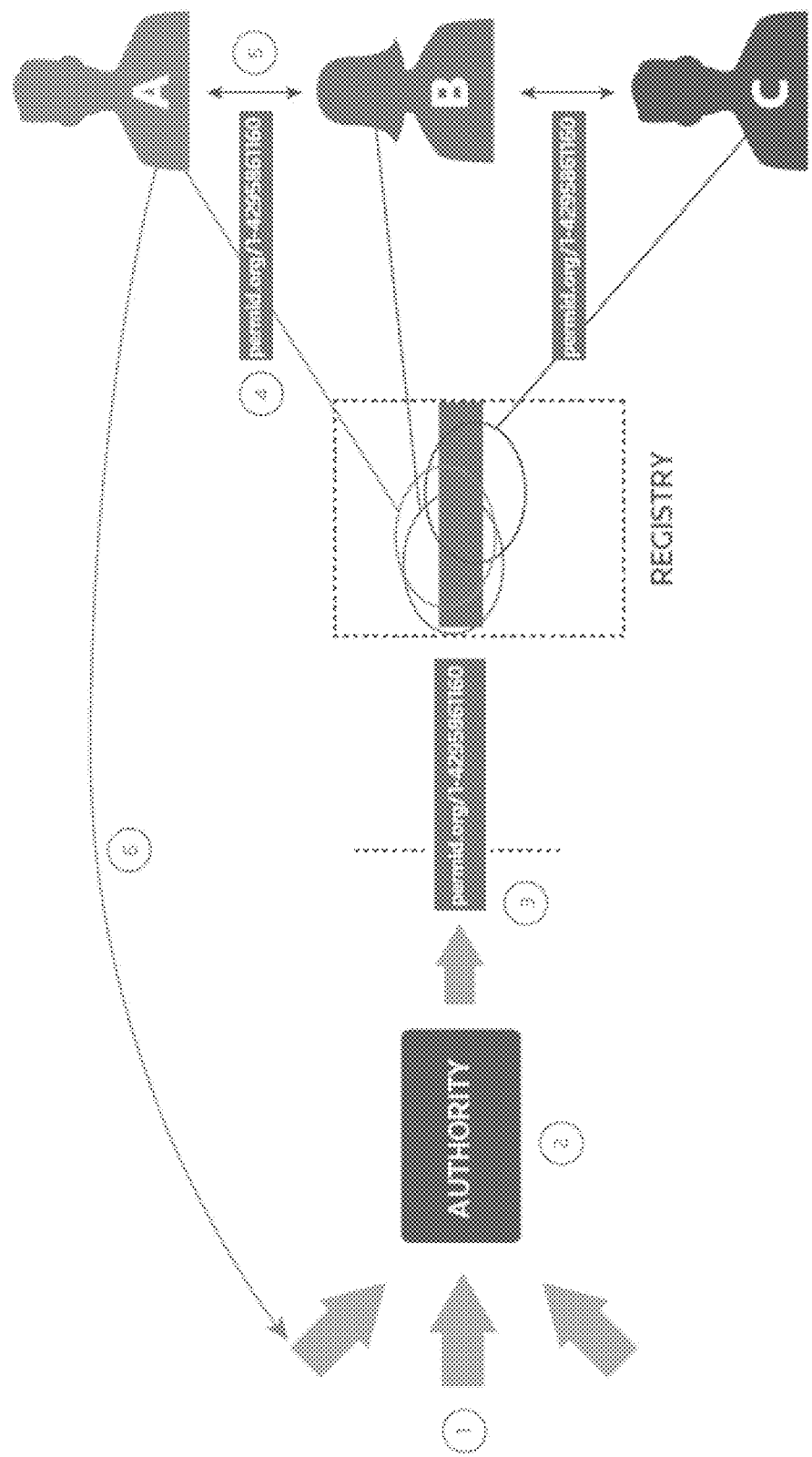
FIG. 19 provides a diagram of an operational model for a permanent identifier according to the present invention.

This system and method, as shown in FIG. 19, has the advantages, in that: a) no fixed scheme of identity has to be agreed by all participants in advance, yet the set of defining characteristics is understood by all; b) the facility decouples individual community participants—each acts independently; c) each participant has a lower cost, yet more precise, means of communicating identity (over meshed conversion, e.g., using mapping tables); and d) the same facility can be extended to many sorts of objects and can be improved by participant contribution on an optional basis.

The Open PermId

The Thomson Reuters Open PermID is an opaque identifier that corresponds to entries managed in a federated registry of objects. An Open PermID uniquely represents the defining characteristics of one specific object in the real world. Assignment of an Open PermID to a specific set of defining characteristics represents capture of the existence of that object.

The Open PermID facility is a mechanism by which groups who share a professional, commercially-based interest in the world can agree upon, pool, and share identity of the objects they need to describe and communicate. A shared facility ensures a stronger consensus and reduces overall costs. The Open PermID facility is designed to ensure that: sufficient defining characteristics are maintained to enable common but isolated agreement on an object of description or communication; all Open PermIDs can be easily and predictably converted to the defining characteristics they represent; all defining characteristics can be searched as one universal set when looking for the appropriate Open PermID with which to label an object; only one Open PermID corresponds to each identity (no duplication); any given identity is seen by all as having a common state and all changes in its state are synchronized with all interested users as quickly as possible; open PermIDs and identities share common rules and can be consistently used irrespective of the object identified or the authority responsible for maintenance; all Open PermIDs are persistent and the corresponding identities are held forever (no reuse, no deletion); authorities may be any authorized party (they do not have to be operated by Thomson Reuters). "Authorization" is by common agreement amongst the users of the Open PermID facility; and anyone using an Open PermID-enabled identity should provide feedback to the authority responsible for it, in order to improve its accuracy or provision.

These Open PermIDs are intended for machine use, not for human readability. Their purpose is to make machine communication of identity more precise and efficient and to reduce the use of computational resources. However, they may be converted to human readable form before display to people, using the systems and methods described below.

A centrally accessed system may be used for the lookup, reconciliation, dereferencing and synchronization of Open PermIDs with the federated registry. The Open PermID is created as a URI, with the following syntax:

permid.org/xxx-xxxxxxxxxx

There is a numeric element to the Open PermID, which is referred to internally as a PermID and conforms to the same rules as the Open PermID. This is what may be exposed in our existing product models.

The Information Model

The Information Model is a representation of the real-world things or concepts that can uniquely be identified. It is a framework for describing content so that it can be delivered and reused in a variety of ways. It's important to note that the Information Model is not a type of data model.

Figure 20:
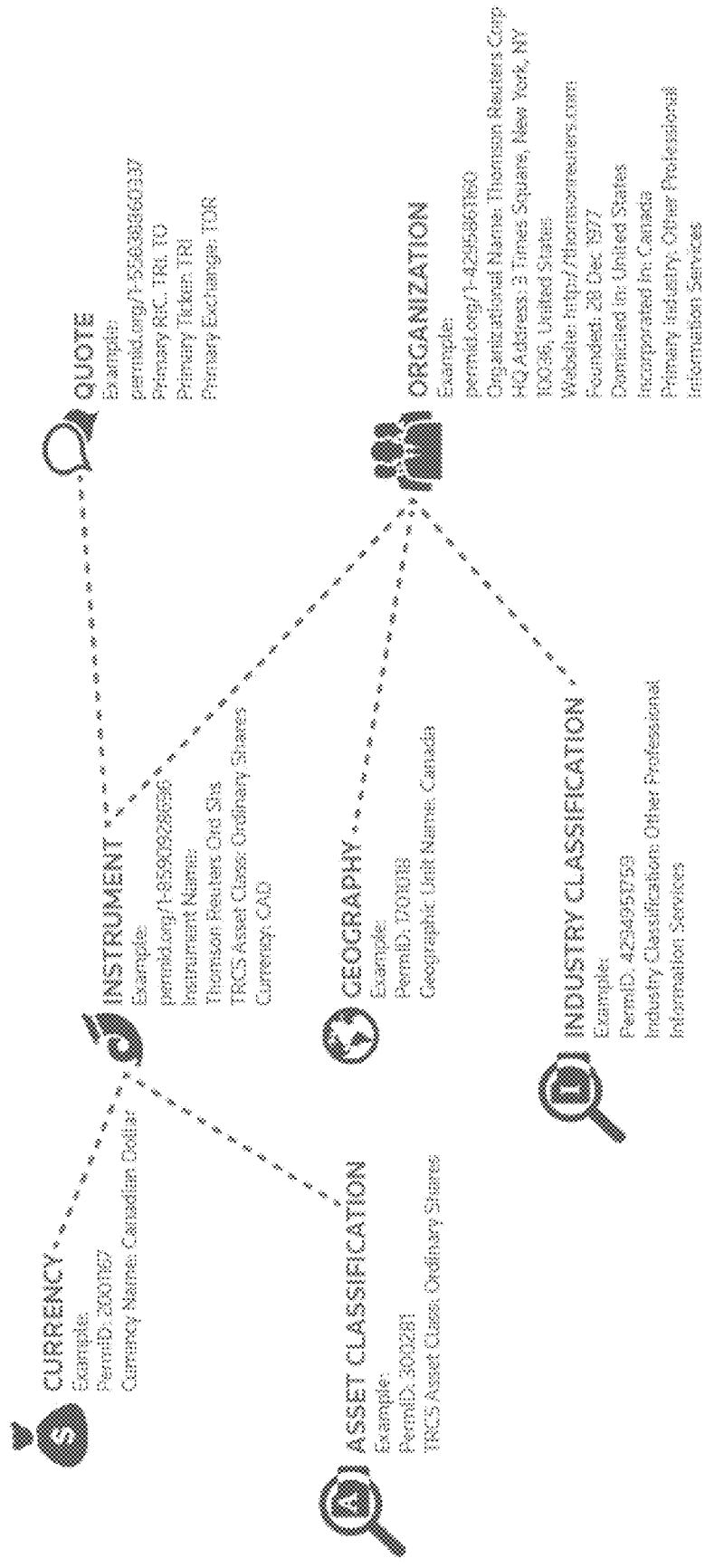
FIG. 20 provides a diagram of an informational model according to the present invention.

The diagram in FIG. 20 shows a small sample of the different types of objects that may be identified and the defining characteristics captured for each instance. Not every object identified is published as open data today, therefore the diagram highlights where an Open PermID has been published vs. where a PermID has been assigned and is currently being used internally only. The Information Model captures the distinct sets of objects for which there is an authority, whose members' defining characteristics are captured and uniquely identified. It also captures dependency between the defining characteristics of objects maintained by different authorities (e.g., instruments and organizations).

All objects managed, may be of an agreed "type": an entity is anything that needs to be uniquely referenced, in order to refer to it, reason about it, describe some aspect of it or use it to describe something else; a relationship is an association between two information objects and acts as a connection or navigation path between them. The different types of object are agreed within the community using exactly the same criteria, for example, for an entity: the object must be externally recognized by participants; the object should have at least one associated public identification scheme; and the object should have a legal status. Other object types are supported internally and may well be exposed externally in the future. There are two major elements to the operation of PermIDs: population of and reference to the federated registry.

The Federated Registry: The Authority and the Master Database

An authority is an organization or group responsible for maintaining defining characteristics about—and assigning PermIDs to—some set of objects in the real world within a registry on behalf of the entire community. Rather than one instance of authority and registry for all types of objects, the operation is federated, typically with distinct authorities managing registries for distinct types of objects. For example, the "Organization Authority" manages a registry of organizations. Each registry has a single point of physical storage and resolution from which all use of PermIDs is synchronized. This is called the master database. The authority is responsible for capturing the existence of the right set of objects described, not for curating any other information properties or characteristics that describe those objects. Properties and characteristics may be subsequently associated with the object, added by other groups and systems using the PermID as their reference point.

Population of a Registry

The goal of the authority is to ensure that the registry contains entries that reflect the state of the objects of description in the real world and the information interests of the community of PermID users.

This requires that the authority understand the community and the available sources of information and also seek continuous, explicit input from those sources and from the community as to new needs, changes in the real world, data corrections that may be required, etc. The authority "curates" a set of identities, each one affirming the existence of a corresponding object of description, either in the present time or in the past. For each identity, the authority must maintain sufficient breadth of "defining characteristics" such that anyone in the community can confidently reconcile their identification of an object with the corresponding PermID. The authority will: use a variety of information sources, open and closed, Thomson Reuters and third-party; include in the set of maintained 'defining characteristics' a range of symbols, names and other identities by which the object might also be known within the community; use their specialist knowledge to reconcile distinct objects (one reason for federating authorities based on type of object); assign each discrete new object a PermID (from a ranged set rather than algorithmically, to avoid possibility of duplicates); use understanding of the community, seeking continuous, explicit input from the community as to new needs, changes in the real world, data corrections that may be required, etc; use a standard administrative life cycle (Appendix B) to maintain the administrative state of each object (e.g., live, obsolete, superseded, etc.) across all types of objects; detect and resolve any duplicate or erroneous objects (using the administrative life cycle: once created, objects and their PermIDs are never deleted); and ensure that changes in the state of the registry are timely as required by the community of users.

Life Cycle of an Object

Since information changes over time, the authority maintains both administrative and native life cycle states for each object. The administrative life cycle describes the relevance and currentness of an object; it captures a full history of the changes in state in the lifespan, starting with its creation. The administrative life cycle is common for all objects. The native life cycle is independent of the administrative life cycle and depicts the evolution of an object over a period of time. The native life cycle is unique to each object type.

Information Rights

Since the authority uses some licensed, third-party sources as a basis to establish and maintain some registry entries, changes in owner license may require Thomson Reuters to remove any entries based fully on their data. If this happens, an administrative life-cycle state may be used to reflect this and "logically delete" the entry—"nulling" all of the values of the defining characteristics. The registry entry and the PermID will continue to exist as a "null"

reference point to avoid dangling references and to allow any such references to retrieve the status of the entry. The authority will work to re-establish the entry based on other sources. If this is possible, the authority will attempt to ensure the same PermID is used. If it cannot, it may be superseded in the standard manner.

Identity Reference Services

A small set of standard services are made available to the user community, each operating across the full universe of described objects (i.e., the aggregate set of objects published by the federation of registries): Search: Essential for finding the right PermID to use by passing in values for some subset of the "defining characteristics". One or more registry entries each with their respective PermID may be returned: by examination of the full set of defining characteristics for the entries, the user may select the appropriate PermID. Search can operate "by type" or across types, by using common attributes such as name; Reconciliation: Cross-referencing between one or more PermIDs and corresponding identifier or symbol schemes commonly used in the community. This will require exchange of some defining characteristics as well as the identifiers or symbols; Dereferencing: Lookup of the defining characteristics, status, metadata and other limited data elements including common relationships that all correspond to a specific PermID; Feedback: A means by which the community is encouraged and motivated to provide information on needs and data accuracy; Bulk Feed: A mechanism for obtaining large amounts of information, which in turn will enable caching closer to a third party. Additional services may be added in the future.

For this scheme users of identity services should: 1. Synchronize any copy of a registry entry with the Thomson Reuters master registry in a timely fashion; 2. Follow changes in the status of registry entries as communicated by the identity reference services. If an entry is superseded, references and relationships should be updated replacing the superseded entry's PermID with the superseding entry's PermID; and 3. Search for registry entries using the common service or a synchronized privately cached copy.

Search, Reconciliation and Selection from a Candidate List

The nature and role of the search and reconciliation services are important in the system. While dereferencing is completely deterministic (a PermID refers to a specific and unique object of description), search & reconciliation take a user-selected subset of "defining characteristics" and identifiers or symbols and return one or more candidate entries in the registry (along with their PermIDs). The resulting user action to select the right candidate (or to note that there was no candidate that appears correct) is what decouples the user activities from those of the registry. This compulsory activity on the part of the user might be performed by a human or more probably by some kind of machine intelligence—simple rules or AI algorithm of some kind.

Open PermID Interface

The Open PermID capability is provided on the Internet through a web-based user interface. The Open PermID capability encodes and exchanges PermIDs as URIs with the following syntax:

permid.org/xxx-xxxxxxxxxx

These URIs are intended to be completely opaque and persistent, containing no useful information in themselves. The Open PermID capability comprises two elements: 1. A Web-based user interface intended for use by developers and data maintenance staff. It provides a search interface and value-added services for bulk, file-based reconciliation and object extraction from documents; and 2. An interface allowing machine dereference of a URI-represented Open PermID into an RDF representation of the defining characteristics, state and metadata of the registry entry that corresponds to that Open PermID. Not all defining characteristics or all object types are supported through the Open PermID interface.

Support for PermIDs may be added and extended over time. PermIDs may be added to existing product models as a foreign key. Support may be limited to selected product platforms. PermIDs may be encoded and supplied as 64-bit numbers (not URIs). Support may be limited to use as a "foreign key". PermIDs may be added as an extra column or field in order that they can be externally used to correlate objects across products. PermIDs may not be supported as a retrieval key. Search UI interfaces may support lookup by PermID, and the full universe of objects of description and their corresponding PermIDs that exist in the federated registries may not be supported by existing products, which will continue to maintain their own distinct product models and coverage. Some object types may not be supported at all in some products. Coverage across product types and customer entitlement configurations will vary.

As a result the Open PermID capability may be used alongside existing products. While it is possible to convert a 64-bit PermID number to the URI syntax and vice versa, the difference between product and Open PermID coverage may mean that not all such conversions may be supported. A PermID obtained from a paid product converted to a URI format and dereferenced from the Open PermID capability may result in failed lookup [http 404]. A PermID URI obtained from the Open PermID capability converted into a 64 bit number may not be found using a specific product search interface.

Practical Use of the Open PermID Facility

Use in the Community

It is an explicit design goal that Open PermID may be used between participants in the community as a means of exchanging and communicating the identity of described objects. For this to work accurately, participants should: 1. Communicate Open PermIDs in URI format. 2. Dereference Open PermIDs to check their status and meaning when passed and when received. 3. Dereference Open PermIDs using Thomson Reuters provided services or from cached copies that are maintained so as to be faithfully synchronized with the master versions. 4. Reconcile commonly used identifiers or symbols to Open PermIDs using Thomson Reuters reconciliation service. 5. When reconciling local data with Open PermIDs, ensure that: a. The widest set of defining characteristics is used (to ensure best candidate set); b. The intelligence used to make selection from the candidate set is suitably expert. 6. Provide as much feedback as possible.

Extending the Community

In making the Open PermID facility open to all, an explicit goal is to dramatically increase the extent to which the objects whose identity is captured and the basis of that capture (the range of "defining characteristics") is based on community feedback. This is in addition to working for services and data to be provided under open license and according to the agreed best practices of the open-data community. PermID minting is the process and mechanism to enable clients and partners to participate in the creation and maintenance of identities, therefore enhancing the ever-expanding universe within the community. The community may take on the roles of the: Contributor, providing instance-level data on specific subsets of objects on a regular basis, thus enlarging the set of data from which Thomson Reuters manages the registry; and/or Authority: Managing specific instances of object (all defining characteristics, status and metadata) through a managed service provided by Thomson Reuters. In effect this equates to federating the authority that manages a set of objects. This could extend to one owner managing a whole set through Thomson Reuters provided services, such that the master system resides in Thomson Reuters while the authority resides in another organization. Being an authority means managing identity for the whole community of users and sourcing and maintaining a corresponding range of defining characteristics.

Design Goals

The Open PermID system and method originally arose from an internal need to work in a truly scalable, federated means yet have the result of our efforts—information—be usable as a set by our customers, in ways we understood well but also in ways we could not predict.

Some key goals of the system and method include: 1. Maintaining the same form and method of identity irrespective of the subject or form of the information. 2. Ensuring that the precision of identity improves as the use of the facility increases, as a result of wider input about needs, relevance and quality. 3. The ability to consistently and accurately represent relationships and references between objects and information maintained by isolated groups. 4. The immutable identity of objects—once a PermID is assigned, the PermID cannot change. If the object changes, a new PermID is created and chain of supersedence is constructed to enable users to follow how it has changed. Objects and their PermIDs cannot be deleted, only marked as obsolete. Use of PermIDs for communication of historical information is therefore supported. 5. Bi-temporality; the model supports representation of valid time and transaction time where applicable. 6. Convergent consistency. The method is designed for federated environments in which general transactionality across sources is not relevant and consistency of information converges rather than being enforced. Consistency of identity (consistent state of the 'defining characteristics' for a given instance of object with a given PermID) is guaranteed. 7. The ability to be realistic and honest about change. The real world changes, and the immutability of objects and their related PermIDs ensures that we can reflect and record that change. It is also true that people and machines make mistakes. Corrections in identity (e.g., removal of duplicates) must be reflected consistently and swiftly and communicated to all PermID users in a timely fashion. A standard administrative life cycle that applies to all object types helps ensure that this happens. 8. Standards rather than systems. Being explicit about the rules of the method ensure that any implementation can join it as an authority or as a user.

Anatomy of the Permanent Identifier

The following properties of the Open PermID system and method are intended to be consistent, reliable and durable to users of the system and method: Defining Characteristics: The characteristics of an object considered sufficient to establish a unique reference between different parties within the community; Syntax: The Open PermID is created as a URI, with the following syntax: permid.org/xxx-xxxxxxxxxx There is a numeric element to the Open PermID, which is referred to internally as a PermID and conforms to the same rules as the Open PermID. This may be exposed in our existing product models as a 64-bit number; Context & Granularity: permanent identifiers are intended to support their user community in terms of the range of defining characteristics supported and the granularity of their formation. As the community grows this may mean that objects previously regarded as one may divide to become two or more. The standard administrative life cycle will ensure that any such change is communicated to users consistently. However, granularity and scope will not shrink; Scope: permanent identifiers are not dataset specific: they are intended to be usable in any dataset maintained by the user community; Authority: permanent identifiers organize a mixture of coordinating authority function and community contribution; Discoverability: permanent identifiers are discoverable through dereferencing services; Stability: permanent identifiers are never reused and the objects they identify are never deleted from the registry; Timeliness & Synchronization: The Open PermID facility is intended to be timely in terms of real-world change or notifications of administrative change. Synchronization is in general supported through both push and pull methods, although Open services may not support push; Temporality: The Open PermID facility is intended to be able to support both post-corrected and point-in-time historical methods.

Information Objects

An information object is the perception or "surrogate" of the real-world thing or concept that it represents. All mastered information objects may be of an agreed "type": An entity is anything we need to uniquely reference, in order to refer to it, reason about it, describe some aspect of it or use it to describe something else; A relationship is the association between two information objects and acts as a connection or navigation path between them. Information object types are subject to approval. Information object types may be recorded in a single registry. Each information object type may be allocated a permanent identifier.

Information Object Master

A master is a database system that specializes in the management of a registry of the existence of an information object type and is the sole storage and maintenance point for those objects. All instances of a given information object type may be managed by only one master. The attributes recorded for a given information object can be mastered in multiple databases, but they do not all have to be recorded in the master.

Information Object Authority

Information objects are created, maintained, and owned by authorities. An authority is an organizational unit, e.g., a group of content specialists, not systems, which create and maintain information objects. The authority is responsible for creating information objects within its own domain. The authority owns the content in the master and specifies the requirements for the system. There will normally be one authority for a given type, but it can be federated and if so, all authorities for the type will collectively adhere to the principles. An authority will not create an instance of an information object type that it does not own. If a master needs to reference an information object which does not exist and is of a type of which it is not the owner, it will request the owning authority to create it. An authority will have a process to address the request for information object creation from other systems and may build the functionality into the master.

Uniqueness of an Instance

An information object will not be created or registered without a set of attribute values that can be used to uniquely differentiate its existence. Where there are multiple sources or there is a reliance on third-party content for an information-object type, there may be the ability to create a concordance and to highlight and reconcile any inconsistencies. This will prevent the creation of duplicate instances by an authority.

Permanent Identifiers

When an information object is registered, it may be allocated a unique and unchanging identifier, a permanent identifier. This is used to uniquely identify information object type instances across the entire namespace. Each information object created by a master is assigned a PermID from an allocated range which remains static throughout the life of the instance and can never be reassigned. PermID ranges may be allocated to mastering systems and not per information object type being mastered. When ownership of an information object is transferred from one authority to another, the PermID is retained if there is no significant change to the object.

Persistence

Once published, an information object will never be physically deleted and PermIDs will not be reused. If an information object needs to be deleted, the record may be retained and the administrative states used to imply the logical deleted.

Administrative Life Cycle

An administrative life cycle may be implemented for all information objects. The administrative life cycle focuses on streamlining the process for the capture and publication of the information objects within the masters. Data collection and maintenance actions may be segregated from the natural evolution of the entities. An information object can be: Created. At this point a PermID is not allocated; Registered. A PermID is allocated; Published. All the defining characteristics are confirmed, a PermID has been allocated, and the content can be sent out in a strategic data interface; Deleted. This state can only be applied if the content has not been published; Superseded. Replaced by another one; Suspended. The master ceases to provide updates for the content, e.g., the supplier has withdrawn it or the information object is perceived to be of a different "type." For example, changing "organization" to "building," but no home for the new object type exists. This state is expected to be temporary; Obsolete. A logical deletion. Masters will maintain and publish a full history of administrative life-cycle states for all information objects.

Native Life Cycle

An authority should develop and implement a native life cycle for the information object types it masters. The native life cycle of an information object is its internal life cycle based on its inherent nature. The native life cycle is independent of the administrative life cycle.

Temporal Data Support

Mastering systems support temporal dimensions for their content. Authorities determine the temporal dimensions required and which data items are managed on which dimensions, i.e., what we want to keep for business history and what we want to keep for correction history.

Entity De-Duplication

Duplicate instances of the same entity are not be created and maintained. However, if one is created in error, it may be de-duplicated. Masters may be able to remove the duplicate entity occurrences by selecting a survivor, merging data into the survivor, marking the other as superseded and recording the supersession relationship to the survivor. This means that the downstream system can always trace a superseded record to the one which replaced it.

Withdrawal of Information Objects

Masters can support the withdrawal of published objects in a non-disruptive manner. They will also be able to withdraw attributes. Legal, privacy, and/or licensing obligations require that we are able to withdraw published content while ensuring that the consumer experience is not disrupted. Legal obligations related to retaining and distributing personally identifiable data vary across geographies. To support the withdrawal of such data after publication, we will ensure it is suitably identified as such. The master will evaluate content to enable the identification and publication of any that is subject to possible withdrawal.

Relationships

Relationships describe the manner of association between two independent, meaningful information objects. Each relationship will have a subject, an object and a predicate, each referring to an independent and meaningful information object. Relationships connect information objects and form the basis of navigation between them. They may be defined unambiguously (in direction) and may be consumable by machines as well as interpretable by humans. The existence of objects at the endpoints of the relationship will not be dependent upon the existence of the relationship. Alternatively speaking, an object that the relationship connects will have its own meaning and may be interpretable on its own in the absence of any other objects, including other relationships. Therefore, a relationship instance cannot be used to determine the uniqueness of information objects. If a relationship should exist but complete information is not available, it may be published but may be marked as undetermined. In some cases there is a need to indicate the existence of a relationship to an entity where the entity is not known, but where there is semantic information that needs to be conveyed. All "Published" relationship instances will have "Published" information objects at both its ends. Some relationship types are mastered and behave as objects within the information model. Instances of objectified relationships are published with relationship permanent identifiers.

Semantic Web Toolkit

Figure 21:
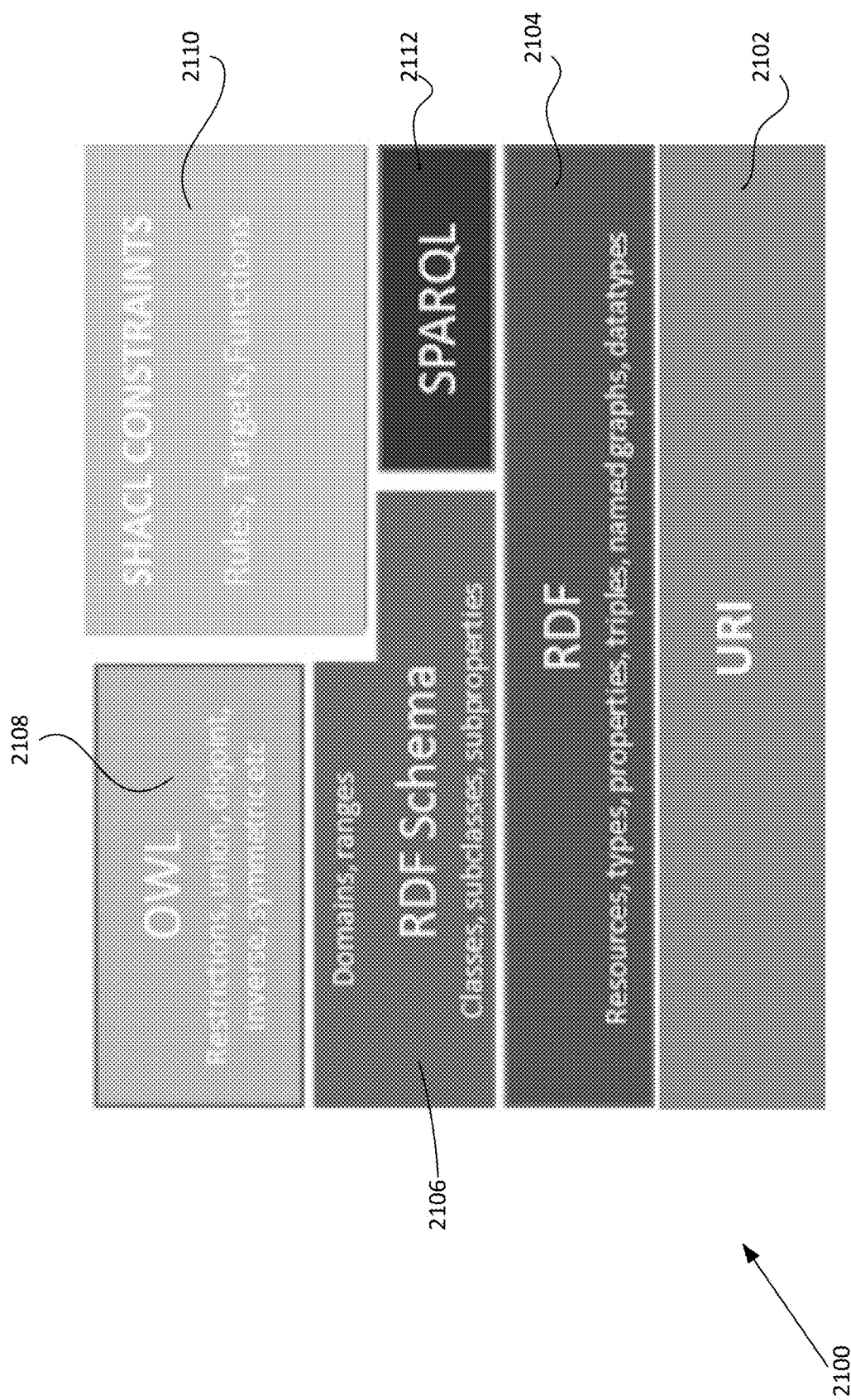

In one embodiment of the invention, the semantic web concept is adapted into a practical application for financial applications. The interaction of specifically selected and interfaced semantic web standards in this embodiment of the invention creates a powerful toolkit for data management that is faster and more efficient than system and methods of the prior art. As shown in FIG. 21, a semantic web toolkit 2100 may comprise Uniform Resource Identifier ("URI") system and language 2102, Resource Description Framework ("RDF") system 2104, RDF schema ("RDFS") 2106, open world assumption language OWL 2108, Shapes Constraint Language ("SHACL") 2110, and SPARQL protocol and RDF query language ("SPARQL") 2112. The semantic web toolkit 2100 may be implemented in the as a semantic module 2101 in the non-volatile memory 20 of the server 12 as part of the system 10 as shown in FIG. 1. The URI 2102 provides a global unique identifier for everything in the system. The RDF 2104 enables the automated processing of information by structuring individual statements in the form of triples. The RDFS 2106 provides for the description of direct and indirect knowledge around entities. OWL 2108 provides for the more advanced inferencing and relationship identification between entities. SHACL 2110 provides a data modeling language to describe constraints (e.g., data quality) on RDF data without requiring extensive programming or processing effort. SPARQL 2112 provides a query language for querying RDF graphs.

The URI 2102 provides a global unique identifier for data within the system. This provides for an agreement of data and data types that facilitates the integration of data and information discovery. With a URI, the "same thing" or same information is represented the same with the same unique identifier in the context of an organization which provides for consistent statements of information. This use of the URI 2102 provides for the merging of metadata and information since both refer to the same "thing". One or more URIs may be used for the same thing, such as a URI, a Full URI, and a QNAME. A URI has already been described. A Full URI consists of two parts, a namespace and a localname. The namespace refers to the domain the Full URI "lives" on (e.g., <http://id.thomsonreuters.com/kg/data/myOrganization> and <http://id.thomsonreuters.com/df/data/myOrganization> are two different "things"). A QNAME uses a prefix to provide for agreement to refer to a namespace in a more user friendly manner. For example, "@prefix org-data: http://id.thomsonreuters.com/kg//data/" and "@prefix df-data: http://id.thomsonreuters.com/df/data/" may both be declared so that "org-data:myOrganization" and "df-data: myOrganization" respectively may be used.

Figure 22:
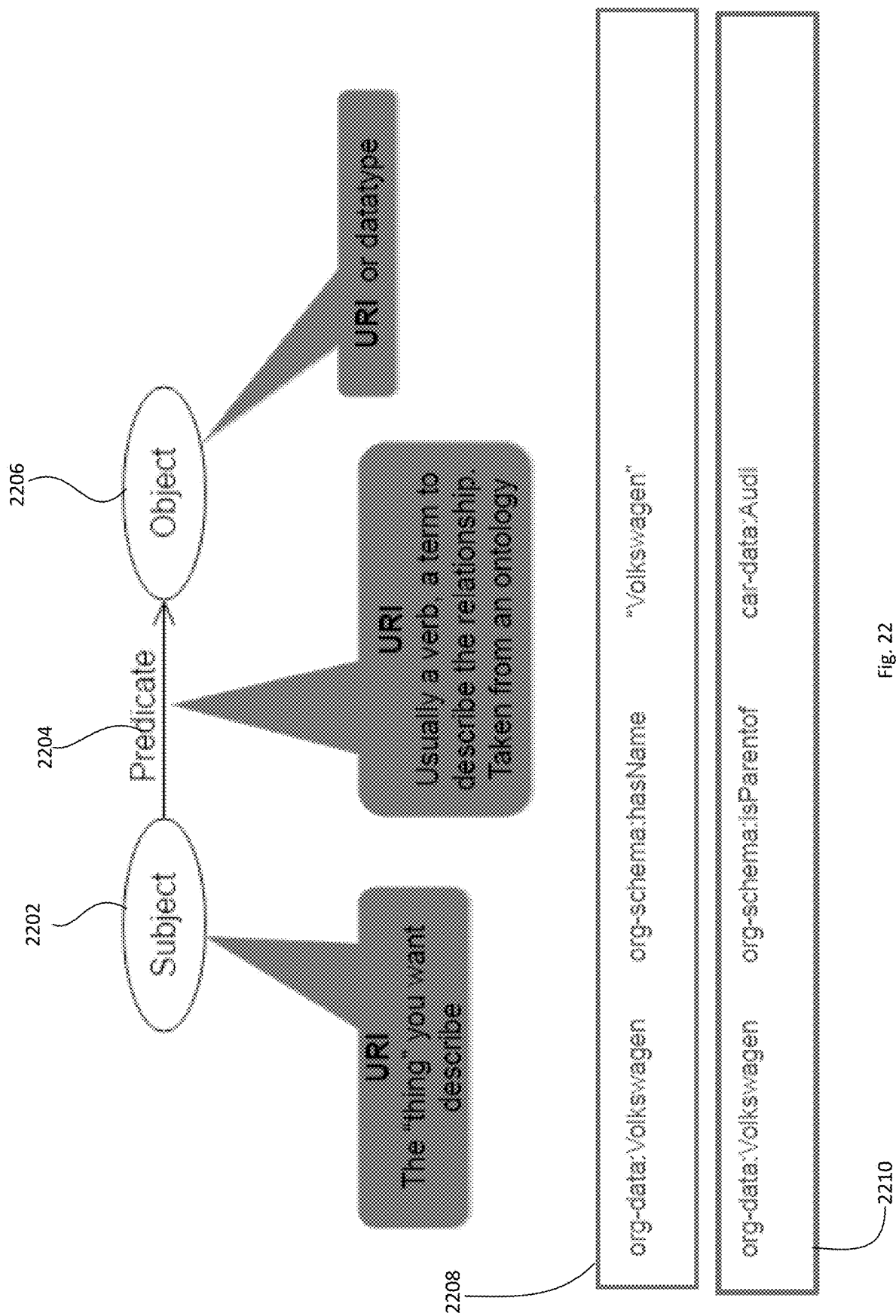

RDF 2104 provides for the automated processing of information by structuring individual statements in the form of a triple comprising, as shown in FIG. 22, a subject 2202, a predicate 2204, and an object 2206. The subject 2202 is identified by the URI and is the "thing" being described. The predicate 2204 may be a URI and is usually a verb or a term used to describe a relationship and may be taken from an ontology or ontological description. The object 2206 is also identified by a URI and may be another "thing" or a data type. Two triple examples are shown in FIG. 22. The first, triple 2208, comprises the subject "org-data: Volkswagen", the predicate "org-schema:hasName", and the object "Volkswagen". The second, triple 2210, comprises the subject "org-data: Volkswagen", the predicate "org-schema: isParentof", and the object "car-data:Audi". Triple 2208 describes the entity "Volkswagen" as having the name "Volkswagen." Triple 2210 describes the entity "Volkswagen" as being the parent entity of the entity "Audi."

Figure 23:
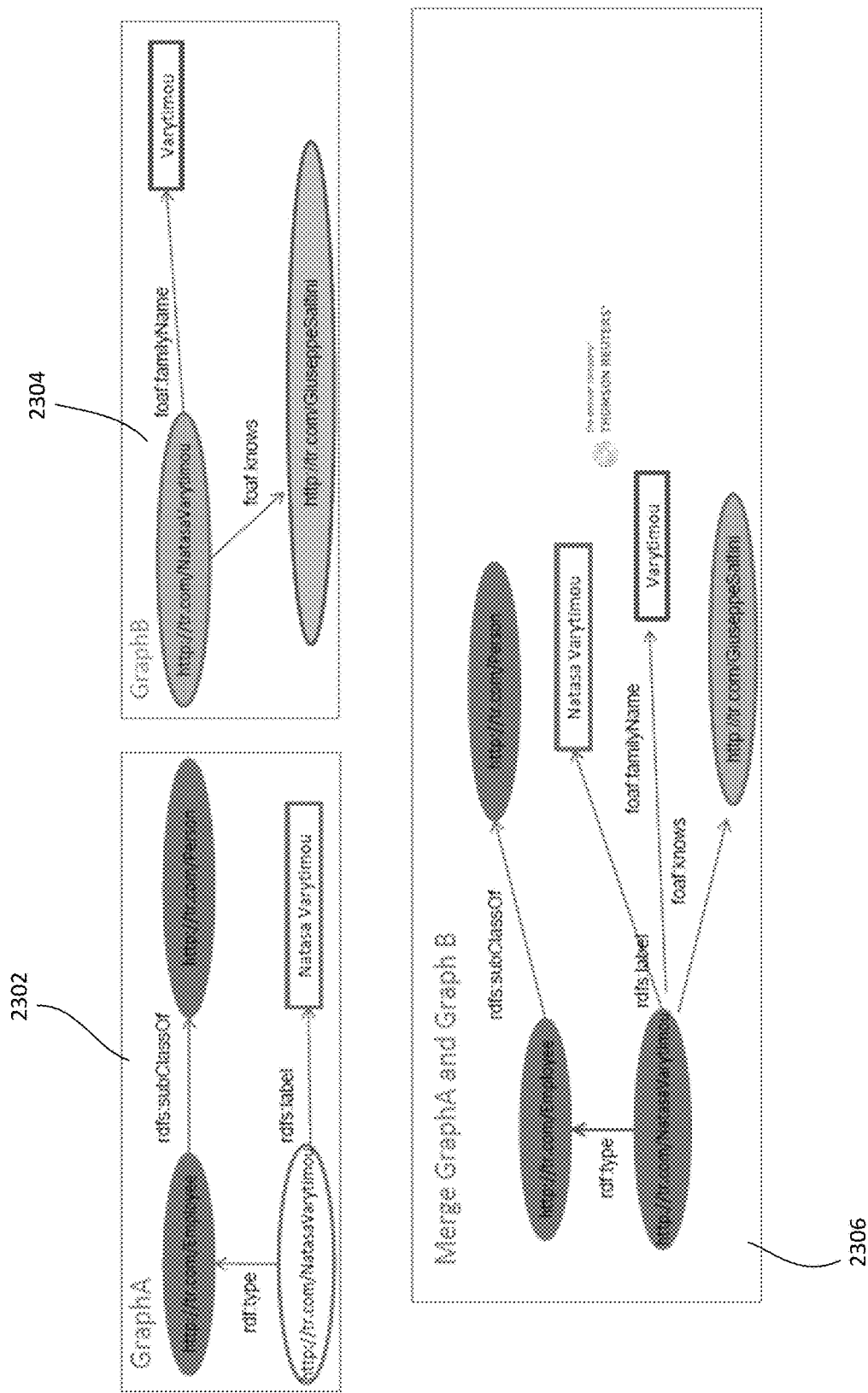

As shown in FIG. 23, RDF graphs are sets of triples that can be created and stored separately but can also be merged to integrate different types of information. Graph A 2302 and Graph B 2304 both describe the same person entity "Natasa Varytimou" differently, but refer to the same entity URI "http://tr.com/NatasaVarytimou". Merge Graph A and Graph B 2306 illustrates how Graph A 2302 and Graph B 2304 can be merged to join the information and relationships illustrated in the respective graphs into a single merged graph based on a commonly identified URI.

Figure 24:
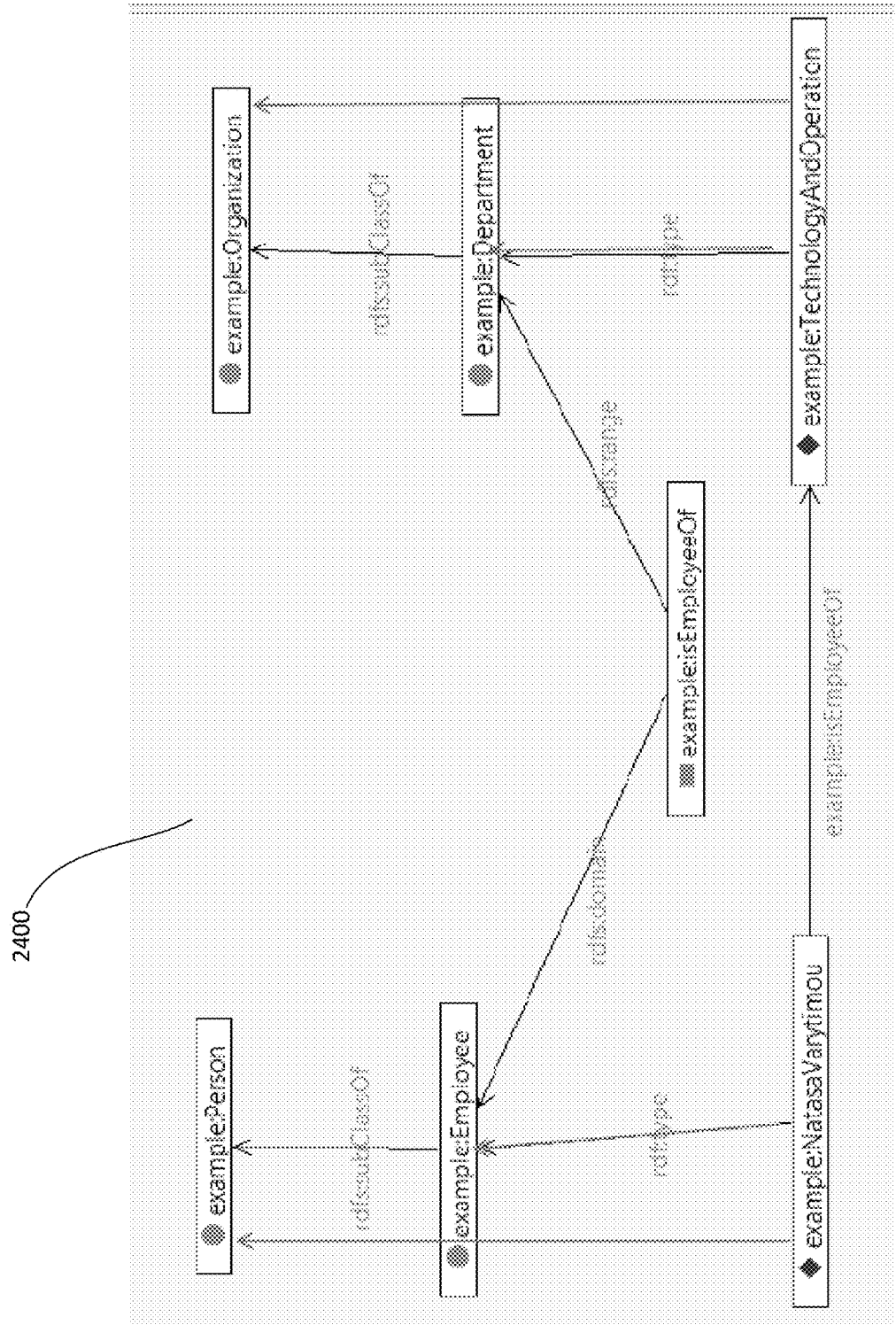
Figure 25:
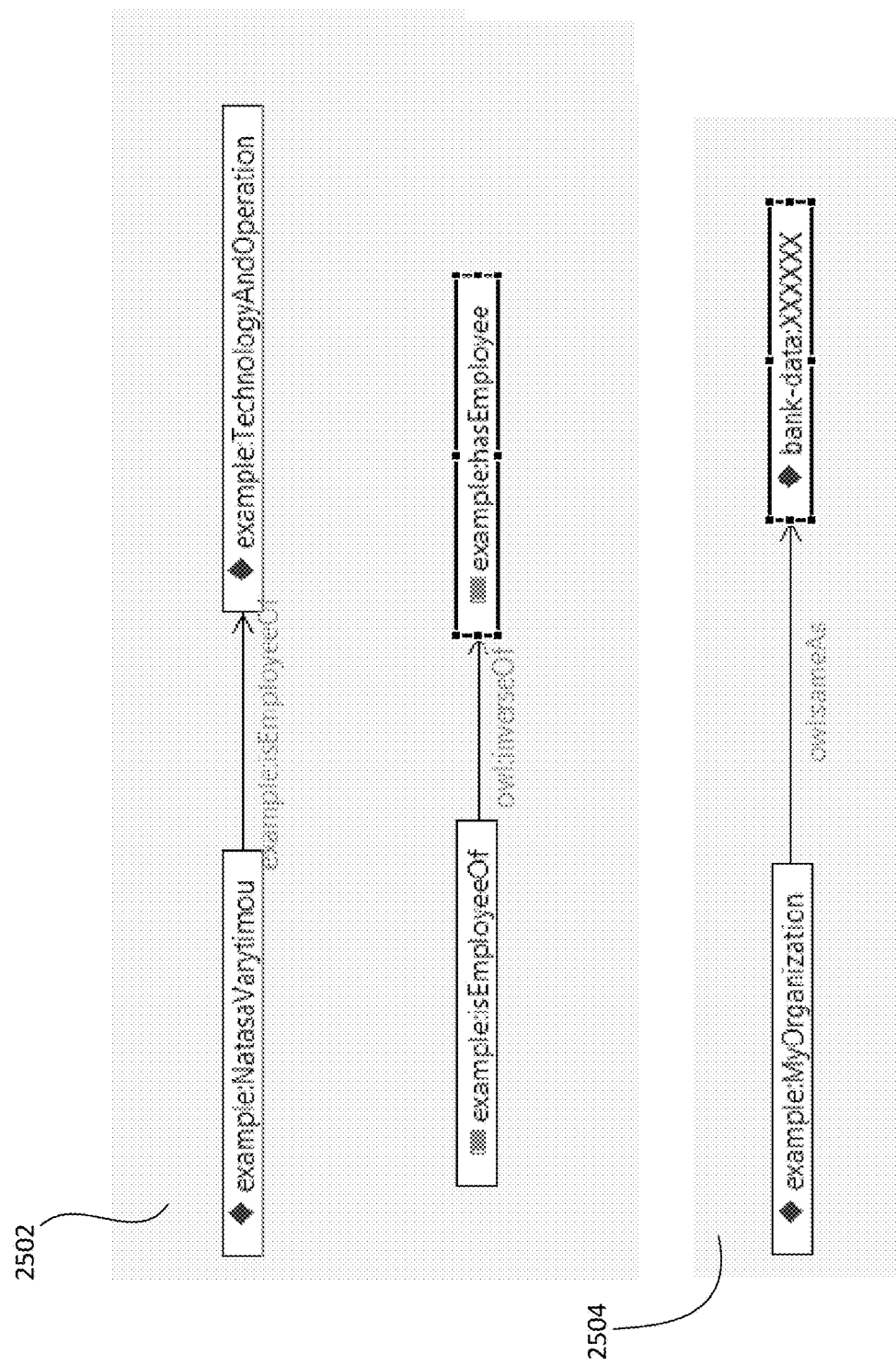

The use of the RDFS 2106 provides for more knowledge to be structured around any entity or entity relationship. As shown in FIG. 24, the RDFS 2400 provides for the subclasses, domains and ranges, labels, and commitments of the RDFS 2106 to describe the entity "Natasa Varytimou." RDFS 2400 shows that "Natasa Varytimou" is the "example" and is of type "employee" which is a subclass of a "Person"; "Natasa Varytimou" is also an employee of "Technology and Operation" which is a type "Department" which is a subclass of "Organization." The "employee" is also in the domain "EmployeeOf" which is in the range "Department." Using the RDFS 2106 schema to describe the entity provides for the description of the relationships between entities. More complicated relationships may be described using OWL 2108 as shown in FIG. 25.

Figure 26:
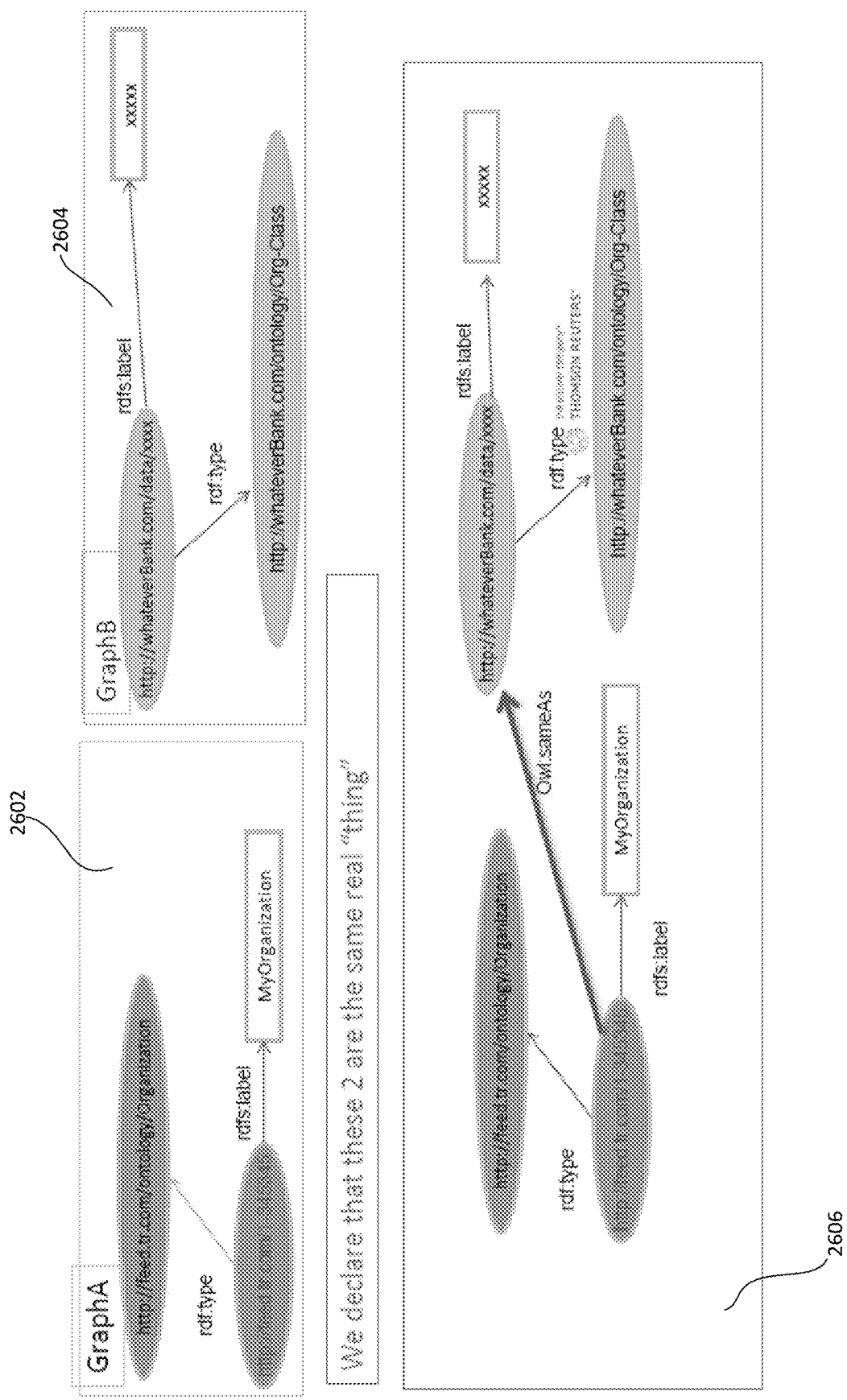

OWL 2108 provides for the description of more complicated relationships between entities and for the description of certain relationships not provided for in RDFS 2106. OWL 2108 provides for the description of relationship restrictions, inverses, and functional properties of relationships. OWL 2108 also provides for the description of an entity or relationship as the "same as" another entity or relationship. In OWL relationship 2502 example "Natasa Varytimou" is an "EmployeeOf" the entity "Technology and Operations. OWL relationship 2502 further describes "EmployeeOf" as the inverse of "hasEmployee" providing for a richer description of the relationship between entities. OWL relationship 2504 describes the example "MyOrganization" as being the same as "bank-data:XXXXXX" enabling the identification of an entity by either identifier type. The OWL relationship 2504 is further illustrated in the graphs of FIG. 26. Graph A 2602 and Graph B 2604 both relate to the organization "MyOrganiztion" but Graph B 2604 only refers to the organization by the identifier of the bank identification number and not by name. By declaring that "MyOrganziation" and the bank identifier "XXXXXX" refer to the "same real thing" the two graphs can be merged in graph 2606 using the OWL relationship 2504 shown in FIG. 25.

Figure 27:
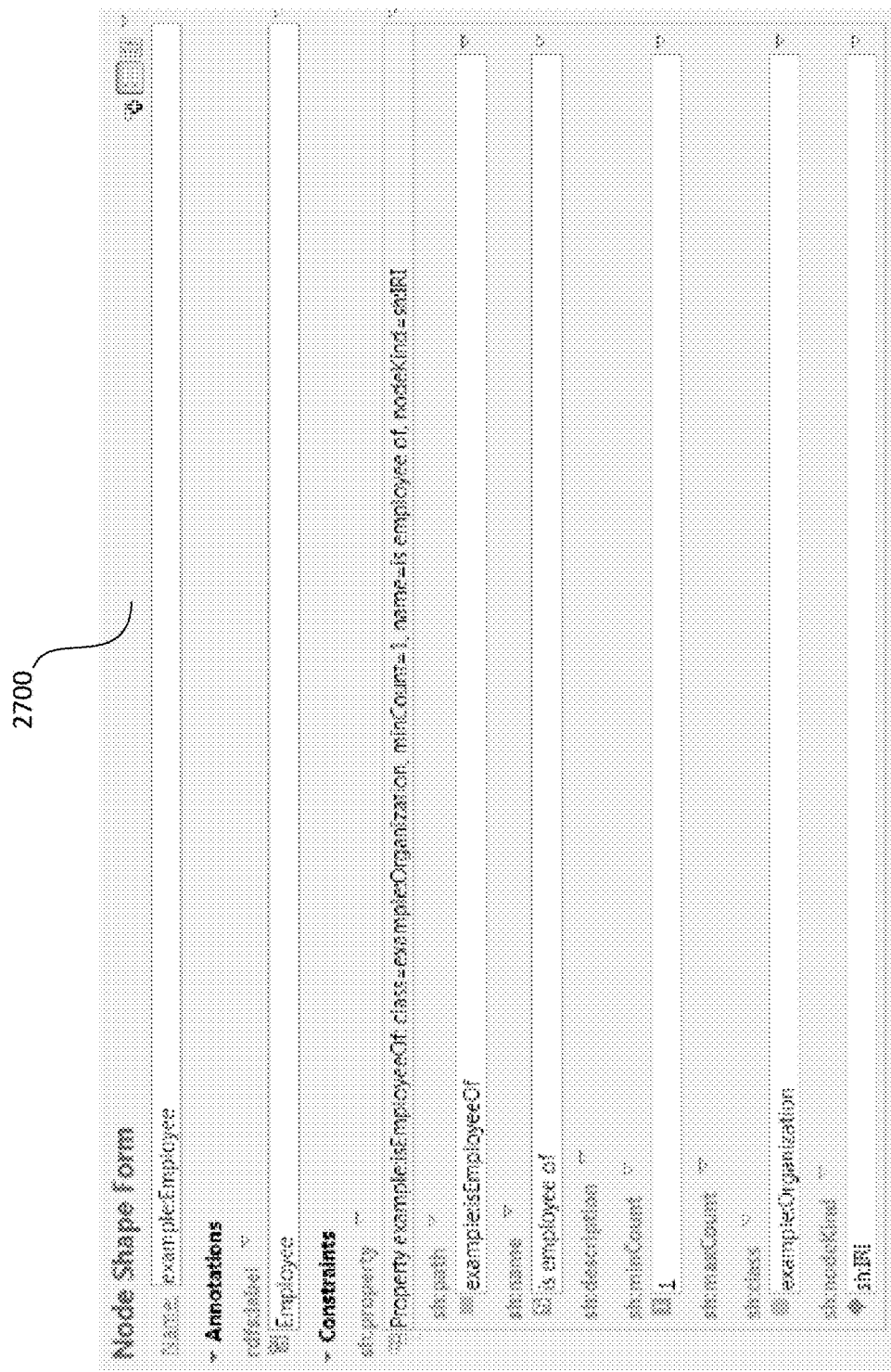

SHACL 2110 is a data modelling language used in the toolkit 2100 to describe constraints on RDF 2104 without the requirement of extensive user programming or system processing resources. For example, the user interface 2700 shown in FIG. 27 is used to describe or define constraints, "shapes", on the data. The system checks the data based on these constraints and may create data type or shape violation messages or alerts. A data point, which may be an entity represented as a node on a graph such as a directed graph, may be defined in the user interface 2700 and have certain constraints or "shapes" applied to it such as acceptable parameters for its path, name, description, number/count, class, node kind, etc. The shape as defined in the user interface 2700 using the SHACL 2110 is used to validate and constrain the data to the defined shape such that violations of the defined shape can be reported as alert messages or can be automatically addressed by the system. For example, if a stock quote is generated for an inactive financial instrument, and the stock quote is constrained to data shape requiring an active instrument, an error message may be displayed. The constraint on the quote may be defined as:

```
SELECT $this ?exchange ?quoteLabel
WHERE{
$this example:hasQuoteStatus "Active".
$this example:hasExchange ?exchange.
    ?instrument example:hasQuote $this.
    ?instrument example:hasInstrumentStatus "Inactive".
}
Error Message:
*ERROR* Exchange {?exchange} of Inactive Instrument {?instrument}.
The {$this} seems to be active.
```

Figure 28:
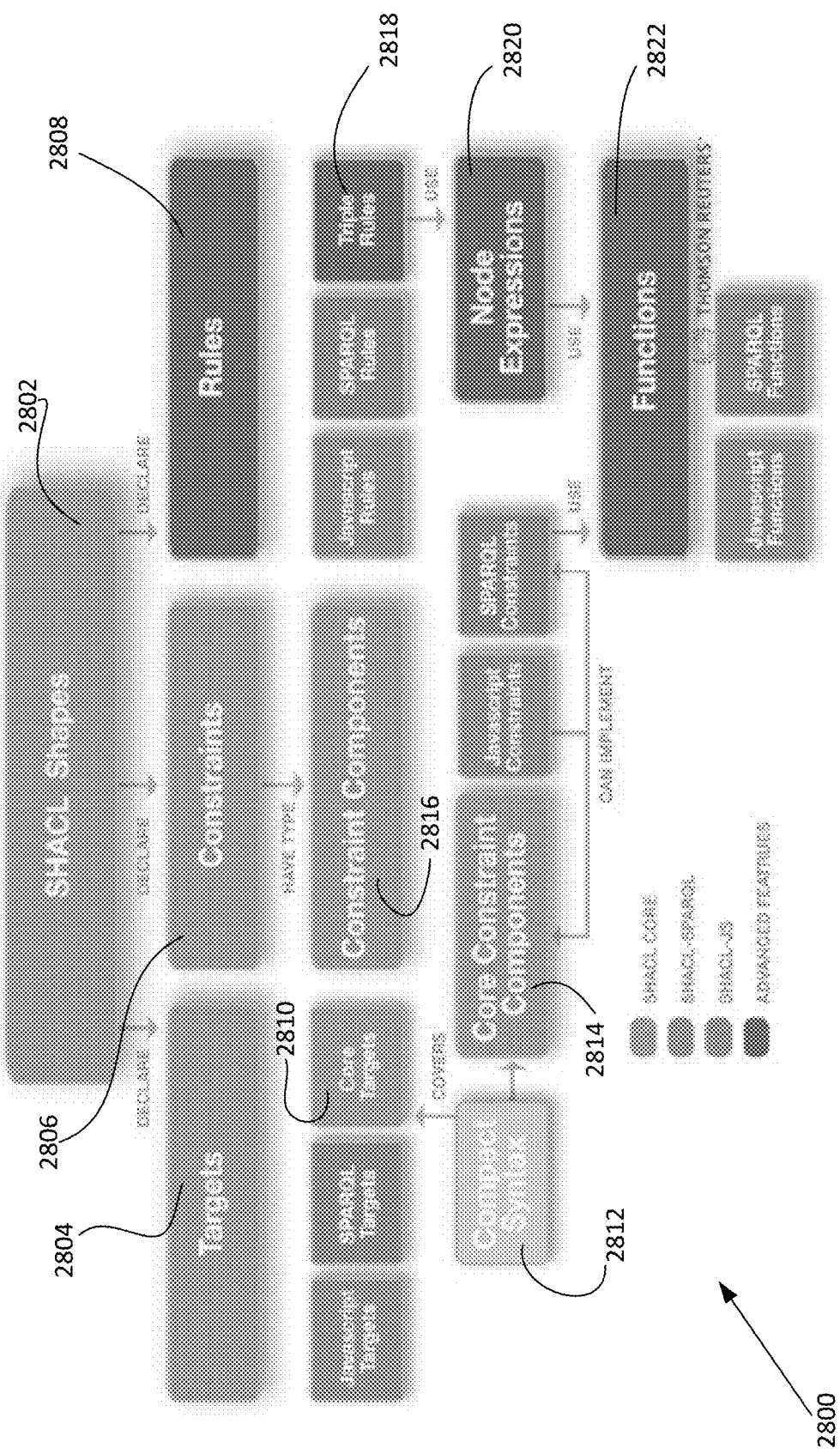

The SHACL 2110 may comprise the SHACL elements 2800 shown in FIG. 28. SHACL elements 2800 comprise SHACL shapes 2802 which comprises targets 2804, constraints 2806, and rules 2808. SHACL targets 2804 comprise Javascript targets, SPARQL targets, and core targets 2810 which may have a compact syntax 2812 describing core constraint components 2814 implementing both Javascript and SPARWL constraints. The constraints 2806 may have constraint components 2816 separate from or in addition to the core constraint components 2814. Rules 2808 include Javascript rules, SPARQL rules, and triple rules 2818 which comprise node expressions 2820 using functions 2822. FIG. 29 illustrates a SHACL 2110 rule 2900 used to create new information out of data in a manner similar to inferencing but in a manner controlled and constrained by the targets 2804, constraints 2806, and rules 2808. The rule 2900 creates new information and new triples based on conditions defined within the rule. The rule 2900, for example, defines a product as a small product if the product has a size in a particular range.

Various features of the system may be implemented in hardware, software, or a combination of hardware and software. For example, some features of the system may be implemented in one or more computer programs executing on programmable computers. Each program may be implemented in a high level procedural or object-oriented programming language to communicate with a computer system or other machine. Furthermore, each such computer program may be stored on a storage medium such as read-only-memory (ROM) readable by a general or special purpose programmable computer or processor, for configuring and operating the computer to perform the functions described above.

What is claimed is:

1. A system including a central server connected to a plurality of remote devices over a communications network, the system comprising:
    a directed graph data store comprising a plurality of directed graphs, each directed graph respectively related to an entity associated with a primary identifier, and including a first directed graph related to a first entity associated with a first primary identifier and comprising a set of relationship data and a first entity node representing the first entity;
    an input connected to the communications network to receive a plurality of electronic documents comprising unstructured text;
    a machine-learning classifier applying a machine learning-based algorithm to:
        extract, from the unstructured text of the electronic documents, a subject entity, a predicate relationship, and an object; and
        generate a triple comprising the subject entity, the predicate relationship, and the object;
    a graph-based data model when executed by the central server configured to generate a second directed graph based in part on the triple and associate the first primary identifier with the subject entity, the second directed graph comprising a subject entity node representing the subject entity, a vertex representing the predicate relationship, and an object node representing the object; and
    a semantic web toolkit comprising and applying one or more of a uniform resource identifier ("URI") system and language, a resource description framework ("RDF") system, an open world assumption language ("OWL"), a shapes constraint language ("SHACL"), a resource description framework schema ("RDFS"), and a SPARQL protocol and RDF query language ("SPARQL") to compare the triple to the set of relationship data in the first directed graph and combine the subject entity node with the first entity node based on the first primary identifier and merge the first directed graph with the second directed graph to generate a third directed graph representing a data shape, and store the third directed graph in the directed graph data store.

2. The system of claim 1, wherein the graph-based data model is optimized based on one of content type, metadata information, or use case.

3. The system of claim 1, wherein each directed graph in the plurality of directed graphs is associated with a content set, the content set comprising a set of example data fields and a set of example relationships.

4. The system of claim 1, wherein the plurality of directed graphs comprises Knowledge Graphs.

5. The system of claim 1, further comprising a display module adapted to provide a user interface comprising the first directed graph, the second directed graph, and the third directed graph.

6. The system of claim 1, wherein the first primary identifier is one of a Uniform Resource Identifier or a PermID.

7. The system of claim 1, wherein the semantic web toolkit is a semantic web toolkit comprising a uniform resource identifier ("URI") system and language, a resource description framework ("RDF") system, an open world assumption language ("OWL"), and a shapes constraint language ("SHACL").

8. The system of claim 7, wherein the OWL is adapted to identify an additional relationship between one or more of the subject entity, the predicate relationship, the object, the first entity, and the set of relationship data based on one or both of a relationship restriction and a relationship inverse.

9. The system of claim 8, wherein the SHACL is adapted to constrain the merging of the first directed graph and the second directed graph based on a set of defined constraints.

10. The system of claim 1, wherein the semantic web toolkit is a semantic web toolkit comprising a resource description framework schema ("RDFS") and a SPARQL protocol and RDF query language ("SPARQL").

11. A method of providing remote users connected to a central server over a communications network semantically-defined relationship information for a set of entities, the method comprising:
    storing a plurality of directed graphs in a directed graph data store, each directed graph related to an entity identified by a primary identifier, and including a first directed graph related to a first entity associated with a first primary identifier and comprising a set of relationship data and a first entity node representing the first entity;
    receiving via the communications network electronic documents comprising unstructured text;
    extracting, by a machine-learning classifier applying a machine learning-based algorithm, a subject entity, a predicate relationship, and an object from the unstructured text of the received electronic documents;
    generating, by the machine-learning classifier applying a machine learning-based algorithm, a triple comprising the subject entity, the predicate relationship, and the object;
    generating, by a graph-based data model executed by the central server, a second directed graph based in part on the triple and comprising a subject entity node representing the subject entity, a vertex representing the predicate relationship, and an object node representing the object;
    associating, by the graph-based data model executed by the central server, the first primary identifier with the subject entity;
    merging, by a semantic web toolkit, the first directed graph with the second directed graph to generate a third directed graph, the merging based on comparing the triple to the set of relationship data in the first directed graph and combining the subject entity node with the first entity node based on the first primary identifier, wherein the third directed graph generated by the merging of the first directed graph and the second directed graph represents a data shape; and storing the third directed graph in the directed graph data store.

12. The method of claim 11, wherein the graph-based data model is optimized based on one of content type, metadata information, or use case.

13. The method of claim 11, wherein each directed graph in the plurality of directed graphs is associated with a content set, the content set comprising a set of example data fields and a set of example relationships.

14. The method of claim 11, wherein the plurality of directed graphs comprises Knowledge Graphs.

15. The method of claim 11, further comprising providing, by a display module, a user interface comprising the first directed graph, the second directed graph, and the third directed graph.

16. The method of claim 11, wherein the first primary identifier is one of a Uniform Resource Identifier or a PermID.

17. The method of claim 16, wherein the semantic web toolkit is a semantic web toolkit comprising a uniform resource identifier ("URI") system and language, a resource description framework ("RDF") system, an open world assumption language ("OWL"), and a shapes constraint language ("SHACL").

18. The method of claim 17, further comprising identifying, by the OWL, an additional relationship between one or more of the subject entity, the predicate relationship, the object, the first entity, and the set of relationship data based on one or both of a relationship restriction and a relationship inverse.

19. The method of claim 18, further comprising constraining, by the SHACL, the merging of the first directed graph and the second directed graph based on a set of defined constraints.

20. The method of claim 11, wherein the semantic web toolkit is a semantic web toolkit comprising a resource description framework schema ("RDFS") and a SPARQL protocol and RDF query language ("SPARQL").

* * * * *